United States Patent
Okada

(10) Patent No.: US 7,363,814 B2
(45) Date of Patent: Apr. 29, 2008

(54) MULTI-AXIAL ANGULAR VELOCITY SENSOR

(76) Inventor: Kazuhiro Okada, 73, Sugaya 4-Chome, 'Ageo-Shi, Saitama 362 (JP)

( * ) Notice: Subject to any disclaimer, the term of this patent is extended or adjusted under 35 U.S.C. 154(b) by 0 days.

(21) Appl. No.: 11/398,380

(22) Filed: Apr. 5, 2006

(65) Prior Publication Data

US 2006/0179941 A1    Aug. 17, 2006

Related U.S. Application Data

(60) Division of application No. 11/135,078, filed on May 23, 2005, now Pat. No. 7,059,188, which is a division of application No. 10/313,125, filed on Dec. 5, 2002, now Pat. No. 6,941,810, which is a division of application No. 09/885,620, filed on Jun. 20, 2001, now Pat. No. 6,865,943, which is a division of application No. 09/417,338, filed on Oct. 13, 1999, now Pat. No. 6,282,956, which is a division of application No. 09/067,175, filed on Apr. 27, 1998, now Pat. No. 5,987,985, which is a division of application No. 08/779,464, filed on Jan. 7, 1997, now Pat. No. 5,831,163, which is a division of application No. 08/366,026, filed on Dec. 29, 1994, now Pat. No. 5,646,346, which is a continuation-in-part of application No. 08/331,641, filed as application No. PCT/JP93/00390 on Mar. 30, 1993, now abandoned.

(51) Int. Cl.
  *G01P 9/00*     (2006.01)
  *G01P 3/44*     (2006.01)

(52) U.S. Cl. .................................. 73/504.04; 73/504.12
(58) Field of Classification Search ...............
  73/504.12–504.16, 504.02, 504.03, 504.04,
  73/514.32, 514.34, 862.042, 862.043
  See application file for complete search history.

(56) References Cited

U.S. PATENT DOCUMENTS

| | | | |
|---|---|---|---|
| 3,509,583 A | 5/1970 | Fraioli | ......................... 623/24 |
| 3,924,474 A | 12/1975 | Friedland et al. | |
| 3,952,234 A | 4/1976 | Birchall | ....................... 73/724 |
| 4,175,428 A | 11/1979 | Eilersen | ................ 73/862.626 |
| 4,261,086 A | 4/1981 | Giachino et al. | .......... 29/25.41 |

(Continued)

FOREIGN PATENT DOCUMENTS

DE           2758986        7/1978

(Continued)

OTHER PUBLICATIONS

Patent Abstracts of Japan of JP 3050809 dated May 16, 1991 vol. 15 No. 101.

(Continued)

*Primary Examiner*—Helen C. Kwok
(74) *Attorney, Agent, or Firm*—Ladas and Parry LLP

(57) ABSTRACT

An angular velocity sensor for detecting angular velocity about a Z-axis in an XYZ coordinate system has a substrate oscillator, a flexible member for connecting the oscillator to a casing, a device for oscillating the oscillator in an X-axis direction, and a detection device detecting deviation of oscillation of the oscillator in a Y-axis direction for indicating the angular velocity about the Z-axis.

7 Claims, 40 Drawing Sheets

U.S. PATENT DOCUMENTS

| | | | |
|---|---|---|---|
| 4,303,919 A | 12/1981 | Demeff | 340/870.37 |
| 4,309,907 A | 1/1982 | Budraitis et al. | 73/862.041 |
| 4,373,399 A | 2/1983 | Beldglazov et al. | 73/777 |
| 4,384,899 A | 5/1983 | Myers | 29/25.41 |
| 4,454,771 A | 6/1984 | Shimazoe et al. | 73/862.68 |
| 4,483,194 A | 11/1984 | Rudolf | |
| 4,542,436 A | 9/1985 | Carusillo | 73/718 |
| 4,552,028 A | 11/1985 | Burckhardt et al. | 73/862.041 |
| 4,586,109 A | 4/1986 | Peters et al. | 361/293 |
| 4,598,585 A | 7/1986 | Boxenhorn | 73/505 |
| 4,615,105 A | 10/1986 | Wada et al. | 29/594 |
| 4,644,793 A | 2/1987 | Church | |
| 4,674,331 A | 6/1987 | Watson | |
| 4,680,606 A | 7/1987 | Knutti et al. | 73/862.041 |
| 4,699,006 A | 10/1987 | Boxenhorn | |
| 4,719,538 A | 1/1988 | Cox | 361/283.2 |
| 4,802,371 A | 2/1989 | Calderara et al. | 73/862.04 |
| 4,853,894 A | 8/1989 | Yamanaka et al. | 365/154 |
| 4,855,866 A | 8/1989 | Imamura et al. | 361/306 |
| 4,864,463 A | 9/1989 | Shkedi | 361/283.4 |
| 4,891,985 A | 1/1990 | Glenn | 73/517.12 |
| 4,905,523 A | 3/1990 | Okada | 73/862.04 |
| 4,910,840 A | 3/1990 | Sprenkels et al. | 29/25.41 |
| 4,967,605 A | 11/1990 | Okada | 73/862.04 |
| 4,969,366 A | 11/1990 | Okada | 73/862.08 |
| 5,014,415 A | 5/1991 | Okada | 29/621.1 |
| 5,035,148 A | 7/1991 | Okada | 73/862.04 |
| 5,054,323 A | 10/1991 | Hubbard, Jr. et al. | 73/DIG. 4 |
| 5,092,645 A | 3/1992 | Okada | 294/86.4 |
| 5,182,515 A | 1/1993 | Okada | 324/259 |
| 5,203,208 A | 4/1993 | Bernstein | 73/504.12 |
| 5,257,542 A | 11/1993 | Voss | 73/724 |
| 5,263,375 A | 11/1993 | Okada | 73/862.042 |
| 5,275,047 A | 1/1994 | Zabler et al. | |
| 5,284,059 A | 2/1994 | Wan | |
| 5,295,386 A | 3/1994 | Okada | 73/1 D |
| 5,317,922 A | 6/1994 | Bomback et al. | 361/283.3 |
| 5,329,815 A | 7/1994 | Dunn et al. | 73/504.12 |
| 5,343,765 A | 9/1994 | Okada | 73/862.043 |
| 5,359,893 A | 11/1994 | Dunn | 73/504.12 |
| 5,365,799 A | 11/1994 | Okada | 73/862.041 |
| 5,377,544 A | 1/1995 | Dunn | 73/504.08 |
| 5,392,658 A | 2/1995 | Okada | 73/862.043 |
| 5,406,848 A | 4/1995 | Okada | 73/517 R |
| 5,421,213 A | 6/1995 | Okada | 73/862.043 |
| 5,437,196 A | 8/1995 | Okada | 73/862.043 |
| 5,492,020 A | 2/1996 | Okada | 73/862.626 |
| 5,497,668 A | 3/1996 | Okada | 73/862.626 |
| 5,531,002 A | 7/1996 | Okada | 29/25.41 |
| 5,531,092 A | 7/1996 | Okada | 73/1 D |
| 5,571,972 A | 11/1996 | Okada | 73/862.043 |
| 5,639,973 A | 6/1997 | Okada | 73/862.043 |
| 5,646,346 A | 7/1997 | Okada | 73/504.04 |
| 5,661,235 A | 8/1997 | Bonin | 73/862.626 X |
| 5,668,318 A | 9/1997 | Okada | 73/504.11 |
| 5,682,000 A | 10/1997 | Okada | 73/862.043 |
| 5,744,718 A | 4/1998 | Okada | 73/514.33 |
| 5,780,749 A | 7/1998 | Okada | 73/862.043 |
| 5,786,997 A | 7/1998 | Hoyt et al. | 73/862.043 X |
| 5,811,693 A | 9/1998 | Okada | 73/862.043 |
| 5,831,163 A | 11/1998 | Okada | 73/504.12 |
| 5,850,040 A | 12/1998 | Okada | 73/504.04 |
| 5,856,620 A | 1/1999 | Okada | 73/514.32 |
| 5,962,787 A | 10/1999 | Okada | 73/514.32 |
| 5,987,985 A | 11/1999 | Okada | 73/504.04 |
| 6,003,371 A | 12/1999 | Okada | 73/504.02 |
| 6,053,057 A | 4/2000 | Okada | 73/862.043 |
| 6,076,401 A | 6/2000 | Okada | 73/504.12 |
| 6,098,461 A | 8/2000 | Okada | 73/514.34 |
| 6,158,291 A | 12/2000 | Okada | 73/862.043 |
| 6,159,761 A | 12/2000 | Okada | 438/53 |
| 6,185,814 B1 | 2/2001 | Okada | 29/621.1 |
| 6,205,856 B1 | 3/2001 | Okada | 73/504.11 |
| 6,269,697 B1 | 8/2001 | Okada | 73/504.02 |
| 6,282,956 B1 | 9/2001 | Okada | 73/504.12 |
| 6,314,823 B1 | 11/2001 | Okada | 73/862.043 |
| 6,367,326 B1 | 4/2002 | Okada | 73/504.12 |
| 6,378,381 B1 | 4/2002 | Okada et al. | 73/862.043 |
| 6,474,133 B1 | 11/2002 | Okada | 73/1.38 |
| 6,477,903 B2 | 11/2002 | Okada | 73/862.043 |
| 6,512,364 B1 | 1/2003 | Okada | 324/158.1 |
| 6,530,283 B2 | 3/2003 | Okada et al. | 73/780 |
| 6,716,253 B2 | 4/2004 | Okada | 73/52 |
| 6,772,632 B2 | 8/2004 | Okada | 73/514.38 |
| 6,779,408 B2 | 8/2004 | Okada | |
| 6,809,529 B2 | 10/2004 | Okada et al. | 324/681 |
| 6,859,048 B2 | 2/2005 | Okada | |
| 6,864,677 B1 | 3/2005 | Okada | |
| 6,865,943 B2 | 3/2005 | Okada | |
| 6,894,482 B2 | 5/2005 | Okada | |
| 6,915,709 B2 | 7/2005 | Okada | |
| 6,920,788 B2 | 7/2005 | Okada | |
| 6,941,810 B2 * | 9/2005 | Okada | 73/504.02 |
| 6,990,867 B2 | 1/2006 | Okada | |
| 7,059,188 B2 * | 6/2006 | Okada | 73/504.02 |

FOREIGN PATENT DOCUMENTS

| | | |
|---|---|---|
| DE | 3008441 | 9/1981 |
| DE | 3226386 | 1/1984 |
| DE | 4022495 | 1/1992 |
| EP | 0084704 | 8/1983 |
| EP | 0133997 | 3/1985 |
| EP | 0338766 | 10/1989 |
| EP | 0461761 | 12/1991 |
| EP | 0480471 | 4/1992 |
| EP | 0527394 | 2/1993 |
| FR | 2265135 | 3/1974 |
| GB | 2107472 | 4/1983 |
| GB | 2186085 | 8/1987 |
| GB | 2226699 | 7/1990 |
| JP | 57190241 | 11/1982 |
| JP | 59155734 | 4/1984 |
| JP | 0166829 | 9/1984 |
| JP | 0147622 | 8/1985 |
| JP | 60161539 | 8/1985 |
| JP | 60190828 | 9/1985 |
| JP | 6184711 | 9/1986 |
| JP | 62011257 | 1/1987 |
| JP | 63108763 | 5/1988 |
| JP | 86508 | 3/1989 |
| JP | 01150383 | 6/1989 |
| JP | 80930 | 3/1990 |
| JP | 0218932 | 8/1990 |
| JP | 3050809 | 3/1991 |
| JP | 3165552 | 7/1991 |
| JP | 3200038 | 9/1991 |
| JP | 425714 | 1/1992 |
| JP | 429012 | 1/1992 |
| JP | 484725 | 3/1992 |
| JP | 4148833 | 5/1992 |
| JP | 4249726 | 9/1992 |
| JP | 526744 | 2/1993 |
| JP | 540040 | 2/1993 |
| JP | 560787 | 3/1993 |
| JP | 5248872 | 9/1993 |
| JP | 62185118 | 8/1997 |
| WO | 9114285 | 9/1991 |
| WO | 9501081 | 1/1995 |
| WO | 9601926 | 1/1996 |

OTHER PUBLICATIONS

Patent Abstracts of Japan of JP 3165552 dated Oct. 16, 1991 vol. 15 No. 40.

Patent Abstracts of Japan, vol. 010, No. 177 (p. 470) Jun. 21, 1986.
Patent Abstracts of Japan, vol. 015, No. 311 (E-1098) Aug, 1991.
English Abstract of JP 5248872 dated Sep. 28, 1993.
Patent Abstracts of Japan, vol. 11, No. 58, Feb. 21, 1987, p. 550.
Patent Abstracts of Japan, vol. 9, No. 6, Jan. 11, 1985.
N.T.I.S. Technical Notes, "Force Sensor . . . ", Part F, Feb. 1986, p. 188.
Patent Abstracts of Japan, vol. 012, No. 351 (E-660), Sep. 20, 1988, for JP 63108763A.
Patent Abstracts of Japan, vol. 013 No. 410 (E-819), Sep. 11, 1988, for JP 01150383A.
Patent Abstracts of Japan, vol. 011, No. 179 (E-514), Jun. 9, 1987, for JP 62011257A.
Patent Abstracts of Japan, vol. 10, No. 45, Feb. 21, 1986, p. 430.
Patent Abstracts of Japan, vol. 7, No. 38, Feb. 16, 1983, p. 176.
Patent Abstracts of Japan, vol. 10, No. 256, Sep. 2, 1986, p. 493.
R.F. Wolffenbuttel et al. "Multiaxis Compliant Capacitive . . ." IEEE Instrumentation and Measurement Technology Conference San Jose, California, 1990, pp. 54-59.
Patent Abstracts of Japan, vol. 014, No. 366 (P-1089) Aug. 1990.
Patent Abstracts of Japan, vol. 013, No. 266 (P-887) Jun. 20, 1989.
Peterson, K., Transducers '85, International Conference on Solid-State Sensors an Actuators, "A force sensing chip . . . ", 1985, pp. 30-32.
Suzuki, M. et al., Proceedings.
IECON '86, International Conference on Industrial Electronics, Control and Instrumentation, "Three Kinds of Dexterous . . . ", Milwuakee, Wis., pp. 544-548
Patent Abstracts of Japan of JP540040 dated Feb. 19, 1993.
Patent Abstracts of Japan of JP429012 dated Jan. 31, 1992.
Patent Abstracts of Japan of JP 425714 dated Jan. 29, 1992.
Patent Abstracts of Japan of JP148833 dated May 21, 1992.
Patent Abstracts of Japan of JP3200038 dated Sep. 2, 1991.
Patent Abstracts of Japan of JP 484725 dated Mar. 18, 1992.
Patent Abstracts of Japan of JP 526744 dated Feb. 2, 12993.

* cited by examiner

OSCILLATION U

CORIOLIS FORCE

TYPE I

TYPE I

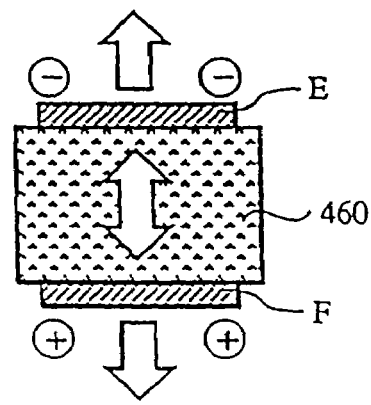
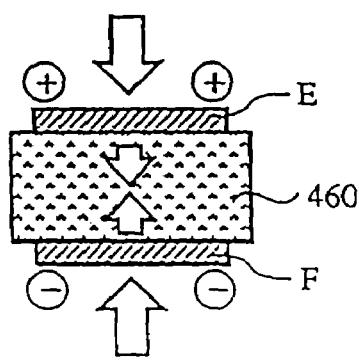
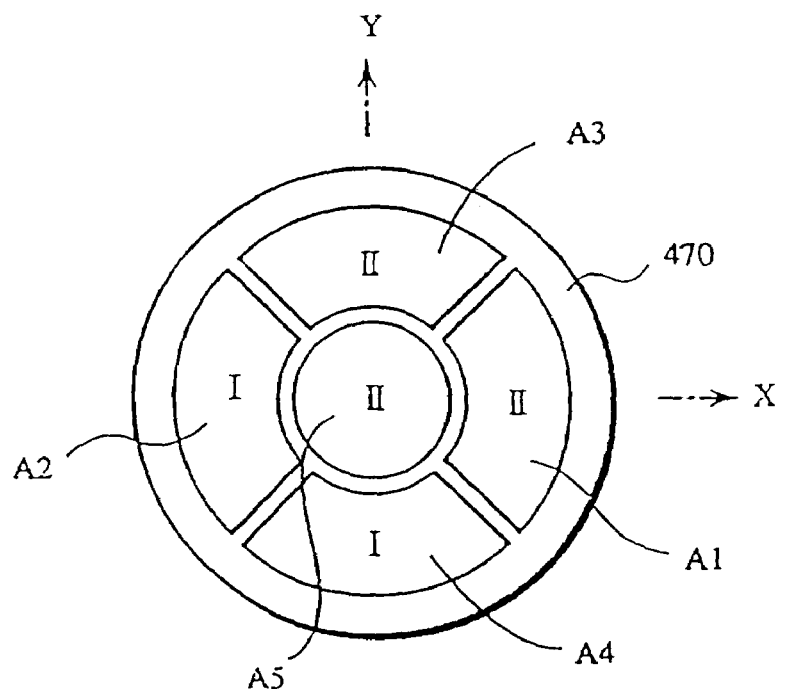

TYPE III

TYPE III

TYPE IV

TYPE IV

MULTI-AXIAL ANGULAR VELOCITY SENSOR

This is a divisional of application Ser. No. 11/135,078 filed on May 23, 2005, now U.S. Pat. No. 7,059,188 which is a DIVISIONAL application Ser. No. 10/313,125 filed on Dec. 5, 2002 now U.S. Pat. No. 6,941,810 which is a DIVISIONAL of application Ser. No. 09/885,620 filed on Jun. 20, 2001 (Now U.S. Pat. No. 6,865,943), which is a DIVISIONAL of application Ser. No. 09/417,338 filed on Oct. 13, 1999 (Now U.S. Pat. No. 6,282,956) which is a DIVISIONAL of application Ser. No. 09/067,175 filed on Apr. 27, 1998 (Now U.S. Pat. No. 5,987,985) which is a DIVISIONAL of application Ser. No. 08/779,464 filed on Jan. 7, 1997 (Now U.S. Pat. No. 5,831,163) which is a DIVISIONAL of application Ser. No. 08/366,026 filed on Dec. 29, 1994 (Now U.S. Pat. No. 5,646,346) which is a Continuation-In-Part of application Ser. No. 08/331,641 filed on Nov. 10, 1994 (now abandoned) which is a 371 of PCT/JP93/00390 filed on Mar. 30, 1993 which designated the U.S., claims the benefit thereof and incorporates the same by reference.

TECHNICAL FIELD

This invention relates to an angular velocity sensor, and more particularly to a multi-axial angular velocity sensor capable of independently detecting angular velocity components about respective axes in an XYZ three-dimensional coordinate system.

BACKGROUND ART

In the automobile industry, machinery industry, and the like, there has been an increased demand for sensors capable of precisely detecting acceleration or angular velocity of a moving object (body). In general, an object which carries out free movement in a three-dimensional space bears an acceleration in an arbitrary direction and an angular velocity in an arbitrary rotational direction. For this reason, in order to precisely grasp movement of this object, it is necessary to independently detect acceleration components in every respective coordinate axial direction and angular velocity components about every respective coordinate axis in the XYZ three-dimensional coordinate system, respectively.

Hitherto, multi-dimensional acceleration sensors of various types have been proposed. For example, in the International Laid Open No. WO88/08522 based on the Patent Cooperation Treaty (U.S. Pat. No. 4,967,605/U.S. Pat. No. 5,182,515), there is disclosed an acceleration sensor in which resistance elements formed on a semiconductor substrate are used to detect applied acceleration components in every respective coordinate axial direction. Further, in the International Laid Open No. WO91/10118 based on the Patent Cooperation Treaty (U.S. patent application Ser. No. 07/761,771), a multi-axial acceleration sensor having self-diagnostic function is disclosed. Further, in the International Laid Open No. WO92/17759 based on the Patent Cooperation Treaty (U.S. patent application Ser. No. 07/952,753), there is disclosed an acceleration sensor in which electro-static capacitance elements or piezoelectric elements are used to detect applied acceleration components in every respective coordinate axial direction. Further, also in the Japanese Patent Application No. 274299/1990 (Tokuganhei 2-274299) specification and the Japanese Patent Application No. 416188/1990 (Tokuganhei 2-416188) specification (U.S. patent application Ser. No. 07/764,159), a multi-axial acceleration sensor similar to the above is disclosed. In the Japanese Patent Application No. 306587/1991 (Tokuganhei 3-306587) specification (U.S. patent application Ser. No. 07/960,545), a novel electrode arrangement in a similar multi-axial acceleration sensor is disclosed. In addition, in the International Application PCT/JP92/00882 specification based on the Patent Cooperation Treaty, a multi-axial acceleration sensor using piezoelectric element of another type is disclosed. The feature of these acceleration sensors is that a plurality of resistance elements, electrostatic capacitance elements or piezoelectric elements are arranged at predetermined positions of a substrate having flexibility to detect applied acceleration components on the basis of changes in resistance values of the resistance elements, changes in capacitance values of the electrostatic capacitance elements or changes in voltages produced in the piezoelectric elements. A weight body is attached on the substrate having flexibility. When an acceleration is applied, a force is applied to the weight body and bending occurs in the flexible substrate. By detecting this bending on the basis of the above-described changes in resistance values, capacitance values or charges produced, it is possible to determine acceleration components in respective axial directions.

On the contrary, the inventor of this application cannot find any literature relating to a multi-dimensional angular velocity sensor so far as he knows. Ordinarily, angular velocity sensors are utilized for detecting an angular velocity of a power shaft, etc. of a vehicle, and only have a function to detect an angular velocity about a specific single axis. In such cases of determining a rotational velocity of the power shaft, it is sufficient to use an one-dimensional angular velocity sensor. However, in order to detect angular velocity with respect to an object which carries out free movement in a three-dimensional space, it is necessary to independently detect angular velocity components about respective axes of the X-axis, the Y-axis and the Z-axis in the XYZ three-dimensional coordinate system. In order to detect angular velocity components about respective axes of the X-axis, the Y-axis and the Z-axis by using one-dimensional angular velocity sensors conventionally utilized, it is necessary that three sets of angular velocity sensors are prepared to attach them in specific directions permitting detection of angular velocity components about respective axes. For this reason, the structure as the entirety of the sensor becomes complicated, and the cost also becomes high.

DISCLOSURE OF THE INVENTION

An object of this invention is to provide a novel multi-axial angular velocity sensor having a relatively simple structure and capable of independently detecting angular velocity components about respective axes of X-axis, Y-axis and Z-axis in XYZ three-dimensional coordinate system, respectively.

The fundamental principle utilized in this invention resides in that in the case where an angular velocity $\omega$ about a first coordinate axis is exerted on an oscillator placed in an XYZ three-dimensional coordinate system, when this oscillator is oscillated in a second coordinate axis direction, a Coriolis force proportional to the magnitude of the angular velocity $\omega$ is produced in a third coordinate axis direction. In order to detect angular velocity $\omega$ by utilizing this principle, means for oscillating an oscillator in a predetermined coordinate axis direction, and means for detecting displacement in a predetermined coordinate axis direction produced in the oscillator by action of the Coriolis force are required. In addition, in order to detect all of angular velocity component ωx about the X-axis, angular velocity component ωy about the Y-axis, and angular velocity component ωz about the Z-axis, means for oscillating the oscillator in three axes directions and means for detecting displacements in the three axes directions produced in the oscillator are required. This invention provides a sensor having such means, and is characterized as follows.

(1) The first feature of this invention resides in a multi-axial angular velocity sensor for detecting angular velocity components about respective coordinate axes in a three-dimensional coordinate system, comprising:

an oscillator having mass;

a sensor casing for accommodating this oscillator therewithin;

connection means for connecting the oscillator to the sensor casing in the state having a degree of freedom such that it can move in respective coordinate axes directions;

excitation means for oscillating the oscillator in the respective coordinate axes directions; and displacement detecting means for detecting displacements in the respective coordinate axes directions of the oscillator.

(2) The second feature of this invention resides in that, in the above-described multi-axial angular velocity sensor having the first feature, there is further provided control means for executing:

first detecting operation for giving an indication to the excitation means so as to oscillate the oscillator in a first coordinate axis direction, and for giving an indication to the displacement detecting means so as to detect a displacement in a second coordinate axis direction of the oscillator, thus to determine an angular velocity component about a third coordinate axis on the basis of the detected displacement;

a second detecting operation for giving an indication to the excitation means so as to oscillate the oscillator in the second coordinate axis direction, and for giving an indication to the displacement detecting means so as to detect a displacement in a third coordinate axis direction of the oscillator, thus to determine an angular velocity component about a first coordinate axis on the basis of the detected displacement; and a third detecting operation for giving an indication to the excitation means so as to oscillate the oscillator in the third coordinate axis direction, and for giving an indication to the displacement detecting means so as to detect a displacement in the first coordinate axis direction of the oscillator, thus to determine an angular velocity component about the second coordinate axis on the basis of the detected displacement.

(3) The third feature of this invention resides in that, in the above-described multi-axial angular velocity sensor having the second feature, the control means is caused to further execute a fourth detecting operation for giving an indication to the excitation means so as not to oscillate the oscillator in any direction, and for giving an indication to the displacement detecting means so as to detect displacements in all the first to third coordinate axial directions of the oscillator, thus to determine acceleration components exerted in respective coordinate axial directions on the basis of the detected displacements.

(4) The fourth feature of this invention resides in that, in a multi-axial angular velocity sensor for detecting angular velocity components about respective coordinate axes in a three-dimensional coordinate system, there are provided:

a flexible substrate having flexibility;

a fixed substrate disposed so as to oppose the flexible substrate with a predetermined distance therebetween above the flexible substrate;

an oscillator fixed on the lower surface of the flexible substrate;

a sensor casing for supporting the flexible substrate and the fixed substrate and accommodating the oscillator therewithin;

excitation means for oscillating the oscillator in respective coordinate axial directions; and displacement detecting means for detecting displacements in respective coordinate axial directions of the oscillator.

(5) The fifth feature of this invention resides in that, in a multi-axial angular velocity sensor for detecting angular velocity components about respective coordinate axes in a three-dimensional coordinate system, there are provided:

a flexible substrate having flexibility;

a fixed substrate disposed so as to oppose the flexible substrate with a predetermined distance therebetween above the flexible substrate;

an oscillator fixed on the lower surface of the flexible substrate;

a sensor casing for supporting the flexible substrate and the fixed substrate and accommodating the oscillator therewithin;

a plurality of lower electrodes formed on the upper surface of the flexible substrate;

a plurality of upper electrodes formed on the lower surface of the fixed substrate and disposed at positions respectively opposite to the plurality of lower electrodes;

means for applying an a.c. signal across a predetermined pair of lower and upper electrodes opposite to each other to thereby oscillate the oscillator in respective coordinate axial directions; and means for determining an electrostatic capacitance between the predetermined pair of lower and upper electrodes opposite to each other to thereby detect displacements in respective coordinate axial directions of the oscillator.

(6) The sixth feature of this invention resides in that, in the above-described multi-axial angular velocity sensor having the fifth feature, an XYZ three-dimensional coordinate system such that an X-axis and a Y-axis intersect with each other on a plane in parallel to the principal surface of the flexible substrate is defined; and a first lower electrode and a first upper electrode are disposed in the positive region of the X-axis, a second lower electrode and a second upper electrode are disposed in the negative region of the X-axis, a third lower electrode and a third upper electrode are disposed in the positive region of the Y-axis, a fourth lower electrode and a fourth upper electrode are disposed in the negative region of the Y-axis, and a fifth lower electrode and a fifth upper electrode are arranged at a position corresponding to the origin.

(7) The seventh feature of this invention resides in that, in the above-described multi-axial angular velocity sensor having the sixth feature, there is further provided control means for executing:

a first detecting operation for applying an a.c. signal across the fifth lower electrode and the fifth upper electrode to determine, with the oscillator being oscillated in a Z-axis direction, a difference between an electrostatic capacitance between the third lower electrode and the third upper electrode and an electrostatic capacitance between the fourth lower electrode and the fourth upper electrode, thus to detect an angular velocity component about the X-axis on the basis of this difference;

a second detecting operation for applying a.c. signals having phases opposite to each other across the first lower electrode and the first upper electrode and across the second lower electrode and the second upper electrode to determine, with the oscillator being oscillated in the X-axis direction, an electrostatic capacitance between the fifth lower electrode and the fifth upper electrode, thus to detect an angular velocity component about the Y-axis on the basis of this electrostatic capacitance; and a third detecting operation for applying a.c. signals having phases opposite to each other across the third lower electrode and the third upper electrode and across the fourth lower electrode and the fourth upper electrode to determine, with the oscillator being oscillated in the Y-axis direction, a difference between an electrostatic capacitance between the first lower electrode and the first upper electrode and an electrostatic capacitance between the second lower electrode and the second upper electrode, thus to detect an angular velocity component about the Z-axis on the basis of the difference.

(8) The eighth feature of this invention resides in that, in the above-described multi-axial angular velocity sensors having the fifth to seventh features, arrangement of electrodes is changed. Namely, the eight feature resides in that:

an XYZ three-dimensional coordinate system such that the X-axis and the Y-axis intersect with each other on a plane in parallel to the principal surface of the flexible substrate is defined; and the first lower electrode and the first upper electrode are disposed in the first quadrant region with respect to the XY plane, the second lower electrode and the second upper electrode are disposed in the second quadrant region with respect to the XY plane, the third lower electrode and the third upper electrode are disposed in the third quadrant region with respect to the XY plane, the fourth lower electrode and the fourth upper electrode are disposed in the fourth quadrant region with respect to the XY plane, and the fifth lower electrode and the fifth upper electrode are disposed at a position corresponding to the origin.

(9) The ninth feature of this invention resides in that, in the above-described multi-axial angular velocity sensors having the fifth to the eight features, piezo-resistance elements are disposed on the flexible substrate, and means for detecting changes in resistance values of these piezo-resistance elements is provided in place of means for detecting electrostatic capacitance, thus to detect displacements in respective coordinate axial directions of the oscillator by changes of the resistance values.

(10) The tenth feature of this invention resides in that, in the above-described multi-axial angular velocity sensors having the fifth to the eight features, piezoelectric elements are interposed between respective upper electrodes and respective lower electrodes to deliver an a.c. signal to these piezoelectric elements to thereby oscillate the oscillator in respective coordinate axial directions, and to detect voltages produced by these piezoelectric elements to thereby detect displacements in respective coordinate axial directions of the oscillator.

(11) The eleventh feature of this invention resides in that, in a multi-axial angular velocity sensor for detecting angular velocity components about respective coordinate axes in a three-dimensional coordinate system, there are provided:

a piezoelectric element in a plate form;

a plurality of upper electrodes formed on the upper surface of the piezoelectric element;

a plurality of lower electrodes formed on the lower surface of the piezoelectric element and disposed at positions respectively opposite to the plurality of upper electrodes;

a flexible substrate fixed on the lower surface of the lower electrode and having flexibility;

an oscillator fixed on the lower surface of the flexible substrate;

a sensor casing for supporting the flexible substrate and accommodating the oscillator therewithin;

means for applying an a.c. signal across a predetermined pair of lower and upper electrodes opposite to each other to thereby oscillate the oscillator in respective coordinate axial directions; and means for measuring a voltage produced across the predetermined pair of lower and upper electrodes opposite to each other to thereby detect displacements in respective coordinate axial directions of the oscillator.

(12) The twelfth feature of this invention resides in that, in the above-described multi-axial angular velocity sensor utilizing piezoelectric element, the polarization characteristic of the piezoelectric element is partially inverted.

(13) The thirteenth feature of this invention resides in that, in the above-described multi-axial angular velocity sensor utilizing piezoelectric element, a plurality of piezoelectric elements physically divided are used.

(14) The fourteenth feature of this invention resides in that, in the above-described respective multi-axial angular velocity sensors, either one group of the plural lower electrodes or the plural upper electrodes is constituted with a single electrode layer.

(15) The fifteenth feature of this invention resides in that, in the above-described multi-axial angular velocity sensor having the fourteenth feature, the flexible substrate or the fixed substrate is constituted with a conductive material, and the conductive substrate itself is used as a single electrode layer.

(16) The sixteenth feature of this invention resides in that, in a multi-axial angular velocity sensor for detecting angular velocity components about respective coordinate axes in a three-dimensional coordinate system, there are provided:

an oscillator comprised of a magnetic material, which is disposed at the origin position of the coordinate system;

a sensor casing for accommodating the oscillator therewithin;

connection means for connecting the oscillator to the sensor casing in the state having a degree of freedom such that it can move in respective coordinate axial directions;

a first coil pair attached to the sensor casing at positive and negative positions of a first coordinate axis of the coordinate system;

a second coil pair attached to the sensor casing at positive and negative positions of a second coordinate axis of the coordinate system;

a third coil pair attached to the sensor casing at positive and negative positions of a third coordinate axis of the coordinate system;

excitation means for delivering a predetermined an a.c. signal to the respective coil pairs to thereby oscillate the oscillator in respective coordinate axes directions; and displacement detecting means for detecting displacements in respective coordinate axes directions of the oscillator on the basis of changes in impedance of respective coil pairs.

(17) The seventeenth feature of this invention resides in that, in the above-described multi-axial angular velocity sensor having the sixteenth feature, there is further provided control means for executing:

a first detecting operation for delivering an a.c. signal to the first coil pair to determine a change of impedance of the second coil pair with the oscillator being oscillated in the first axial direction to detect an angular velocity component about the third axis on the basis of the change of impedance;

a second detecting operation for delivering an a.c. signal to the second coil pair to determine a change of impedance of the third coil pair with the oscillator being oscillated in the second axial direction to detect an angular velocity component about the first axis on the basis of the change of impedance; and a third detecting operation for delivering an a.c. signal to the third coil pair to determine a change of impedance of the first coil pair with the oscillator being oscillated in the third axial direction to detect an angular velocity component about the second axis on the basis of the change of impedance.

(18) The eighteenth feature of this invention resides in that, in a multi-axial angular velocity sensor for detecting angular velocity components about at least two coordinate axes in a three-dimensional coordinate system, there are provided:

an oscillator having mass;

a sensor casing for accommodating the oscillator therewithin;

connection means for connecting the oscillator to the sensor casing in the state having a degree of freedom such that it can move in respective three coordinate axial directions;

excitation means for oscillating the oscillator in at least two coordinate axial directions; and displacement detecting means for detecting displacements in at least two coordinate axial directions of the oscillator.

(19) The nineteenth feature of this invention resides in that, in the above-described multi-axial angular velocity sensor having the eighteenth feature, there is provided control means for executing:

a first detecting operation for giving an indication to the excitation means so as to oscillate the oscillator in the first coordinate axis direction, and for giving an indication to the displacement detecting means so as to detect a displacement in the second coordinate axis direction of the oscillator, thus to determine an angular velocity component about the third coordinate axis on the basis of the detected displacement; and a second detecting operation for giving an indication to the excitation means so as to oscillate the oscillator in the second coordinate axis direction, and for giving an indication to the displacement detecting means so as to detect a displacement in the third coordinate axis direction of the oscillator, thus to determine an angular velocity component about the first coordinate axis on the basis of the detected displacement.

(20) The twentieth feature of this invention resides in that, in a multi-axial angular velocity sensor for detecting angular velocity components about two coordinate axes in a three-dimensional coordinate system, there are provided:

an oscillator having mass;

a sensor casing for accommodating the oscillator therewithin;

connection means for connecting the oscillator to the sensor casing in the state having a degree of freedom such that it can move in respective three coordinate axial directions;

excitation means for oscillating the oscillator in the first coordinate axis direction; and displacement detecting means for detecting displacements in the second coordinate axis direction and in the third coordinate axis direction of the oscillator, to determine an angular velocity component about the third coordinate axis on the basis of the displacement in the second coordinate axis direction detected by the displacement detecting means, and to determine an angular velocity component about the second coordinate axis on the basis of the displacement in the third coordinate axis direction detected by the displacement detecting means.

(21) The twenty first feature of this invention resides in that, in a multi-axial angular velocity sensor for detecting angular velocity components about two coordinate axes in a three-dimensional coordinate system, there are provided:

an oscillator having mass;

a sensor casing for accommodating the oscillator therewithin;

connection means for connecting the oscillator to the sensor casing in the state having a degree of freedom such that it can move in three coordinate axial directions;

excitation means for oscillating the oscillator in the first coordinate axis direction and in the second coordinate axis direction; and displacement detecting means for detecting a displacement in the third coordinate axis direction of the oscillator, to determine an angular velocity component about the second coordinate axis on the basis of the displacement in the third coordinate axis direction detected by the displacement detecting means when the oscillator is oscillating in the first coordinate axis direction, and to determine an angular velocity component about the first coordinate axis on the basis of the displacement in the third coordinate axis direction detected by the displacement detecting means when the oscillator is oscillating in the second coordinate axis direction.

(22) The twenty second feature of this invention resides in that, in a multi-axial angular velocity sensor for detecting angular velocity components about respective coordinate axes in a three-dimensional coordinate system, there are provided:

an oscillator having mass;

a sensor casing for accommodating the oscillator therewithin;

connection means for connecting the oscillator to the sensor casing in the state having a degree of freedom such that it can move in respective three coordinate axes directions;

excitation means for oscillating the oscillator in the first coordinate axis direction and in the second coordinate direction; and displacement detecting means for detecting a displacement in the second coordinate axis direction and a displacement in the third coordinate axis direction of the oscillator, to determine an angular velocity component about the third coordinate axis on the basis of the displacement in the second coordinate axis direction detected by the displacement detecting means when the oscillator is oscillating in the first coordinate axis direction, to determine an angular velocity component about the second coordinate axis on the basis of the displacement in the third coordinate axis direction detected by the displacement detecting means when the oscillator is oscillating in the first coordinate axis direction, and to determine an angular velocity component about the first coordinate axis on the basis of the displacement in the third coordinate axis direction detected by the displacement detecting means when the oscillator is oscillating in the second coordinate axis direction.

BRIEF DESCRIPTION OF THE DRAWINGS

FIGS. 49(*a*) and 49(*b*) are views showing a polarization characteristic opposite to the polarization characteristic shown in FIGS. 43(*a*) and 43(*b*).

FIG. 50 is a plan view showing a distribution of the polarization characteristics of a piezoelectric element used in the first modification of the multi-axial angular velocity sensor shown in FIG. 42.

BEST MODE FOR CARRYING OUT THE INVENTION

§0 Fundamental Principle

<0.1> Uni-axial Angular Velocity Sensor

Figure 1:
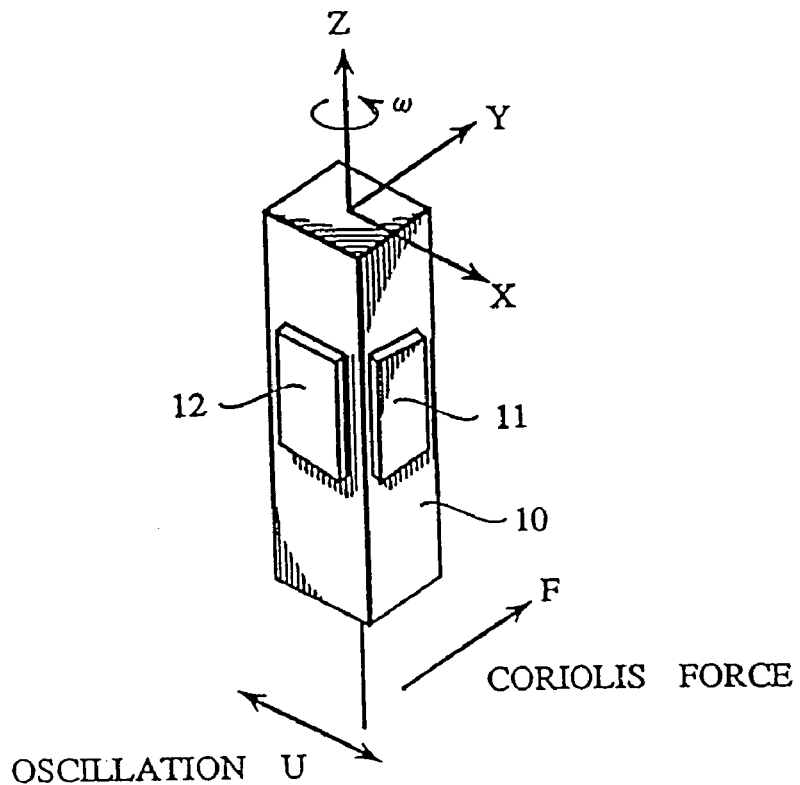
FIG. 1 is a perspective view showing the fundamental principle of an one-dimensional angular velocity sensor utilizing Coriolis force conventionally proposed.

Initially, the detection principle of angular velocity by a uni-axial angular velocity sensor which forms the foundation of a multi-axial angular velocity sensor according to this invention will be briefly described. FIG. 1 is a view showing the fundamental principle of an angular velocity sensor disclosed in Magazine "THE INVENTION" complied under the supervision of the Japanese Patent Office, vol. 90, No. 3 (1993), page 60. An oscillator 10 in a square pillar is prepared and consideration is now made in connection with an XYZ three-dimensional coordinate system in which X-, Y- and Z-axes are defined in directions as shown. In such a system, in the case where oscillator 10 is carrying out rotational movement at an angular velocity $\omega$ with the Z-axis being as the axis of rotation, it is known that a phenomenon as described below takes place. Namely, when the oscillator 10 is caused to produce such an oscillation U to reciprocate it in the X-axis direction, a Coriolis force F takes place in the Y-axis direction. In other words, when oscillator 10 is rotated with the Z-axis being as a center axis in the state where it is oscillated along the X-axis of the figure, Coriolis force F is to be produced in the Y-axis direction. This phenomenon is the dynamical phenomenon known for long as Foucault's pendulum. A Coriolis force F produced is expressed as follows:

$$F=2m\cdot v\cdot \omega$$

In the above expression, m is a mass of oscillator 10, v is an instantaneous velocity with respect to oscillation of the oscillator 10, and $\omega$ is an instantaneous angular velocity of the oscillator 10.

The uni-axial angular velocity sensor disclosed in the previously described magazine serves to detect an angular velocity $\omega$ by making use of the above phenomenon. Namely, as shown in FIG. 1, a first piezoelectric element 11 is attached on a first surface of the oscillator 10 in a square pillar form, and a second piezoelectric element 12 is attached on a second surface perpendicular to the first surface. As the piezoelectric elements 11, 12, an element in a plate form comprised of piezoelectric ceramic is used. In order to allow the oscillator 10 to produce oscillation U, the piezoelectric element 11 is utilized. Further, in order to detect a Coriolis force F produced, the piezoelectric element 12 is utilized. Namely, when an a.c. voltage is applied to the piezoelectric element 11, this piezoelectric element 11 repeats expansive and contractive movements and oscillates in the X-axis direction. This oscillation U is transmitted to the oscillator 10, so the oscillator 10 oscillates in the X-axis direction. As stated above, when the oscillator 10 itself rotates at an angular velocity $\omega$ with the Z-axis being as a center axis in the state where the oscillator 10 is caused to undergo oscillation U, a Coriolis force F is produced in the Y-axis direction by the above-described phenomenon. Since this Coriolis force F is exerted in a thickness direction of the piezoelectric element 12, a voltage V proportional to the Coriolis force F is produced across both the surfaces of the piezoelectric element 12. Accordingly, by measuring this voltage V, it becomes possible to detect angular velocity $\omega$.

<0.2> Multi-axial Angular Velocity Sensor

Figure 2:
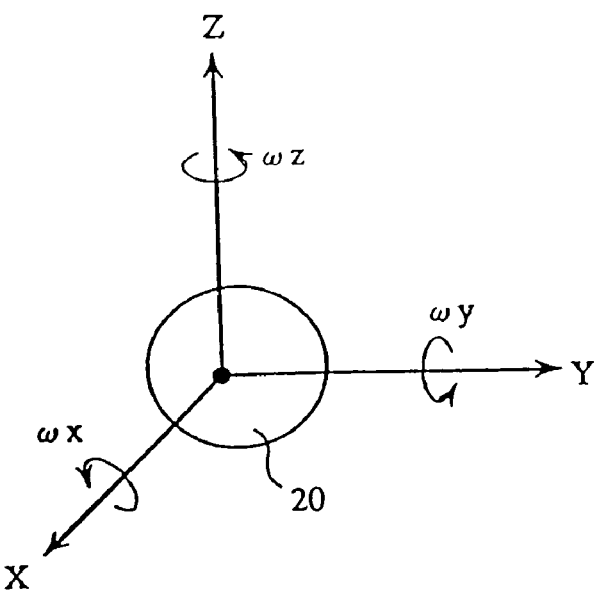
FIG. 2 is a view showing angular velocity components about respective axes in an XYZ three-dimensional coordinate system, which are to be detected in this invention.
Figure 3:
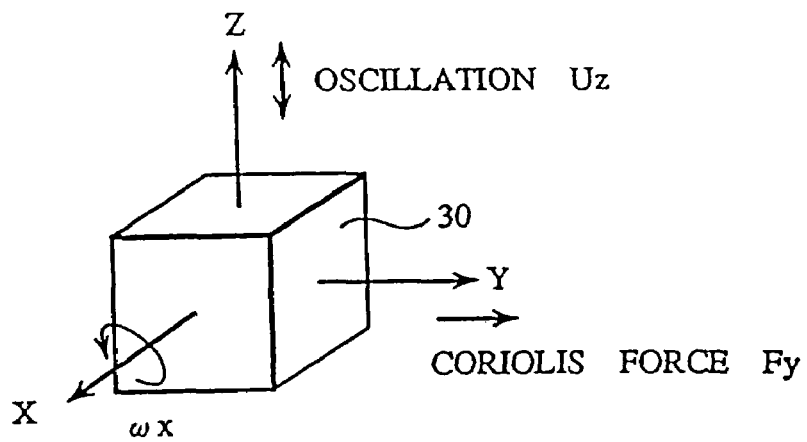
FIG. 3 is a view for explaining the fundamental principle for detecting an angular velocity component ωx about the X-axis by this invention.
Figure 4:
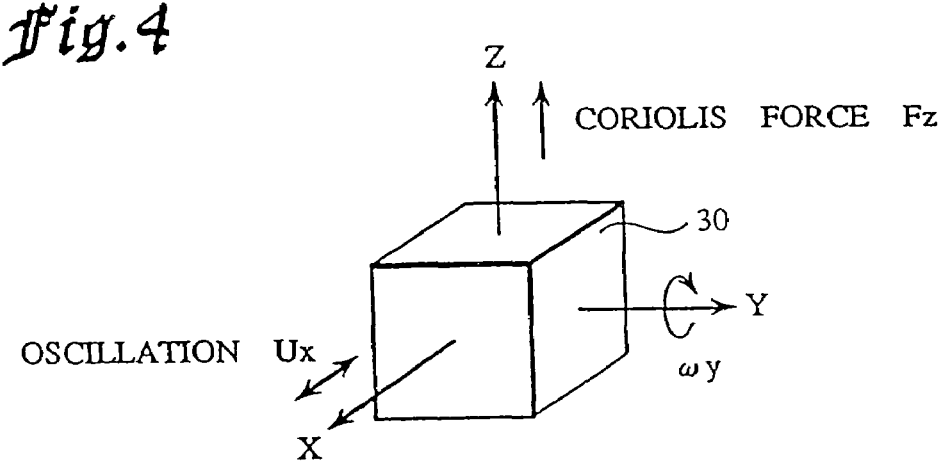
FIG. 4 is a view for explaining the fundamental principle for detecting an angular velocity component ωy about the Y-axis by this invention.

The above-described conventional angular velocity sensor serves to detect an angular velocity component about the Z-axis, and this sensor is therefore unable to detect an angular velocity component about the X-axis or the Y-axis. This invention contemplates providing, as shown in FIG. 2, a multi-axial angular velocity sensor capable of independently detecting an angular velocity component $\omega x$ about the X-axis, an angular velocity component $\omega y$ about the Y-axis, and an angular velocity component $\omega z$ about the Z-axis in the XYZ three-dimensional coordinate system with respect to a predetermined object 20. The fundamental principle thereof will now be described with reference to FIGS. 3 to 5. It is now assumed that an oscillator 30 is placed at the origin position of XYZ three-dimensional coordinate system. In order to detect angular velocity component $\omega x$ about the X-axis of the oscillator 30, it is sufficient to measure a Coriolis force Fy produced in the Y-axis direction when the oscillator 30 is caused to undergo oscillation Uz in the Z-axis direction as shown in FIG. 3. The Coriolis force Fy takes a value proportional to angular velocity component $\omega x$. Further, in order to detect angular velocity $\omega y$ about the Y-axis of the oscillator 30, it is sufficient to measure a Coriolis force Fz produced in the Z-axis direction when the oscillator 30 is caused to undergo oscillation Ux in the X-axis direction as shown in FIG. 4. The Coriolis force Fz takes a value proportional to angular velocity $\omega y$. In addition, in order to detect angular velocity component $\omega z$ about the Z-axis of the oscillator 30, it is sufficient to measure a Coriolis force Fx produced in the X-axis direction when the oscillator 30 is caused to undergo oscillation Uy in the Y-axis direction. The Coriolis force Fx takes a value proportional to angular velocity $\omega z$.

Eventually, in order to detect angular velocity components every respective axes in the XYZ three-dimensional coordinate system, the mechanism for oscillating the oscillator 30 in the X-axis direction, the mechanism for oscillating it in the Y-axis direction, and the mechanism for oscillating it in the Z-axis direction; and the mechanism for detecting Coriolis force Fx in the X-axis direction exerted on the oscillator 30, the mechanism for detecting Coriolis force Fy in the Y-axis exerted thereon, and the mechanism for detecting Coriolis force Fz in the Z-axis exerted thereon are required.

<0.3> Oscillation Mechanism/Detection Mechanism

As described above, in the multi-axial angular velocity sensor according to this invention, the mechanism for oscillating the oscillator in a specific coordinate axis direction, and the mechanism for detecting a Coriolis force in a specific coordinate axis direction exerted on the oscillator are required. As the oscillation mechanism, respective mechanism as described below may be utilized.

(1) Mechanism Utilizing Coulomb Force:

A first electrode and a second electrode are respectively formed on the oscillator side and on the sensor casing side to dispose a pair of electrodes in a manner opposite to each other. If charges of the same polarity are delivered to the both electrodes, a repulsive force is exerted. In contrast, if charges of different polarities are delivered, an attractive force is exerted. Accordingly, when an approach is employed to allow the both electrodes to interchangeably undergo repulsive force and attractive force exerted therebetween, the oscillator oscillates relative to the sensor casing.

(2) Mechanism Utilizing Piezoelectric Element:

This mechanism is the mechanism used in the uni-axial angular velocity sensor shown in FIG. 1. By applying an a.c. voltage across the piezoelectric element 11, the oscillator 10 is oscillated.

(3) Mechanism Utilizing Electromagnetic Force:

An oscillator comprised of a magnetic material is used and a coil is disposed on the sensor casing side to allow a current to flow in the coil to exert an electromagnetic force thereon to oscillate the oscillator.

On the other hand, as the mechanism for detecting Coriolis force, respective mechanism as described below may be utilized.

(1) Mechanism Utilizing Change of the Electrostatic Capacitance:

A first electrode and a second electrode are respectively formed on the oscillator side and on the sensor casing side to dispose a pair of electrodes in a manner opposite to each other. When a Coriolis force is applied to the oscillator, so displacement takes place, the spacing (distance) between the both electrodes varies. For this reason, the electrostatic capacitance value of an electrostatic capacitance element constituted by the both electrodes varies. By measuring a change of the capacitance value, the applied Coriolis force is detected.

(2) Mechanism Utilizing Piezoelectric Element:

This mechanism is the mechanism used in the uni-axial angular velocity sensor shown in FIG. 1. When a Coriolis force F is applied to the piezoelectric element 12, the piezoelectric element 12 produces a voltage proportional to the Coriolis force F. By measuring the voltage thus produced, the applied Coriolis force is detected.

(3) Mechanism Utilizing Differential Transformer:

An oscillator comprised of a magnetic material is used and a coil is disposed on the sensor casing side. When a Coriolis force is applied to the oscillator, so any displacement takes place, the distance between the oscillator and the coil varies. For this reason, inductance of the coil varies. By measuring a change of the inductance, the applied Coriolis force is detected.

(4) Mechanism Utilizing Piezo-resistance Element:

A substrate such that bending takes place when a Coriolis force is applied thereto is provided. A piezo-resistance element is formed on the substrate to detect a bending produced in the substrate as a change of the resistance value of the piezo-resistance element. Namely, by measuring a change of the resistance value, the applied Coriolis force is detected.

While the fundamental principle of the multi-axial angular velocity sensor according to this invention has been briefly described, more practical examples of sensors of a simple structure operative on the basis of such fundamental principle will now be described below.

§1 First Embodiment

<1.1> Structure of Sensor According to First Embodiment

A multi-axial angular velocity sensor according to the first embodiment of this invention will be first described. The sensor of the first embodiment is a sensor in which a mechanism utilizing Coulomb force is used as the oscillation mechanism and a mechanism utilizing change of electrostatic capacitance is used as the detection mechanism.

Figure 6:
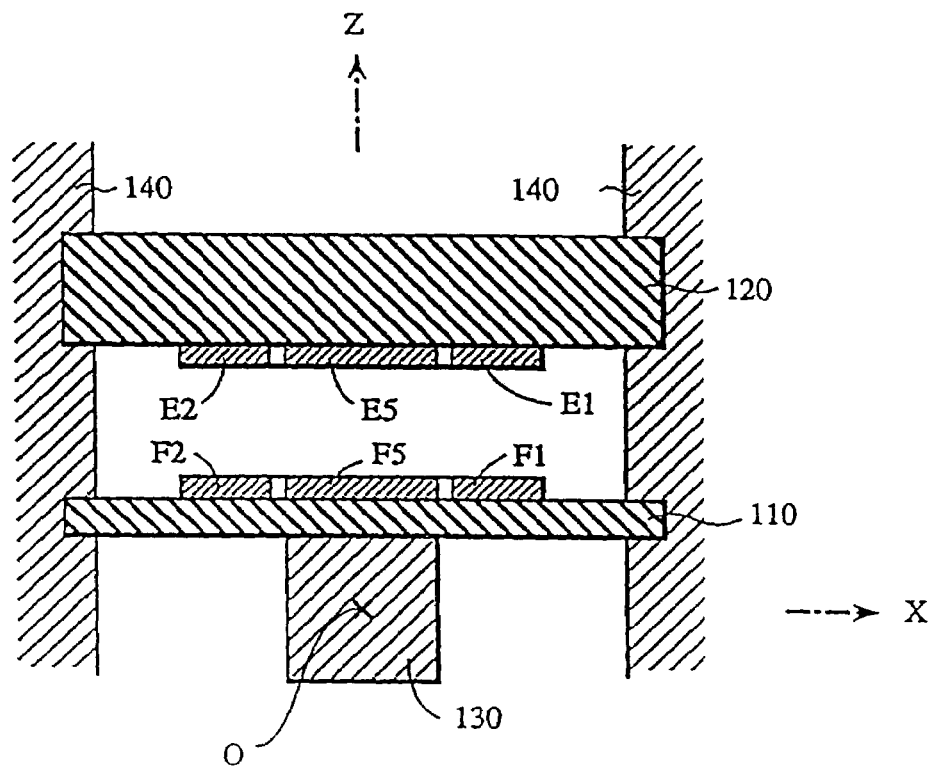
FIG. 6 is a side cross sectional view showing the structure of a multi-axial angular velocity sensor according to a first embodiment of this invention.

FIG. 6 is a side cross sectional view of the multi-axial angular velocity sensor according to the first embodiment. A flexible substrate 110 and a fixed substrate 120 are both a disk-shaped substrate, and are disposed in parallel to each other with a predetermined spacing (distance) therebetween. On the lower surface of the flexible substrate 110, a columnar oscillator 130 is fixed. Further, the outer circumferential portion of the flexible substrate 110 and the outer circumferential portion of the fixed substrate 120 are both supported by a sensor casing 140. On the lower surface of the fixed substrate 120, five upper electrode layers E1 to E5 (only a portion thereof is indicated in FIG. 6) are formed. Similarly, on the upper surface of the flexible substrate 110, five lower electrode layers F1 to F5 (only a portion thereof is also indicated) are formed. In this embodiment, the fixed substrate 120 has sufficient rigidity, so there is no possibility that bending may take place. On the other hand, since the flexible substrate 110 has flexibility, it functions as so called a diaphragm. The oscillator 130 is constituted with a material having a weight sufficient to produce a stable oscillation. For convenience of explanation, consideration will be made in connection with an XYZ three-dimensional coordinate system in which the gravity position O of oscillator 130 is assumed as the origin. Namely, X-axis is defined in a right direction of the figure, Z-axis is defined in an upper direction thereof, and Y-axis is defined in a direction perpendicular to plane surface of paper. It can be said that FIG. 6 is a cross sectional view cut along the XZ plane of the sensor. It is to be noted that, in this embodiment, the flexible substrate 110 and the fixed substrate 120 are both constituted by an insulating material. In the case where there is a necessity of constituting these substrates with a conductive material such as metal, etc., it is sufficient to form respective electrode layers through insulating films so that these electrode layers are not short-circuited.

Figure 7:
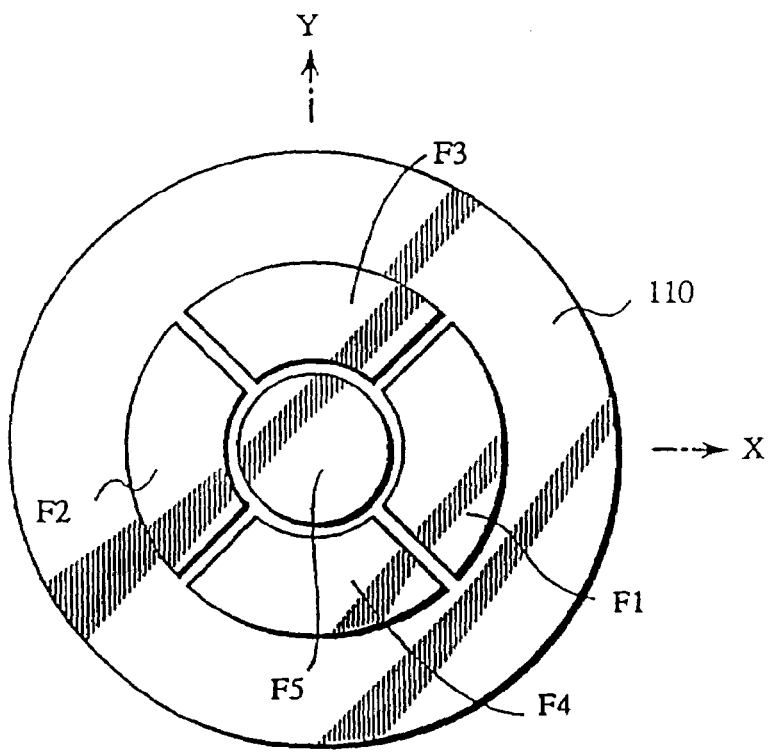
FIG. 7 is a top view of flexible substrate 110 of the multi-axial angular velocity sensor shown in FIG. 6.
Figure 8:
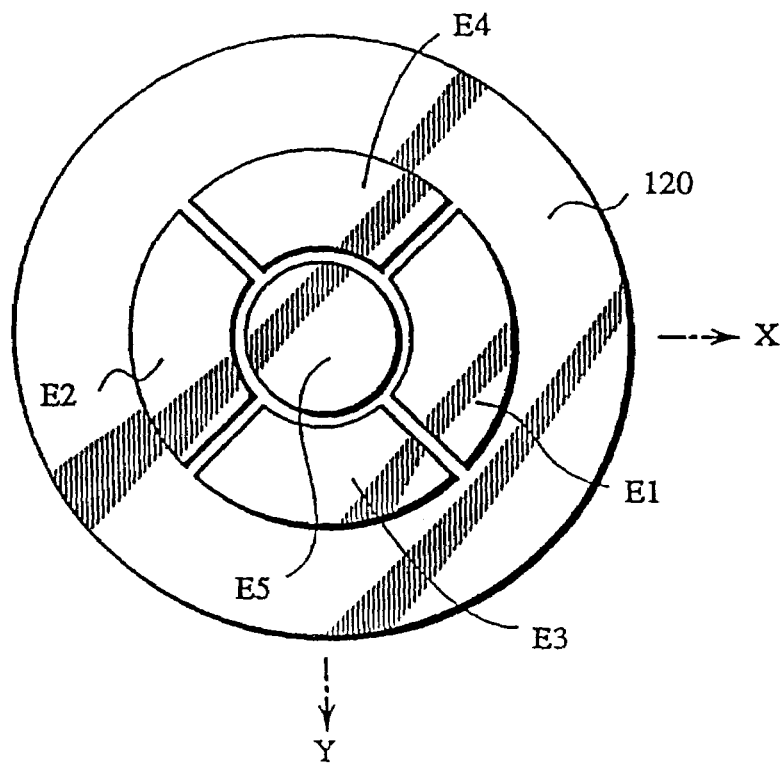
FIG. 8 is a bottom view of fixed substrate 120 of the multi-axial angular velocity sensor shown in FIG. 6.

The shape and the arrangement of the lower electrode layers F1 to F5 are clearly shown in FIG. 7. FIG. 7 is a top view of the flexible substrate 110, and the manner how fan-shaped lower electrode layers F1 to F4 and a circular lower electrode layer F5 are arranged is clearly shown. On the other hand, the shape and the arrangement of the upper electrode layers E1 to E5 are clearly shown in FIG. 8. FIG. 8 is a bottom view of the fixed substrate 120, and the manner how fan-shaped upper electrode layers E1 to E4 and a circular upper electrode layer E5 are arranged is clearly shown. The upper electrode layers E1 to E5 and the lower electrode layers F1 to F5 have the same shape, and are formed at positions opposite to each other, respectively. Accordingly, electrostatic capacitance elements are formed by corresponding pairs of opposite electrode layers. Eventually, five electrostatic capacitance elements in total are formed. These electrostatic capacitance elements are called electrostatic capacitance elements C1 to C5. For example, an element formed by the upper electrode layer E1 and the lower electrode layer F1 is called an electrostatic capacitance element C1.

<1.2> Oscillation Mechanism of Oscillator

Figure 9:
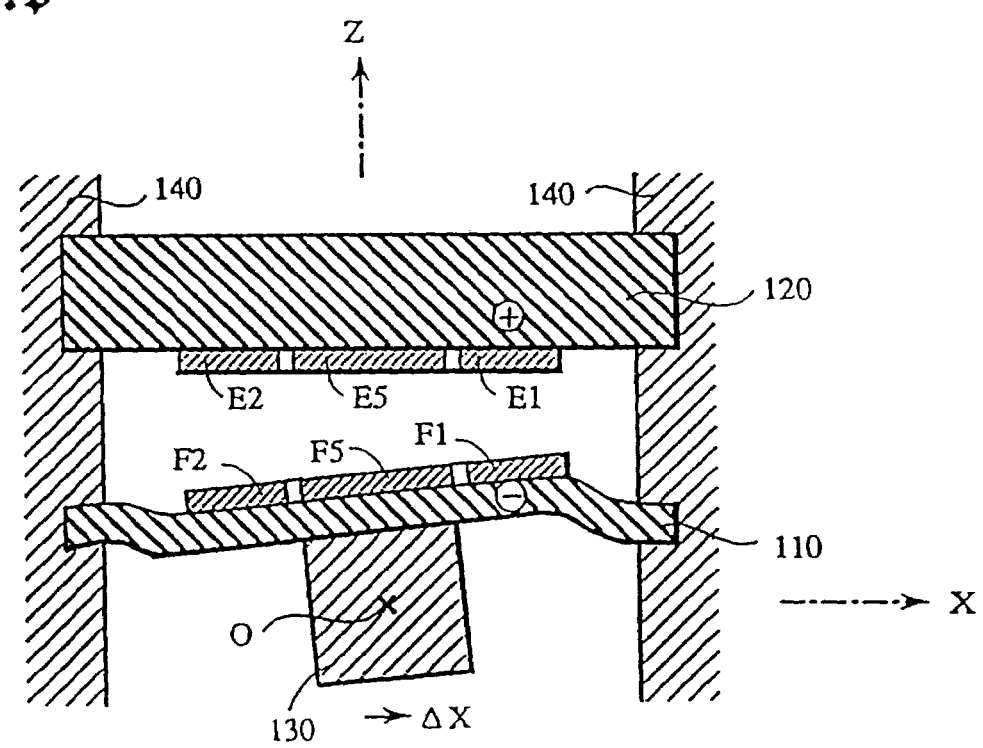
FIG. 9 is a side cross sectional view showing the state where oscillator 130 in the multi-axial angular velocity sensor shown in FIG. 6 is caused to undergo displacement in the X-axis direction.

Let now study what phenomenon takes place in the case where a voltage is applied across a predetermined pair of electrodes of the sensor. First, consideration will be made in the case where a predetermined voltage is applied across the electrode layers E1, F1. For example, as shown in FIG. 9, when a voltage is applied so that the electrode layer E1 side is positive and the electrode layer F1 side is negative, the both electrode layers undergo an attractive force based on Coulomb force exerted therebetween. As previously described, flexible substrate 110 is a substrate having flexibility. Accordingly, bending takes place by such an attractive force. Namely, as shown in FIG. 9, the flexible substrate 110 is mechanically deformed so that the distance between the electrode layers E1, F1 across which voltage is applied is contracted. When such a mechanical deformation takes place in the flexible substrate 110, oscillator 130 produces a displacement by ΔX in the positive direction of the X-axis.

Figure 10:
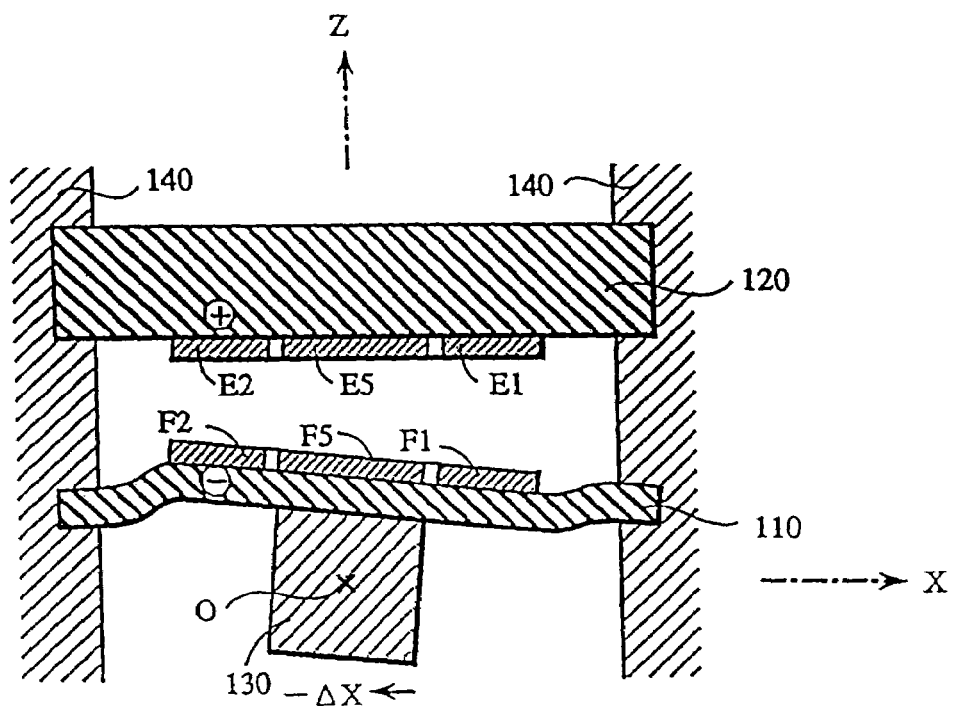
FIG. 10 is a side cross sectional view showing the state where oscillator 130 in the multi-axial angular velocity sensor shown in FIG. 6 is caused to undergo displacement in the X axis direction.

Consideration will be then made in the case where a predetermined voltage is applied across the electrode layers E2, F2. For example, as shown in FIG. 10, when a voltage is applied so that the electrode layer E2 side is positive and the electrode F2 side is negative, these electrodes undergo an attractive force exerted therebetween. Thus, the flexible substrate 110 is mechanically deformed so that the distance between the electrode layers E2, F2 is contracted. As a result, the oscillator 130 produces a displacement by $-\Delta X$ in the negative direction of the X-axis. Eventually, when a voltage is applied across the electrode layers E1, F1, the oscillator 130 undergoes a displacement in the positive direction of the X-axis. On the other hand, when a voltage is applied across the electrode layers E2, F2, the oscillator 130 undergoes a displacement in the negative direction of the X-axis. Accordingly, by interchangeably carrying out application of voltage across the electrode layers E1, F1 and application of voltage across the electrode layers E2, F2, it is possible to reciprocate the oscillator 130 in the X-axis direction.

Meanwhile, as shown in FIGS. 7 and 8, the above-described electrodes E1, F1; E2, F2 are electrode layers arranged on the X-axis. On the contrary, the electrode layers E3, F3, E4, F4 are arranged on the Y-axis. Accordingly, it can be easily understood that an approach is employed to interchangeably carry out application of voltage across the electrode layers E3, F3 and application of voltage across the electrode layers E4, F4, it is possible to reciprocate the oscillator 130 in the Y-axis direction.

Figure 11:
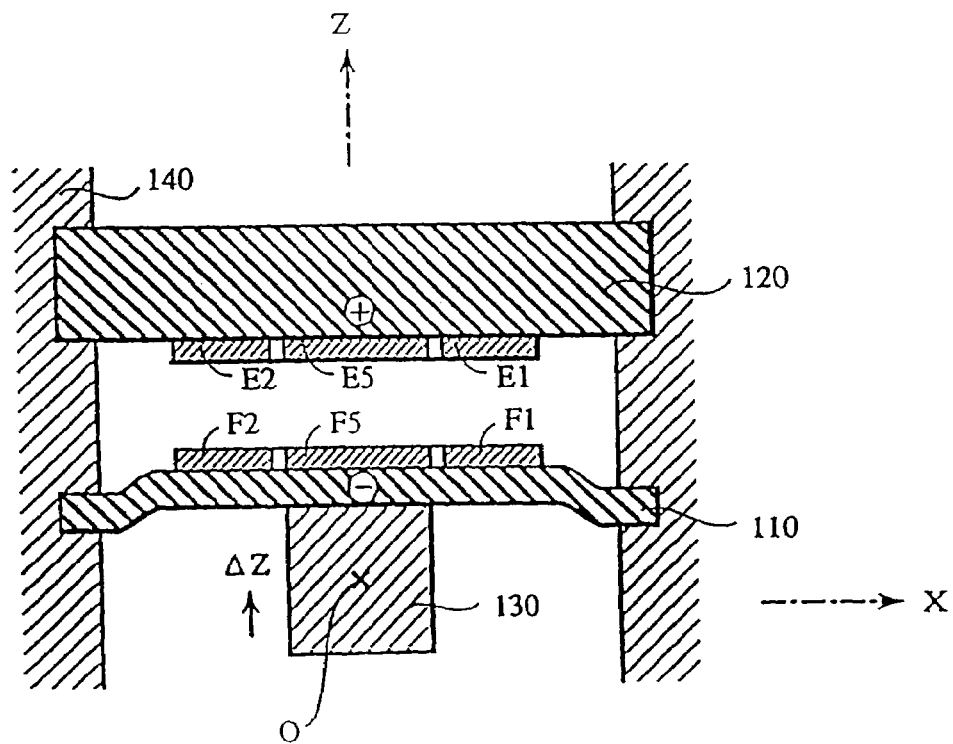
FIG. 11 is a side cross sectional view showing the state where oscillator 130 in the multi-axial velocity sensor shown in FIG. 6 is caused to undergo displacement in the Z-axis direction.

Subsequently, consideration will be made in connection with the case where a predetermined voltage is applied across electrode layers E5, F5. For example, as shown in FIG. 11, when a voltage is applied so that the electrode layer E5 side is positive and the electrode layer F5 side is negative, these electrodes undergo an attractive force exerted therebetween, so flexible substrate 110 is mechanically deformed so that the distance between the electrode layers E5, F5 is contracted. Since these electrode layers E5, F5 are both positioned at centers of respective substrates, there takes place a displacement such that the flexible substrate 110 undergoes parallel displacement in the Z-axis direction without being inclined. As a result, the oscillator 130 produces a displacement by $\Delta Z$ in the positive direction of the Z-axis. When application of voltage across the both electrode layers E5, F5 is stopped, the oscillator 130 returns to the original position (position shown in FIG. 6). Accordingly, by intermittently carrying out application of voltage across the both electrode layers E5, F5, it is possible to reciprocate the oscillator 130 in the Z-axis direction.

As stated above, when application of voltage is carried out with respect to a specific set of electrode layers at a specific timing, it is possible to oscillate the oscillator 130 along the X-axis, the Y-axis and the Z-axis. It is to be noted that while it has been described that voltage is applied so that the upper electrode layers E1 to E5 side are positive and the lower electrode layer F1 to F5 side are negative, even if the polarity is caused to be opposite to the above, an attractive force is also exerted, with the result that the same phenomenon takes place.

Figure 12:
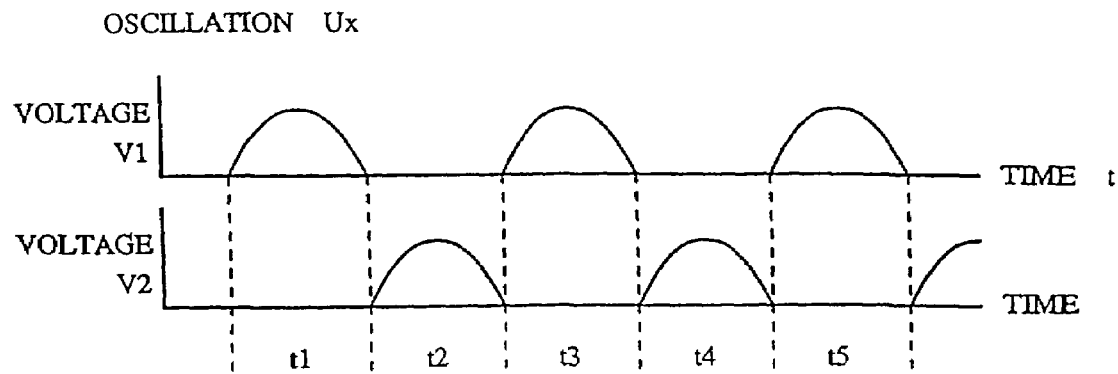
FIG. 12 is a view showing a voltage waveform supplied for allowing oscillator 130 to produce oscillation Ux in the X-axis direction in the multi-axial angular velocity sensor shown in FIG. 6.
Figure 13:
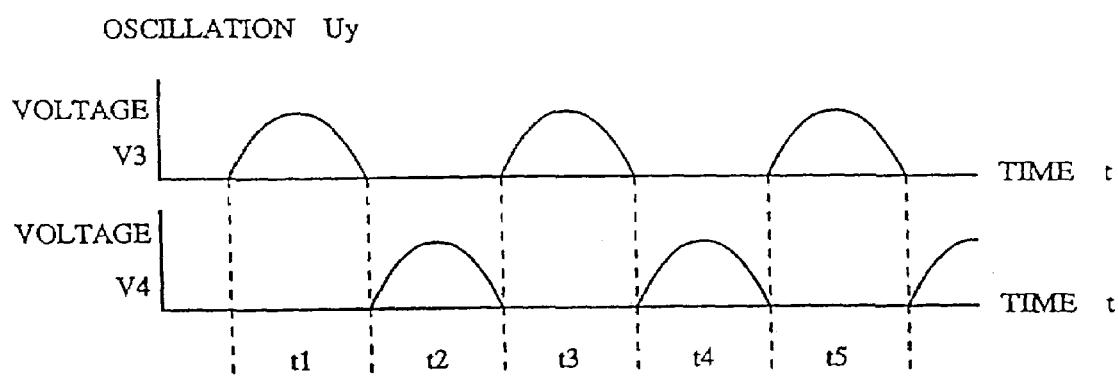
FIG. 13 is a view showing a voltage waveform supplied for allowing oscillator 130 to produce oscillation Uy in the Y-axis direction in the multi-axial angular velocity sensor shown in FIG. 6.
Figure 14:
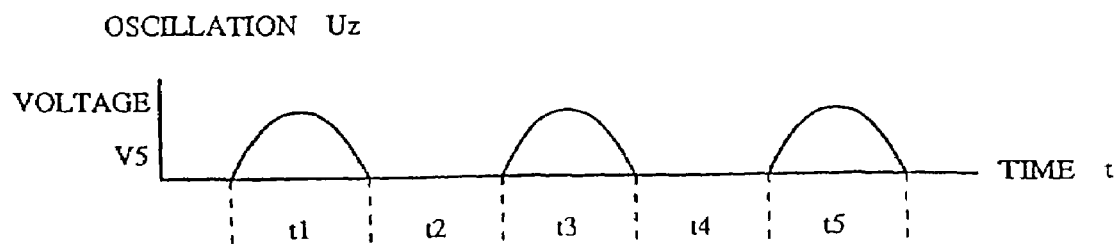
FIG. 14 is a view showing a voltage waveform supplied for allowing oscillator 130 to produce oscillation Uz in the Z-axis direction in the multi-axial angular velocity sensor shown in FIG. 6.

Eventually, in order to allow the oscillator 130 to produce oscillation Ux in the X-axis direction, it is sufficient to apply a voltage V1 having a waveform as shown in FIG. 12 across the electrode layers E1, F1, and to apply a voltage V2 having a waveform as shown in FIG. 12 across the electrode layers E2, F2. When voltages of such waveform are applied, a displacement $\Delta X$ as shown in FIG. 9 is produced in the oscillator 130 at time periods t1, t3, t5, and a displacement $-\Delta X$ as shown in FIG. 10 is produced in the oscillator 130 at time periods t2, t4. Similarly, in order to allow the oscillator 130 to produce oscillation Uy in the Y-axis direction, it is sufficient to apply a voltage V3 having a waveform as shown in FIG. 13 across the electrode layers E3, F3, and to apply a voltage V4 having a waveform as shown in FIG. 13 across the electrode layers E4, F4. In order to allow the oscillator 130 to produce oscillation Uz in the Z-axis direction, it is sufficient to apply a voltage V5 having a waveform as shown in FIG. 14 across the electrode layers E5, F5. When voltage V5 of such a waveform is applied, a displacement $\Delta Z$ as shown in FIG. 11 is produced in the oscillator 130 at time periods t1, t3, t5, and the oscillator 130 returns to the position shown in FIG. 6 by a restoring force of the flexible substrate 110 at time periods t2, t4 (At this time, a displacement $-\Delta Z$ corresponding to an inertia force is produced).

<1.3> Mechanism for Detecting Coriolis Force 1.3.1 Coriolis Force Based on Angular Velocity $\omega x$ about the X-axis Subsequently, the mechanism for detecting a Coriolis force exerted on this sensor by making use of changes of electrostatic capacitance will be described. Initially, consideration is made in connection with the phenomenon that an angular velocity $\omega x$ about the X-axis is exerted on the sensor. For example, in the case where object 20 shown in FIG. 2 is carrying out rotational movement at an angular velocity $\omega x$ about the X-axis, if this sensor is mounted on the object 20, angular velocity (component) $\omega x$ about the X-axis is exerted on the oscillator 130. Meanwhile, as explained with reference to FIG. 3, when the oscillator is caused to produce oscillation Uz in the Z-axis direction in the state where angular velocity $\omega x$ about the X-axis is exerted, a Coriolis force Fy is produced in the Y-axis direction. Accordingly, when an approach is employed to apply a voltage V5 having a waveform as shown in FIG. 14 across the electrode layers E5, F5 of this sensor, and to allow the oscillator 130 to produce oscillation Uz in the Z-axis direction, a Coriolis force Fy must be produced in the Y-axis direction.

Figure 15:
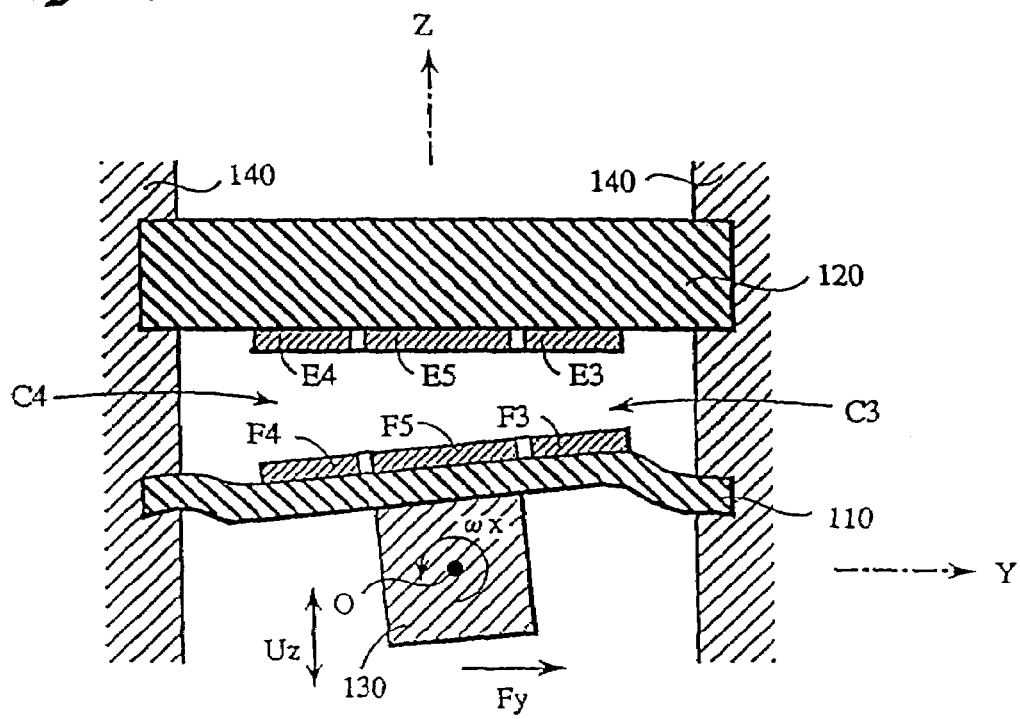
FIG. 15 is a side cross sectional view showing the phenomenon that Coriolis force Fy is produced on the basis of angular velocity component ωx when oscillator 130 is caused to produce oscillation Uz in the multi-axial angular velocity sensor shown in FIG. 6.

FIG. 15 is a side cross sectional view showing the state where a mechanical deformation is produced in the flexible substrate 110 by this Coriolis force Fy. When the oscillator 130 is oscillated in the Z-axis direction in the state where the entirety of the sensor rotates at angular velocity $\omega x$ about the X-axis (in a direction perpendicular to plane surface of the figure), a Coriolis force Fy is produced in the Y-axis direction, so a force for moving the oscillator 130 in the Y-axis direction is applied. By this force, the flexible substrate 110 is deformed as shown. Such deformation deviating in the Y-axis direction is not based on Coulomb force between electrode layers, but results from Coriolis force Fy. With respect to a voltage applied across the electrode layers, voltage V5 as shown in FIG. 14 is only applied across the electrode layers E5, F5 as described above, but any application of voltage is not carried out with respect to other pairs of electrode layers. In this case, since the Coriolis force Fy produced takes a value proportional to the angular velocity component $\omega x$, if the value of the Coriolis force Fy can be measured, it is possible to detect the angular velocity component $\omega x$.

In view of this, the Coriolis force Fy is measured in accordance with the following method by making use of a change of electrostatic capacitance. Let now consider the distances between the upper electrode layers E1 to E5 and the lower electrode layers F1 to F5. Since the oscillator 130 oscillates in upper and lower directions of FIG. 15, contraction and expansion of the distance between both the electrode layers are cyclically repeated. Accordingly, the phenomenon that capacitance values (which are assumed to be indicated by the same reference numerals C1 to C5) of the capacitance elements C1 to C5 constituted with the upper electrode layers E1 to E5 and the lower electrode layers F1 to F5 all cyclically increase or decrease will be repeated. However, a deformation deviating in the Y-axis direction always will be produced in the flexible substrate 110 by action of the Coriolis force Fy. As a result, the oscillator 130 oscillates upwardly and downwardly while such a deformed state is kept. Namely, the electrode spacing (distance) of the capacitance element C3 is always smaller than the electrode spacing (distance) of the capacitance element C4. Between the capacitance value C3 and the capacitance value C4, the relationship expressed as C3>C4 always holds. Since a difference ΔC34 between the capacitance values C3 and C4 is dependent upon the degree of deviation in the Y-axis direction, it provides a value indicating the magnitude of the Coriolis force Fy. In other words, the greater the Coriolis force Fy is, the greater the difference ΔC34 is.

Summary of the procedure for detecting angular velocity (component) ωx about the X-axis described above is as follows. First, a voltage V5 of a waveform as shown in FIG. 14 is applied across the electrode layers E5, F5 to allow oscillator 130 to produce oscillation Uz in the Z-axis direction, thus to determine a capacitance value difference ΔC34 between the capacitance elements C3, C4 at that time point. The difference ΔC34 determined in this way indicates a detected value of angular velocity component ωx to be determined. Since the electrode layers E5, F5 used for producing oscillation and the electrode layers E3, F3; E4, F4 used for measuring capacitance value differences are electrically completely independent, there is no possibility that any interference may take place between the oscillation mechanism and the detection mechanism.

1.3.2 Coriolis Force Based on Angular Velocity ωy about the Y-axis

Let consider the phenomenon in the case where angular velocity ωy about the Y-axis is exerted on this sensor. As explained with reference to FIG. 4, when the oscillator is caused to produce oscillation Ux in the X-axis direction in the state where angular velocity ωy about the Y-axis is exerted, a Coriolis force Fz is produced in the Z-axis direction. Accordingly, when an approach is employed to apply a voltage V1 and a voltage V2 having waveforms as shown in FIG. 12 across the electrode layers E1, F1 and across the electrode layers E2, F2 of this sensor, and to allow oscillator 130 to produce oscillation Ux in the X-axis direction, a Coriolis force Fz must be produced in the Z-axis direction.

Figure 16:
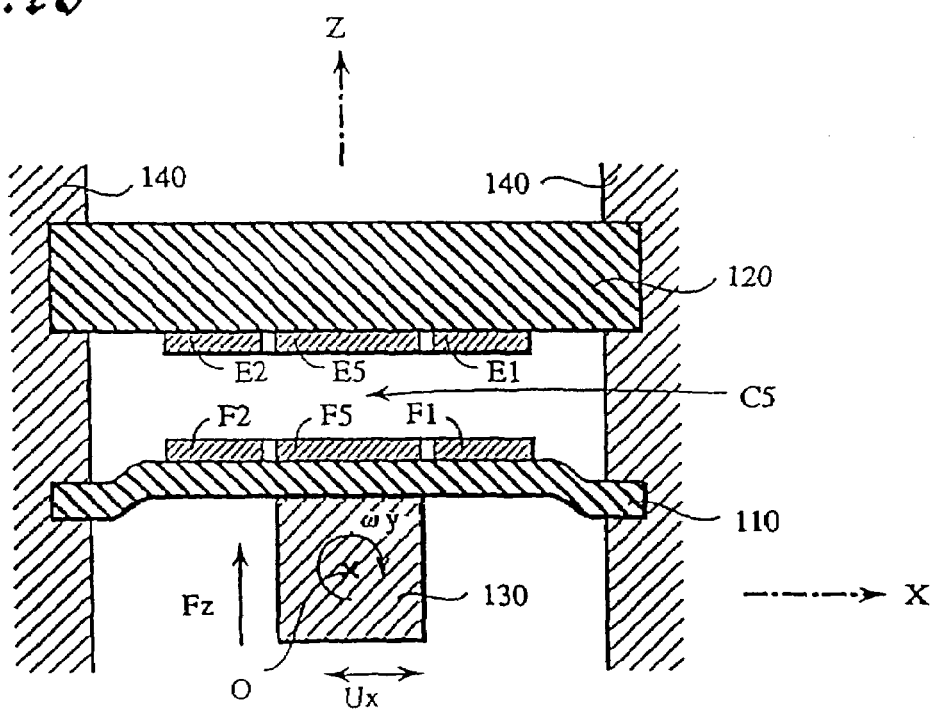
FIG. 16 is a side cross sectional view showing the phenomenon that Coriolis force Fz is produced on the basis of angular velocity component ωy when oscillator 130 is caused to produce oscillation Ux in the multi-axial angular velocity sensor shown in FIG. 6.

FIG. 16 is a side cross sectional view showing the state where a mechanical deformation is produced in the flexible substrate 110 by this Coriolis force FZ. When the oscillator 130 is oscillated in the X-axis direction in the state where the entirety of this sensor rotates at an angular velocity ωy about the Y-axis (in a direction perpendicular to plane surface of paper of the figure), a Coriolis force Fz is produced in the Z-axis direction, so a force for moving the oscillator 130 in the Z-axis direction is applied. By this force, the flexible substrate 110 is deformed as shown. Such deformation deviating in the Z-axis direction is not based on Coulomb force between electrode layers, but results from Coriolis force Fz. With respect to application of voltage across electrode layers, as described above, voltages V1, V2 as shown in FIG. 12 are only applied across the electrode layers E1, F1; E2, F2, but any voltage is not applied across other electrode layers. Since the Coriolis force Fz produced indicates a value proportional to angular velocity ωy, if the value of the Coriolis force Fz can be measured, it is possible to detect angular velocity (component) ωy.

The value of the Coriolis force Fz can be determined on the basis of capacitance value C5 of the capacitance element C5 formed by the upper electrode layer E5 and the lower electrode layer F5. This is because there can be obtained the relationship that according as the Coriolis force Fz becomes greater, the distance between both the electrode layers is contracted, so the capacitance value C5 becomes greater, whereas according as the Coriolis force Fz becomes smaller, the distance between both the electrode layers is expanded, so the capacitance value C5 becomes small. It is to be noted that the oscillator 130 oscillates in the X-axis direction, but this oscillation Ux exerts no influence on measurement of capacitance value C5. When the oscillator 130 produces a displacement in a positive direction or in a negative direction of the X-axis, the upper electrode layer E5 and the lower electrode layer F5 are placed in non-parallel state. However, since the distance between both the electrode layers is partially contracted and is partially expanded, the oscillation Ux has no influence on the capacitance value C5 as a whole.

Summary of the procedure for detecting angular velocity component ωy about the Y-axis described above is as follows. First, voltages V1 and V2 of waveforms as shown in FIG. 12 are applied across the electrode layers E1, F1; E2, F2 to allow the oscillator 130 to produce oscillation Ux in the X-axis direction, thus to determine a capacitance value of the capacitance element C5 at that time point. The capacitance value C5 thus determined indicates a detected value of angular velocity (component) ωy to be determined. Since the electrode layers E1, F1; E2, F2 used for producing oscillation and the electrode layers E5, F5 used for measuring a capacitance value are electrically completely independent, there is no possibility that any interference may take place between the oscillation mechanism and the detection mechanism.

1.3.3 Coriolis Force Based on Angular Velocity ωz about the Z-axis

Finally, let consider the phenomenon in the case where angular velocity component ωz about the Z-axis is exerted on this sensor. As explained with reference to FIG. 5, when the oscillator is caused to produce oscillation Uy in the Y-axis direction in the state where angular velocity component ωz about the Z-axis is exerted, a Coriolis force Fx is produced in the X-axis direction. Accordingly, when an approach is employed to apply voltages V3, V4 having waveforms as shown in FIG. 13 across the electrode layers E3, F3 and across the electrode layers E4, F4 of this sensor, and to allow the oscillator 130 to produce oscillation Uy in the Y-axis direction, a Coriolis force Fx must be produced in the X-axis direction.

Figure 17:
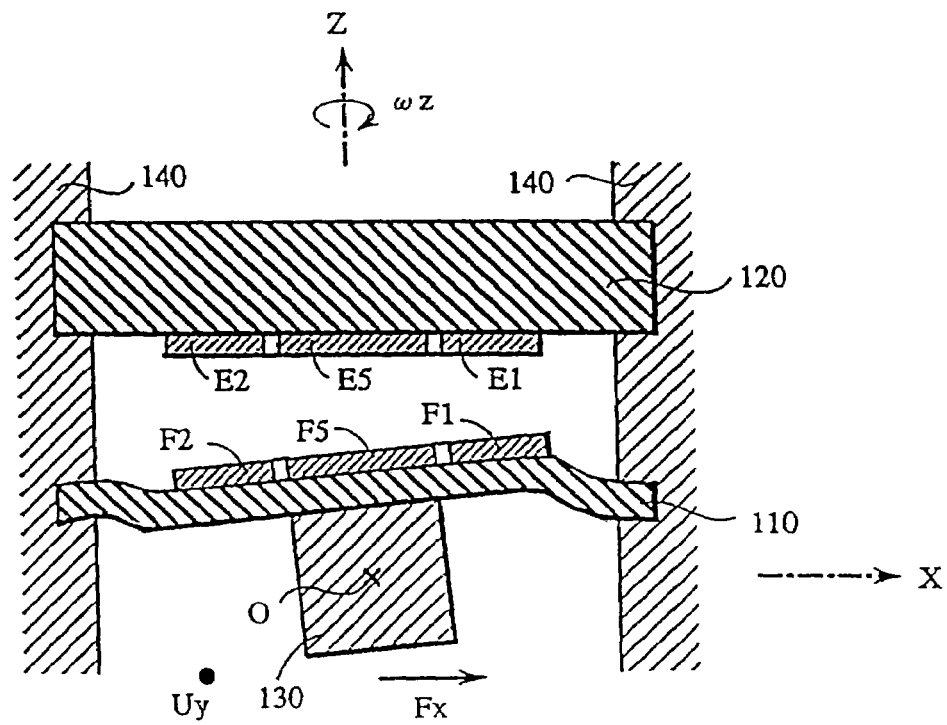
FIG. 17 is a side cross sectional view showing the phenomenon that Coriolis force Fx is produced on the basis of angular velocity component ωz when oscillator 130 is caused to produce oscillation Uy in the multi-axial angular velocity sensor shown in FIG. 6.

FIG. 17 is a side cross sectional view showing the state where a mechanical deformation is produced in the flexible substrate 110 by this Coriolis force Fx. When the oscillator 130 is oscillated in the Y-axis direction (in a direction perpendicular to plane surface of paper) in the state where the entirety of this sensor rotates at angular velocity ωz about the Z-axis, a Coriolis force Fx is produced in the X-axis direction, so a force for moving the oscillator 130 in the X-axis direction is applied. By this force, the flexible substrate 110 is deformed as shown. Such deformation deviating in the X-axis direction is not based on Coulomb force between electrode layers, but results from the Coriolis force Fx. Since this Coriolis force Fx indicates a value proportional to the angular velocity component ωz, if the value of the Coriolis force Fx can be measured, it is possible to detect angular velocity ωz.

This Coriolis force Fx can be measured by making use of a change of electrostatic capacitance similarly to the Coriolis force Fy. Namely, while the previously described Coriolis force Fy can be determined by the difference ΔC34 between the capacitance values C3 and C4, Coriolis force Fx can be determined by a difference ΔC12 between the capacitance values C1 and C2 on the basis of exactly the same principle as the above.

Summary of the procedure for detecting angular velocity ωz about the Z-axis described above is as follows. First, an approach is employed to respectively apply voltages V3 and V4 of waveforms as shown in FIG. 13 across the electrode layers E3, F3 and across the electrode layers E4, F4, and to allow the oscillator 130 to produce oscillation Uy in the Y-axis direction, thus to determine a capacitance value difference ΔC12 between the capacitance elements C1, C2 at that time point. The difference ΔC12 thus determined indicates a detected value of angular velocity ωz to be determined. Since the electrode layers E3, F3; E4, F4 used for producing oscillation and the electrode layers E1, F1; E2, F2 used for measuring a capacitance value difference are electrically completely independent, there is no possibility that any interference may take place between the oscillation mechanism and the detection mechanism.

<1.4> Circuit for Detecting Coriolis Force

As described above, in the sensor according to the first embodiment, angular velocity ωx about the X-axis is detected by determining a difference ΔC34 between capacitance values C3 and C4; angular velocity ωy about the Y-axis is detected by determining capacitance value C5; and angular velocity ωz about the Z-axis is detected by determining a difference ΔC12 between capacitance values C1 and C2. In view of this, an example of a circuit suitable for measuring a capacitance value or a capacitance value difference as described above is disclosed.

Figure 18:
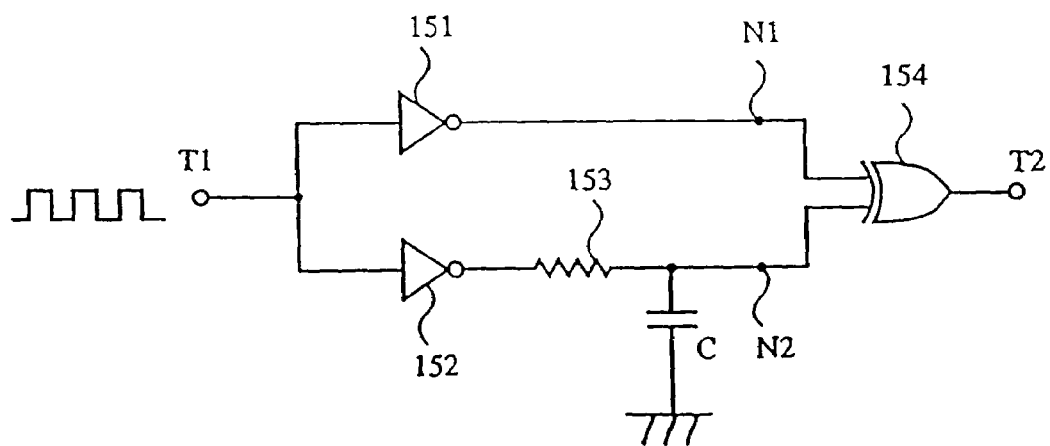
FIG. 18 is a circuit diagram showing an example of a circuit for detecting change of a capacitance value of electrostatic capacitance element C.

FIG. 18 shows an example of a circuit for measuring capacitance value of capacitance element C. A signal delivered to an input terminal T1 is branched into signals in two paths, and these signals are respectively passed through inverters 151 and 152. In the lower path, the signal passed through the inverter 152 is further passed through a delay circuit comprised of a resistor 153 and a capacitance element C, resulting in becoming one input signal of an Exclusive OR circuit 154. In the upper path, the signal passed through the inverter 151 results in becoming the other input signal of the Exclusive OR circuit 154 as it is. A logical output of the Exclusive OR circuit 154 is delivered to an output terminal T2. In this example, the inverter 152 is an element provided for the purpose of providing sufficient drive ability with respect to a delay circuit comprised of resistor 153 and capacitance element C. In addition, the inverter 151 is an element provided for the purpose of allowing the upper and lower paths to have the same condition, and is an element having the same operating characteristic as that of the inverter 152.

Figure 19:
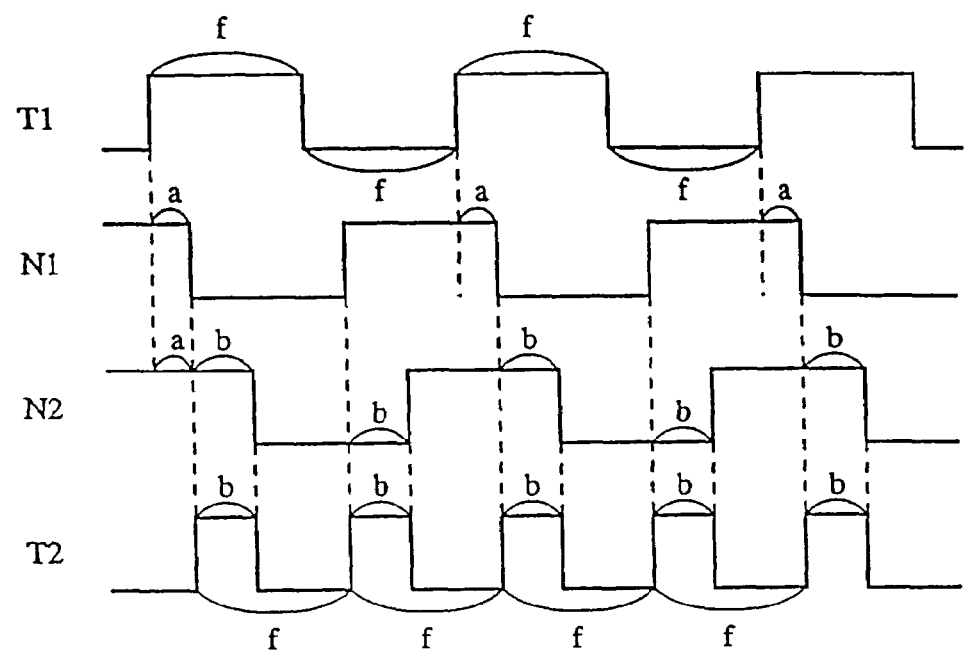
FIG. 19 is a timing chart for explaining the operation of the circuit shown in FIG. 18.

Consideration will be made in connection with the case where when an a.c. signal of a predetermined period is delivered to the input terminal T1 in such a circuit, what signal can be obtained on the output terminal T2. FIG. 19 is a timing chart showing waveforms appearing on respective portions in the case where a rectangular a.c. signal of a half period f is delivered to the input terminal T1 (Although rounding occurs in a rectangular wave in actual, such a waveform is indicated as a pure rectangular wave for convenience of explanation) in this example. The waveform on the node N1, which is one input terminal of the Exclusive OR circuit 154, is an inverted waveform delayed by a time a required for which a signal is passed through the inverter 151 with respect to the waveform delivered to the input terminal T1. On the other hand, the waveform on the node N2, which is the other input terminal of the Exclusive OR circuit 154, is an inverted waveform delayed by a time in total (a+b) of a time a required for which a signal is passed through the inverter 152 and a time b required for which a signal is passed through the delay circuit comprised of the resistor 153 and the capacitance element C with respect to the waveform delivered to the input terminal T1. As a result, the output waveform of the Exclusive OR circuit 154 obtained at the output terminal T2 is a waveform having a pulse width b and a period f as shown. When it is now assumed that the capacitance value of the capacitance element C varies, any change takes place in the delay time b of the delay circuit comprised of the resistor 153 and the capacitance element C. Accordingly, the pulse width thus obtained is equal to a value indicating capacitance value of the capacitance element C.

Figure 20:
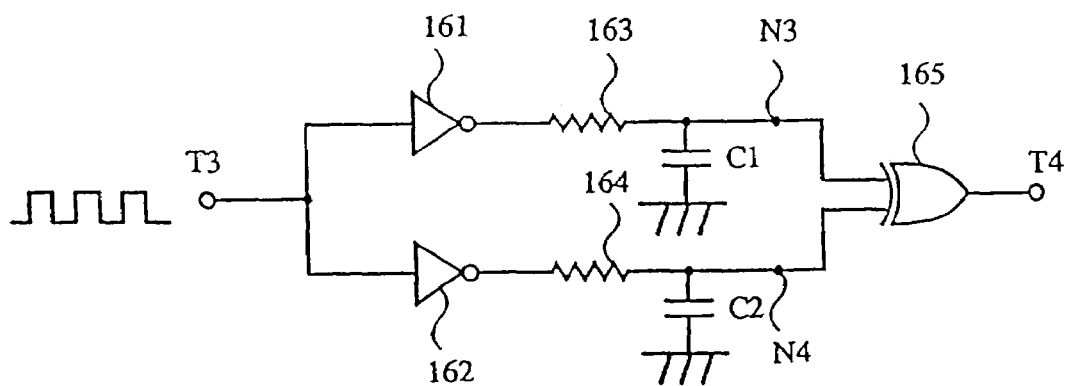
FIG. 20 is a circuit diagram showing an example of a circuit for detecting changes of capacitance values of a pair of electrostatic capacitance elements C1, C2.

FIG. 20 shows an example of a circuit for measuring a difference ΔC between capacitance values of two capacitance elements C1, C2. A signal delivered to an input terminal T3 is branched into signals in two paths, and these signals are respectively passed through inverters 161 and 162. In the upper path, the signal passed through the inverter 161 is further passed through a delay circuit comprised of a resistor 163 and a capacitance element C1, resulting in one input signal of the Exclusive OR circuit 165. In the lower path, the signal passed through the inverter 162 is further passed through a delay circuit comprised of a resistor 164 and a capacitance element C2, resulting in the other input signal of the Exclusive OR circuit 165. A logical output of the Exclusive OR circuit 165 is delivered to output terminal T4. In this example, the inverters 161, 162 are an element provided for the purpose of providing sufficient drive ability with respect to a delay circuit of the succeeding stage, and the both inverters have the same operating characteristic.

Figure 21:
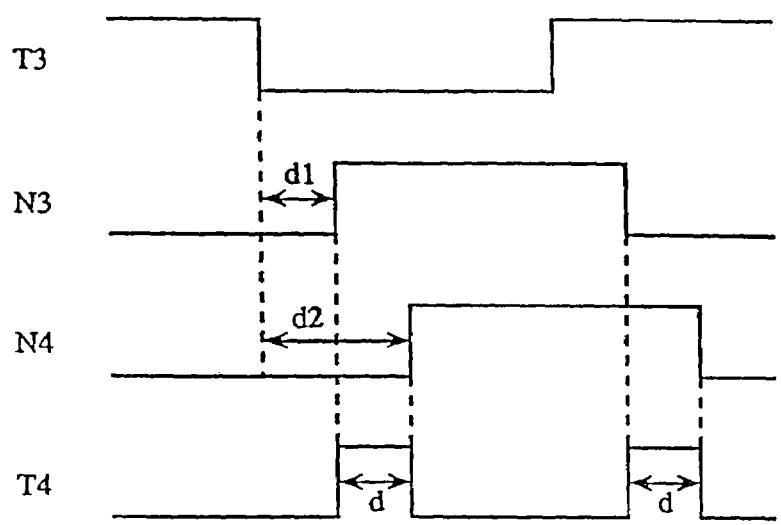
FIG. 21 is a timing chart for explaining the operation of the circuit shown in FIG. 20.

Let now consider what signal can be obtained at an output terminal T4 in the case where an a.c. signal of a predetermined period is delivered to the input terminal T3 in such a circuit. As shown in FIG. 21, when a rectangular a.c. signal is delivered to input terminal T3, the waveform on node N3, which is one input terminal of the Exclusive OR circuit 165, is an inverted waveform having a predetermined delay time d1. Similarly, the waveform on node N4, which is the other input terminal, is an inverted waveform having a predetermined delay time d2. As a result, the output waveform of the Exclusive OR circuit 165 obtained at the output terminal T4 is a waveform having a pulse width d as shown. Here, the pulse width d is a value corresponding to a difference between delay times d1 and d2, and takes a value corresponding to difference ΔC between capacitance values of the two capacitance elements C1, C2. Thus, the capacitance value difference ΔC can be obtained as pulse width d.

<1.5> Modification 1

Figure 22:
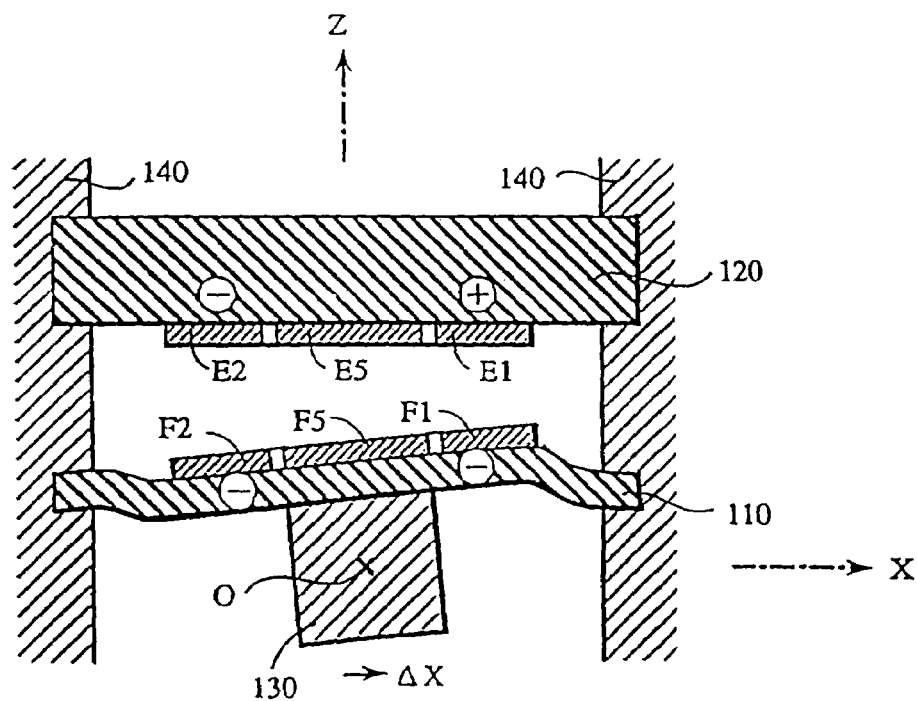
FIG. 22 is a side cross sectional view for explaining the principle of a first modification of the multi-axial angular velocity sensor shown in FIG. 6.

In the above-described sensor according to the first embodiment, an attractive force based on Coulomb force is exerted to the oscillate oscillator 130. For example, in the case of oscillating the oscillator 130 in the X-axis direction, it is sufficient that the first state where charges having polarities opposite to each other are delivered to both the electrode layers E1, F1 so that an attractive force is exerted therebetween as shown in FIG. 9 and the second state where charges having polarities opposite to each other are delivered to both the electrode layers E2, F2 so that an attractive force is exerted therebetween as shown in FIG. 10 are repeated reciprocally. However, in order to still more stabilize such an oscillation, it is preferable to exert a repulsive force along with an attractive force. When an approach is employed, as shown in FIG. 22, for example, to respectively deliver positive and negative charges to the upper electrode layer E1 and the lower electrode layer F1 to allow both the electrode layers to undergo an attractive force exerted therebetween, and to deliver negative charges to both the upper electrode layer E2 and the lower electrode layer F2 (or to deliver positive charges to both the electrodes) to allow both the electrode layers to undergo a repulsive force exerted therebetween, it is possible to carry out, in more stable manner, the operation for allowing the oscillator 130 to undergo displacement by ΔX in the positive direction of the X-axis. The state shown in FIG. 9 and the state shown in FIG. 22 are the same in that the oscillator 130 is caused to undergo displacement ΔX. However, the former is dependent upon a force exerted on one portion, whereas the latter is dependent upon a force exerted on two portions. Therefore, the latter is more stable than the former.

Figure 23:
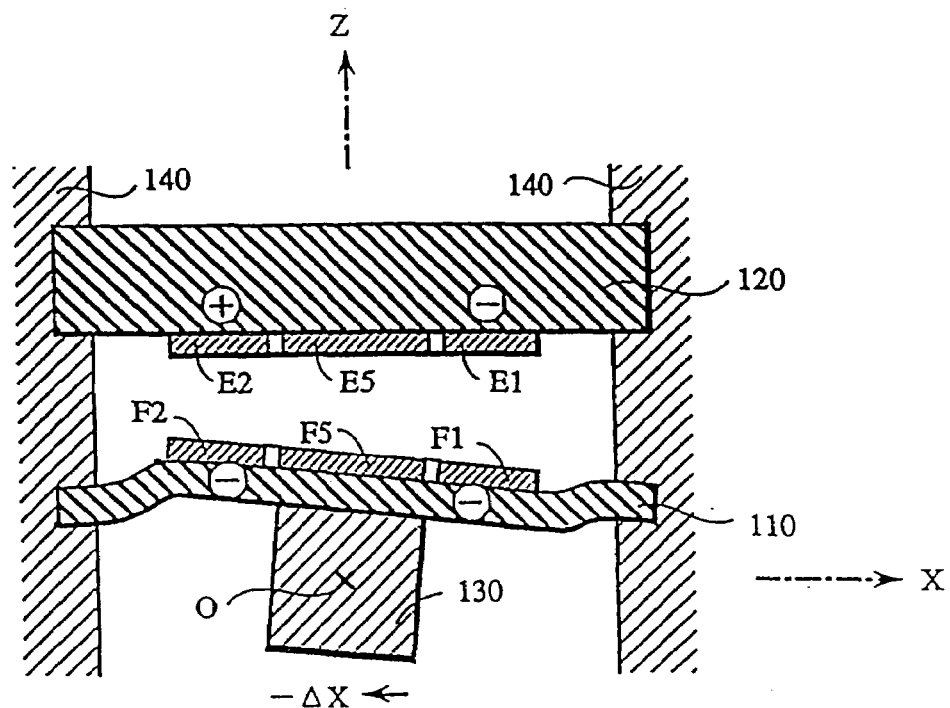
FIG. 23 is another side cross sectional view for explaining the principle of the first modification of the multi-axial angular velocity sensor shown in FIG. 6.

Similarly, as shown in FIG. 10, also in the case where the oscillator 130 is caused to undergo displacement by −ΔX in the negative direction of the X-axis, when an approach is employed, as shown in FIG. 23, to respectively deliver positive charges and negative charges to the upper electrode layer E2 and the lower electrode layer F2 to allow both the electrode layers to undergo an attractive force exerted therebetween, and to deliver negative charges to both the upper electrode layer E1 and the lower electrode layer F1 (or to deliver positive charges to both the electrodes) to allow both the electrode layers to undergo a repulsive force exerted therebetween, the operation can be still more stabilized. Eventually, when an approach is employed to deliver charges of a predetermine polarity to respective electrode layers at a predetermined timing so that the first state shown in FIG. 22 and the second state shown in FIG. 23 are repeated reciprocally, it is possible to oscillate the oscillator 130 in the X-axis direction in a stable manner. Also in the case of oscillating the oscillator 130 in the Y-axis direction, its operation is exactly the same as the above.

Figure 24:
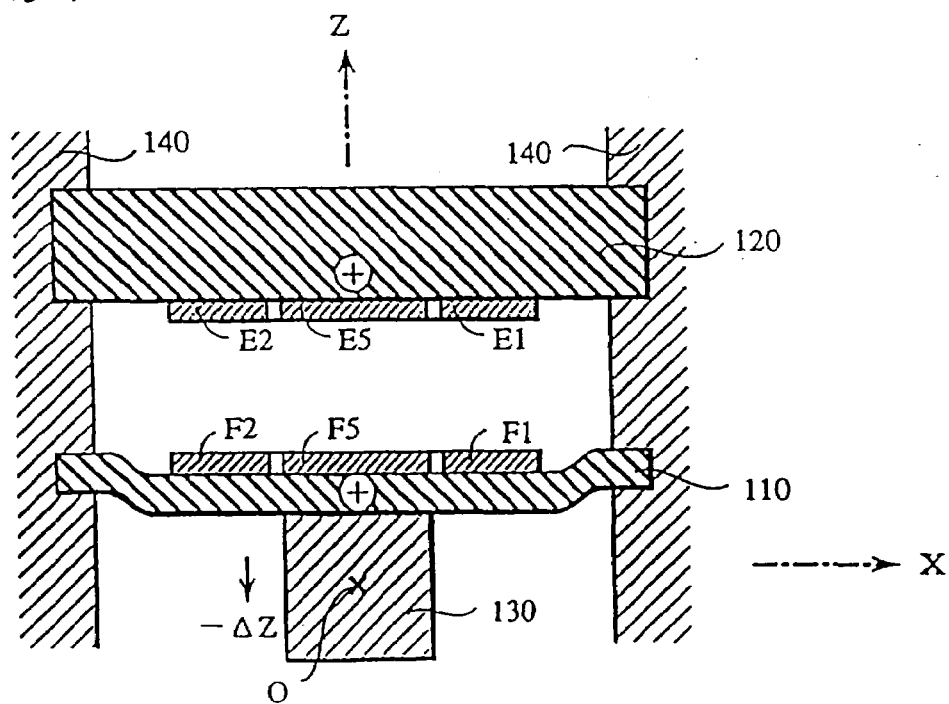
FIG. 24 is a further side cross sectional view for explaining the principle of the first modification of the multi-axial angular velocity sensor shown in FIG. 6.

Let consider the case where the oscillator 130 is oscillated in the Z-axis direction. In the previously described embodiment, the first state where positive charges and negative charges are respectively delivered to the upper electrode layer E5 and the lower electrode layer F5 to allow both the electrode layers to undergo an attractive force exerted therebetween as shown in FIG. 11 and the neutral state where no charge is delivered to any electrode layer are repeated reciprocally so that oscillation Uz is produced. Also in this case, by making use of a repulsive force between both electrode layers, the operation can be more stabilized. Namely, when an approach is employed as shown in FIG. 24 to deliver positive charges to both the upper electrode layer E5 and the lower electrode layer F5 (or to deliver negative charges to both the electrode layers) to allow both the electrode layers to undergo a repulsive force exerted therebetween, the oscillator 130 produces a displacement −ΔZ in the negative direction of the Z-axis. In view of this, when an approach is employed to deliver, at a predetermined timing, charges of a predetermined polarity to respective electrode layers so that the first state shown in FIG. 11 and the second state shown in FIG. 24 are repeated reciprocally, it becomes possible to oscillate the oscillator 130 in a stabilized manner in the Z-axis direction.

Figure 25:
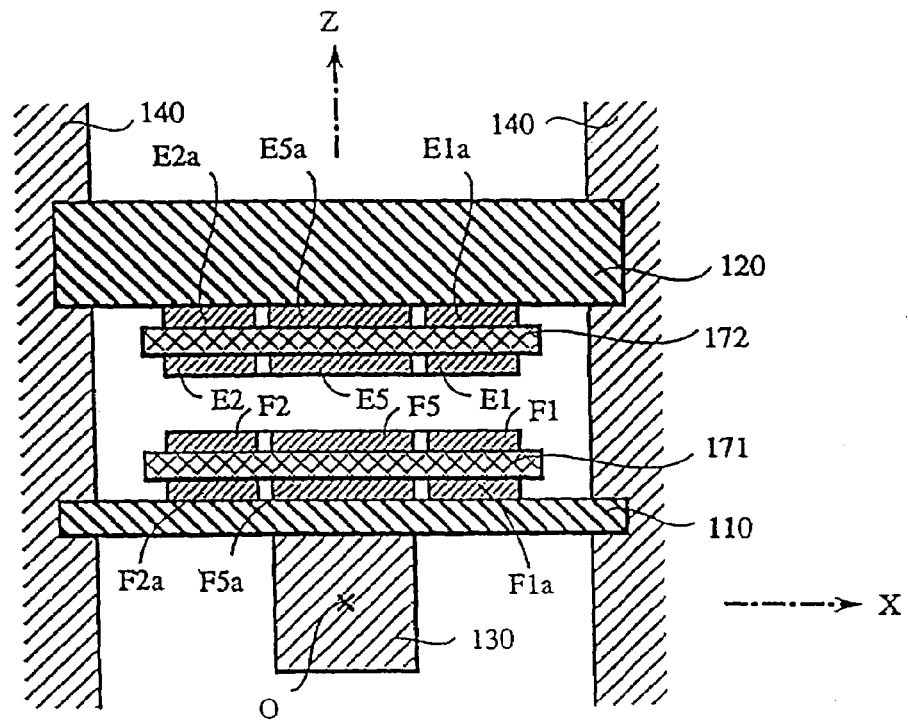
FIG. 25 is a side cross sectional view showing a more practical structure of the first modification of the multi-axial angular velocity sensor shown in FIG. 6.

While it is possible to easily deliver charges of polarities opposite to each other to a pair of opposite electrode layers, it is necessary to make a particular device in order to deliver charges of the same polarity. Namely, it is sufficient to apply a predetermined voltage across both electrode layers in order to deliver charges of polarities opposite to each other, but such a method cannot be applied in order to deliver charges of the same polarity. To solve this problem, there may be employed a method in which respective electrode layers are caused to be of a double layer structure through dielectric substance. FIG. 25 is a side cross sectional view of a sensor employing such a structure. Lower electrode layers F1 to F5 are formed on the upper surface of a dielectric substrate 171, and auxiliary electrode layers F1a to F5a are formed between the dielectric substrate 171 and the flexible substrate 110. The auxiliary electrode layers F1a to F5a have the same shape as that of the lower electrode layers F1 to F5, and are arranged at the same positions, respectively. Similarly, upper electrode layers E1 to E5 are formed on the lower surface of a dielectric substrate 172, and auxiliary electrode layers E1a to E5a are formed between the dielectric substrate 172 and the fixed substrate 120. The auxiliary electrode layers E1a to E5a have the same shape as that of the upper electrode layers E1 to E5 and are arranged at the same positions, respectively.

Figure 26:
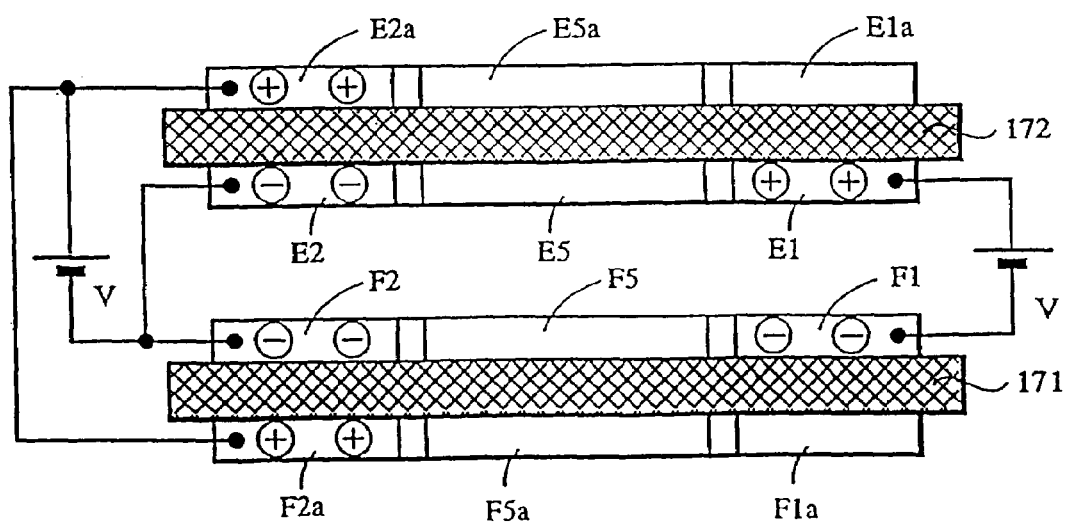
FIG. 26 is a view showing an example of a method of applying a voltage to respective electrodes of the multi-axial angular velocity sensor shown in FIG. 25.

If such a double layer structure is employed, it is possible to allow specific electrode layers to undergo an attractive force exerted therebetween, or to allow them to undergo a repulsive force exerted therebetween without constraint. This is indicated by using an actual example. FIG. 26 is a view showing only extracted portions of respective electrode layers and respective dielectric substrates in the sensor shown in FIG. 25. For example, in the case where there is a desire to allow the electrode layers E1, F1 to undergo an attractive force exerted therebetween, it is sufficient to apply a voltage V across both the electrode layers so that charges of polarities opposite to each other are delivered thereto. On the contrary, in the case where there is a desire to allow the electrode layers E2, F2 to undergo a repulsive force exerted therebetween, it is sufficient to apply a voltage across the auxiliary substrates E2a, F2a and across the electrode layers E2, F2 as shown. Since voltage V is applied with the dielectric substrate 171 being put between the auxiliary electrode layer and the electrode layer, negative charges are produced in the electrode layer F2 and positive charges are produced in the auxiliary electrode layer F2a. Similarly, since voltage V is applied with the dielectric substrate 172 being put between the auxiliary electrode layer and the electrode layer, negative charges are produced in the electrode layer E2 and positive charges are produced in the auxiliary electrode layer E2a. In this way, charges of the same polarity are delivered as a result to both the electrode layers E2, F2. Thus, both the electrode layers are permitted to undergo a repulsive force exerted therebetween.

<1.6> Modification 2

Figure 27:
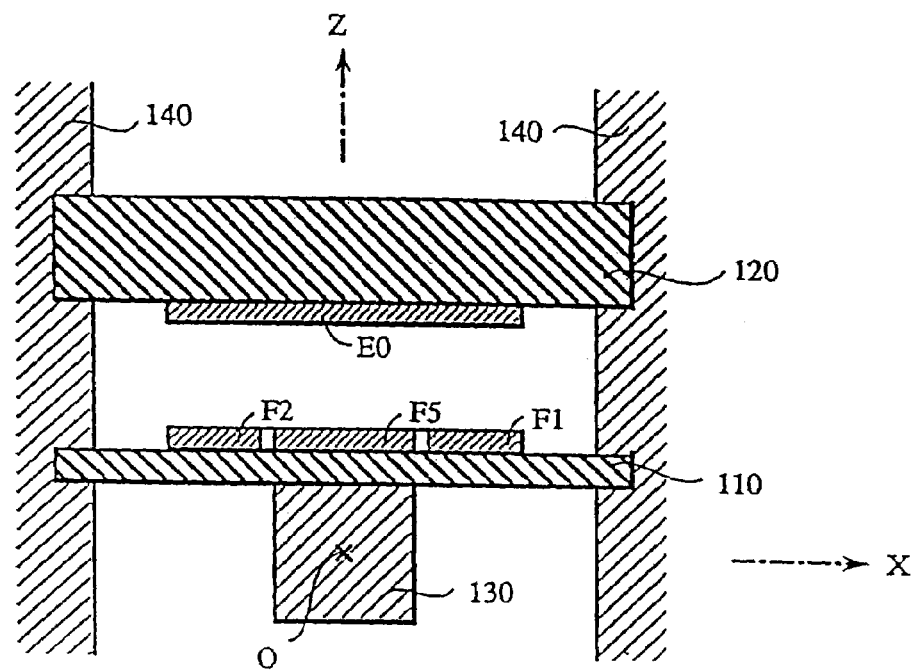
FIG. 27 is a side cross sectional view showing a more practical structure of a second modification of the multi-axial angular velocity sensor shown in FIG. 6.

The above-described modification 1 somewhat becomes complex in structure than the sensor shown in FIG. 6. On the contrary, modification 2 described below is directed to a sensor in which the structure of the sensor shown in FIG. 6 is more simplified. Namely, in the sensor of the modification 2, as shown in FIG. 27, a single common electrode layer E0 is formed in place of the upper electrode layers E1 to E5. This common electrode layer E0 is a disk-shaped electrode layer having such dimensions to face all of the lower electrode layers F1 to F5. Even if electrode layers on one side are formed as a single common electrode layer as stated above, when a potential on this common electrode layer side is always taken as a reference potential, no obstruction takes place in the operation of this sensor. For example, in the case of applying a voltage across a specific pair of electrode layers in order to allow the oscillator 130 to produce oscillation, it is sufficient that the common electrode layer E0 side is grounded to deliver a voltage to a predetermined electrode layer of the lower electrode layers F1 to F5. Further, also in the case of detecting Coriolis force on the basis of change of capacitance value, it is sufficient that the common electrode layer E0 side is similarly grounded to handle respective capacitance elements C1 to C5.

As stated above, the five upper electrode layers E1 to E5 are replaced by the single common electrode layer E0, thereby permitting mechanical structure of the sensor and/or necessary wiring thereof to be more simple. Further, if fixed substrate 120 is constituted with a conductive material such as metal, etc., the lower surface of the fixed substrate 120 can be used as the common electrode layer E0. For this reason, the necessity of purposely forming the common electrode layer E0 as a separate body on the lower surface of the fixed substrate 120 is eliminated. Thus, the structure becomes simpler.

While the example where the upper electrode layers E1 to E5 sides are replaced by the common electrode layer E0 has been described, the lower electrode layers F1 to F5 sides may be replaced by a common electrode layer F0 in a manner opposite to the above.

§2 Second Embodiment

<2.1> Structure of Sensor According to Second Embodiment

Subsequently, a multi-axial angular velocity sensor according to a second embodiment of this invention will be described. This second embodiment is also the same as the above-described sensor of the first embodiment in that a mechanism utilizing Coulomb's force is used as the oscillating mechanism and a mechanism utilizing change of electrostatic capacitance is used as the detecting mechanism. It should be noted that its structure is comprised of a plurality of substrates stacked, and is therefore more suitable for mass production.

Figure 28:
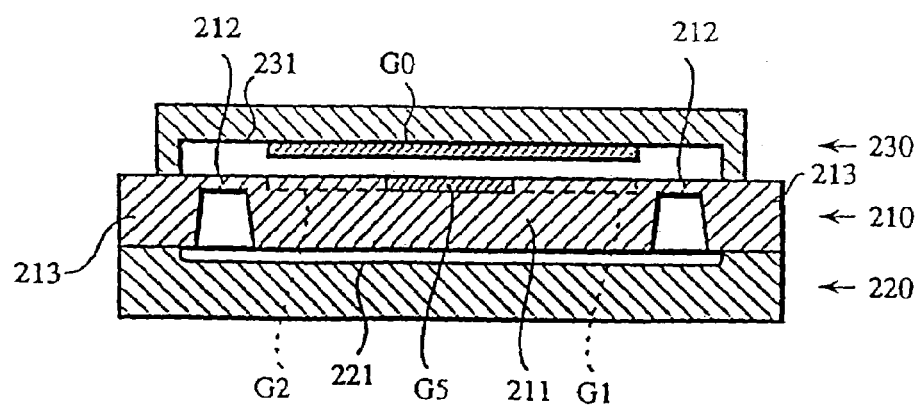
FIG. 28 is a side cross sectional view showing the structure of a multi-axial angular velocity sensor according to a second embodiment of this invention.
Figure 29:
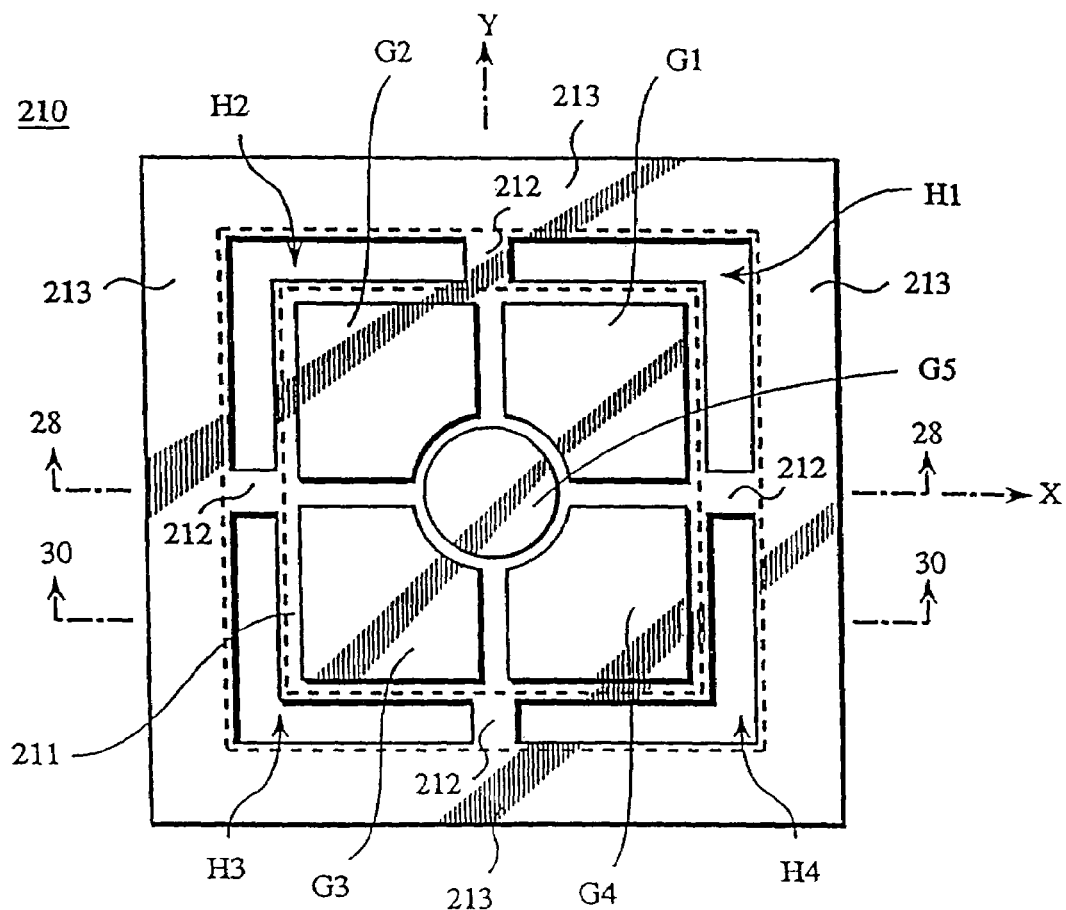
FIG. 29 is a top view of flexible substrate 210 of the multi-axial angular velocity sensor shown in FIG. 28.
Figure 30:
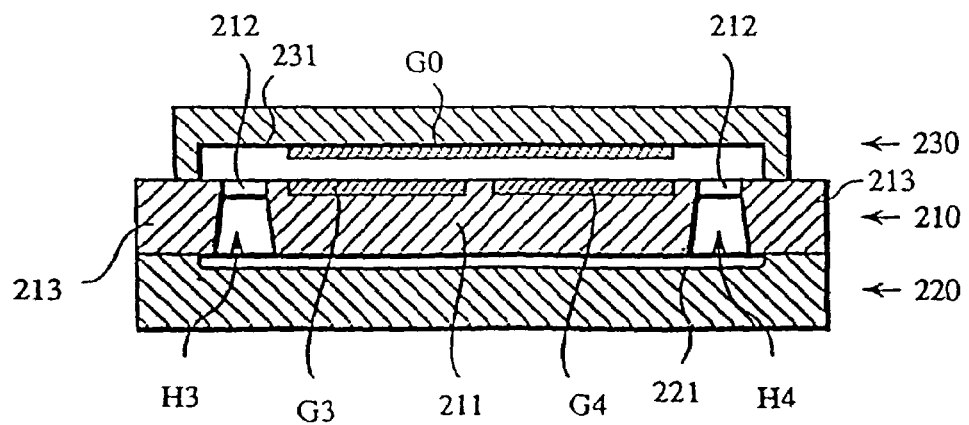
FIG. 30 is a side cross sectional view showing a cross section at another position of the multi-axial angular velocity sensor shown in FIG. 28.

FIG. 28 is a side cross sectional view of the multi-axial angular velocity sensor according to the second embodiment. This sensor includes, as its main components, a first substrate 210, a second substrate 220, and a third substrate 230. In this embodiment, the first substrate 210 is comprised of a silicon substrate, and the second and third substrates 220 and 230 are comprised of a glass substrate. Respective substrates are connected to each other by anodic bonding. The first substrate 210 is a substrate serving as the center role of this sensor. FIG. 29 is a top view of the first substrate 210. As clearly shown in FIG. 29, L-shaped opening portions H1 to H4 are provided in the first substrate 210. Respective opening portions H1 to H4 have a taper shape such that the widths become broader according as the positions thereof shift in a lower direction. The side cross sectional view cut along cutting lines 28-28 in FIG. 29 is FIG. 28, and the side cross sectional view cut along the cutting lines 30-30 is FIG. 30. The cross sections in a taper shape of opening portions H3, H4 are shown in FIG. 30. In FIG. 29, the inside square portions encompassed by the four L-shaped opening portions H1 to H4 constitute an oscillator 211, and the outside portions of the L-shaped opening portions H1 to H4 constitute a support frame 213 with respect to the oscillator 211. The oscillator 211 is connected at four portions with respect to the support frame 213. These four connecting portions serve as a bridging portion 212. In other words, the square oscillator 211 is in hanging state by the bridging portions 212 at four portions. In addition, as shown in FIG. 28 or 30, the bridging portion 212 is a member in a very small thin plate form as compared to the original thickness of the first substrate 210, thus providing flexibility. For this reason, the oscillator 211 can move with a certain degree of freedom in the state where it is hung by the bridging portions 212. On the upper surface of the oscillator 211, as shown in FIG. 29, five lower electrode layers G1 to G5 are formed. These lower electrode layers G1 to G5 perform, similarly to the lower electrode layers F1 to F5 in the previously described sensor of the first embodiment, the function for allowing the oscillator 211 to be oscillated and the function for detecting a Coriolis force exerted on the oscillator 211.

A second substrate 220 functions as a pedestal for supporting the peripheral portion of the first substrate 210. To realize this, a recess 221 is formed at the portions except for the peripheral portion of the upper surface of the second substrate 220. By formation of this recess 221, the oscillator 211 can be kept in a hanging state without being in contact with the second substrate 220.

Figure 31:
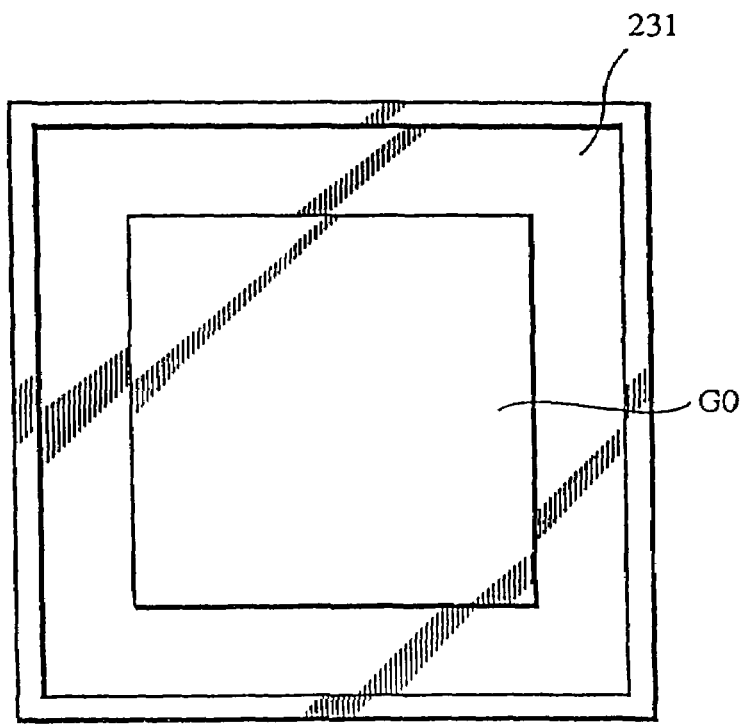
FIG. 31 is a bottom view of fixed substrate 230 of the multi-axial angular velocity sensor shown in FIG. 28.

A third substrate 230 functions as a cover for covering the upper surface of the first substrate 210. The bottom view of the third substrate 230 is shown in FIG. 31. The lower surface of the third substrate 230 is dug except for a small portion therearound, and an upper electrode layer G0 is formed on the dug surface 231. The upper electrode layer G0 is square, and is placed in the state where it is faced to all the lower electrode layers G1 to G5 as indicated by the side cross sectional view of FIG. 28 or FIG. 30. This lower electrode layer G0 corresponds to the common electrode layer E0 of the sensor of FIG. 27 shown as modification 2 in the previously described first embodiment.

Such sensors comprised of three substrates are suitable for mass production. Namely, machining (or chemical processing such as etching, etc.) may be individually implemented to respective substrates thereafter to form electrode layers or wiring layers to connect and combine them. If a silicon substrate is used as the first substrate 210, the electrode layers G1 to G5 may be formed by a diffused layer. Further, the electrode layer G0 may be formed with a vacuum deposition layer such as aluminum. In this way, electrode layers or wiring layers may be formed by general semiconductor planar process.

<2.2> Mechanism for Oscillating Oscillator

The sensor of this embodiment is the same as the previously described sensor of the first embodiment in that an approach is employed to apply a predetermined voltage, at a predetermined timing, to the five lower electrode layers G1 to G5 formed on the oscillator 211 and the upper electrode layer G0 opposite thereto to thereby allow both the electrode layers to undergo Coulomb's force therebetween, thus making it possible to oscillate the oscillator 211 in a predetermined direction. It is to be noted that arrangement of electrode layers of the sensor of the second embodiment and that of the previously described sensor of the first embodiment are somewhat different. In the sensor of the first embodiment, as shown in FIG. 7, the electrode layers F1, F2 are disposed on the X-axis and the electrode layers F3, F4 are disposed on the Y-axis. On the contrary, in the sensor of the second embodiment which will be described below, as shown in FIG. 29, the electrode layers G1 to G4 are all not disposed on the X-axis or the Y-axis. Namely, the electrode layers G1 to G4 are respectively arranged in first to fourth quadrants with respect to the XY plane. For this reason, a method of applying a voltage required for oscillating the oscillator 211 in a specific direction is somewhat different from that of the previously described example. This voltage application method will now be described in a more practical manner.

In order to oscillate the oscillator 211 in the X-axis direction, the following method is adopted. It is now assumed that a potential on the upper electrode layer G0 is caused to be earth potential as a reference potential, and a predetermined voltage (e.g., +5V) is applied to the lower electrode layers G1 to G5. First, when voltages of +5 volts are respectively applied to both the lower electrode layers G1 and G4, it is easily understood that the electrode layers G1, G0 and the electrode layers G4, G0 are caused to respectively undergo attractive force exerted therebetween. Thus, the oscillator 211 is brought into the state where a displacement ΔX takes place in a positive direction of the X-axis. Then, potentials on the lower electrode layers G1, G4 are caused to be a reference potential for a second time and voltages of +5 volts are respectively applied to both the lower electrode layers G2 and G3. As a result, the electrode layers G2, G0 and the electrode layers G3 and G0 are caused to respectively undergo attractive force exerted therebetween. Thus, the oscillator 211 is brought into the state where a displacement −ΔX takes place in a negative direction of the X-axis. When a predetermined voltage is applied to respective electrode layers at a predetermined timing so that these two states are repeated one after another, it becomes possible to oscillate the oscillator 211 in the X-axis direction.

In the case of oscillating the oscillator 211 in the Y-axis direction, an operation similar to the above is conducted. First, when voltages of +5 volts are respectively applied to both the lower electrode layers G1 and G2, it is easily understood that the electrode layers G1, G0 and the electrode layers G2, G0 are caused to undergo attractive force exerted therebetween, respectively. Thus, the oscillator 211 is brought into the state where displacement ΔY takes place in a positive direction of the Y-axis. Then, potentials on the lower electrode layers G1, G2 are caused to be a reference potential for a second time and voltages of +5 volts are respectively applied to both the lower electrode layers G3 and G4. As a result, the electrode layers G3, G0 and the electrode layers G4, G0 are caused to respectively undergo attractive force exerted therebetween. Thus, the oscillator 211 is brought into the state where displacement −ΔY takes place in a negative direction of the Y-axis. When a predetermined voltage is applied to respective electrode layers at a predetermined timing so that the above-mentioned two states are repeated one after another, it becomes possible to oscillate the oscillator 211 in the Y-axis direction.

In addition, in order to oscillate the oscillator 211 in the Z-axis, it is sufficient to employ the same method as that of the above-described sensor of the first embodiment. Namely, it is enough to repeatedly carry out an operation to apply +5 volts to the lower electrode layer G5, or to allow an applied voltage to be 0 volts for a second time.

<2.3> Mechanism for Detecting Coriolis Force

In the sensor according to the second embodiment, the principle for detecting Coriolis force exerted on the oscillator 211 resides in utilization of change of electrostatic capacitance similarly to the previously described sensor according to the first embodiment. However, since there is a slight difference in the arrangement of electrode layers, there is a slight difference in combination of capacitance elements used as a detecting element. The combination of capacitance elements will now be described in a more practical sense. It is here assumed that five sets of capacitance elements constituted by combination of the lower electrode layers G1 to G5 and the upper electrode layer G0 are respectively called capacitance elements C1 to C5 for convenience of explanation, and capacitance values of these capacitance elements are similarly called C1 to C5.

A method of detecting Coriolis force Fx exerted in the X-axis will be first studied. In accordance with the electrode layer arrangement shown in FIG. 29, it can be easily imagined that when Coriolis force Fx in the positive direction of the X-axis is applied to the oscillator 211, the electrode layer spacing between the capacitance elements C1, C4 is contracted and the electrode layer spacing between the capacitance elements C2, C3 is broadened. Accordingly, capacitance values C1, C4 increase, whereas capacitance values C2, C3 decrease. Then, if a difference of (C1+C4)−(C2+C3) is obtained, this difference takes a value corresponding to the Coriolis force Fx.

A method of detecting a Coriolis force Fy exerted in the Y-axis direction will now be studied. In accordance with the electrode layer arrangement shown in FIG. 29, it can be easily imagined that when Coriolis force Fy in the positive direction of the Y-axis is applied to the oscillator 211, the electrode layer spacing between the capacitance elements C1, C2 is contracted, whereas the electrode layer spacing between the capacitance elements C3, C4 is broadened. Accordingly, capacitance values C1, C2 increase, whereas capacitance values C3, C4 decrease. Then, if a difference of (C1+C2)−(C3+C4) is obtained, this difference takes a value corresponding to Coriolis force Fy.

A method of detecting a Coriolis force Fz exerted in the Z-axis direction is the same as the detecting method in the previously described sensor of the first embodiment. Namely, a capacitance value C5 of the capacitance element C5 takes a value indicating Coriolis force Fz.

It is to be noted that, in the sensor of this embodiment, since the same electrode layers are used at the same time for both the oscillating mechanism and the detecting mechanism, it is required that a voltage supply circuit for producing oscillation and a circuit for detecting a capacitance value varying on the basis of Coriolis force do not interfere with each other.

<2.4> Modification 1

Figure 32:
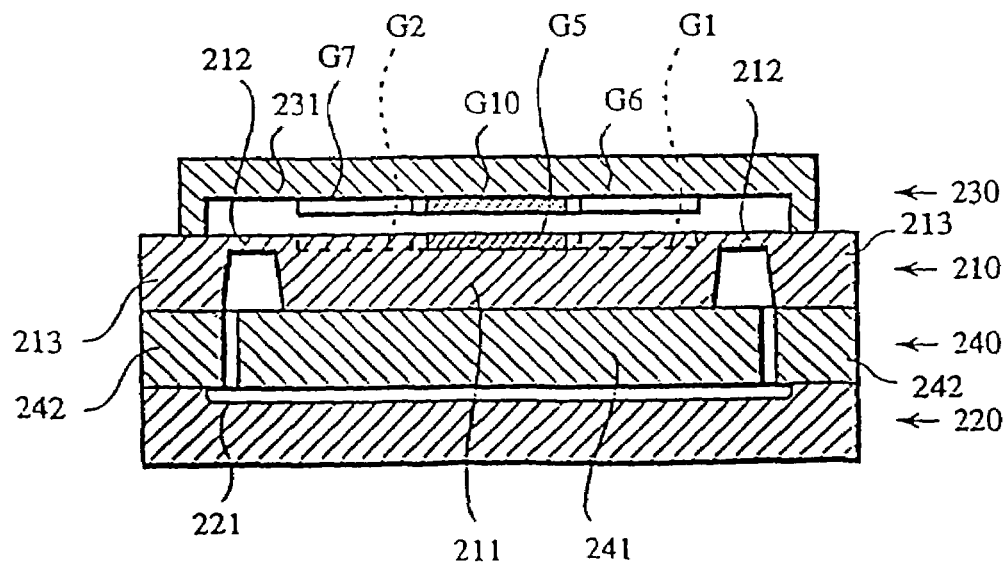
FIG. 32 is a side cross sectional view showing a first modification of the multi-axial angular velocity sensor shown in FIG. 28.

A sensor shown in FIG. 32 is a modification of the sensor according to the second embodiment shown in FIG. 28. In this modification, a fourth substrate 240 is further used in addition to the first substrate 210, the second substrate 220 and the third substrate 230. The fourth substrate 240 is constituted by an oscillator 241 and a pedestal 242. The oscillator 241 is a block in a square form when viewed from the top, and the pedestal 242 is a frame in such a form to surround the periphery thereof. The oscillator 241 of the fourth substrate is connected to the oscillator 211 of the first substrate, and these oscillators 211 and 241 function as a single oscillator as a whole. By adding fourth substrate 240 in this way, mass of oscillator can be increased. Thus, detection of higher sensitivity can be made. It is to be noted that, in this modification, five upper electrode layers G6 to G10 are provided in place of providing the common upper electrode layer G0 as electrode layers opposite to the five lower electrode layers G1 to G5.

<2.5> Modification 2

Figure 33:
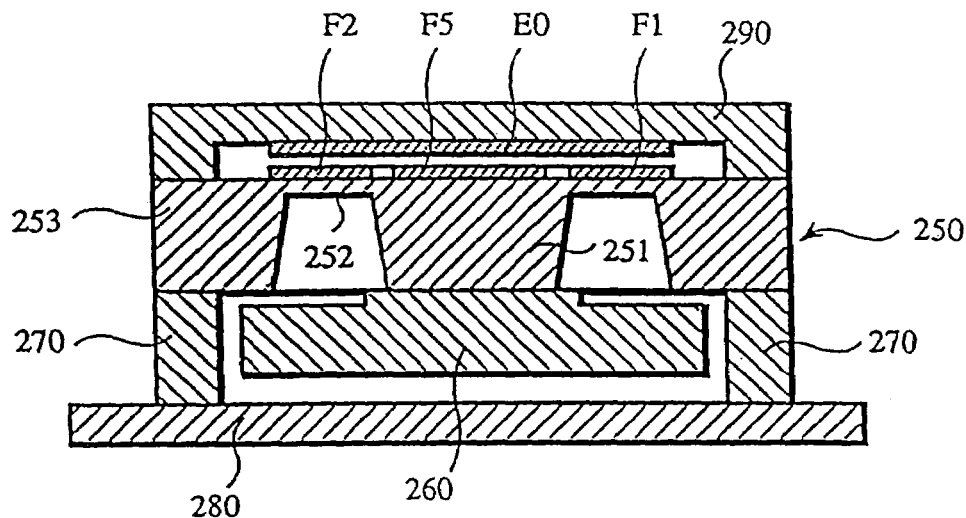
FIG. 33 is a side cross sectional view showing a second modification of the multi-axial angular velocity sensor shown in FIG. 28.
Figure 34:
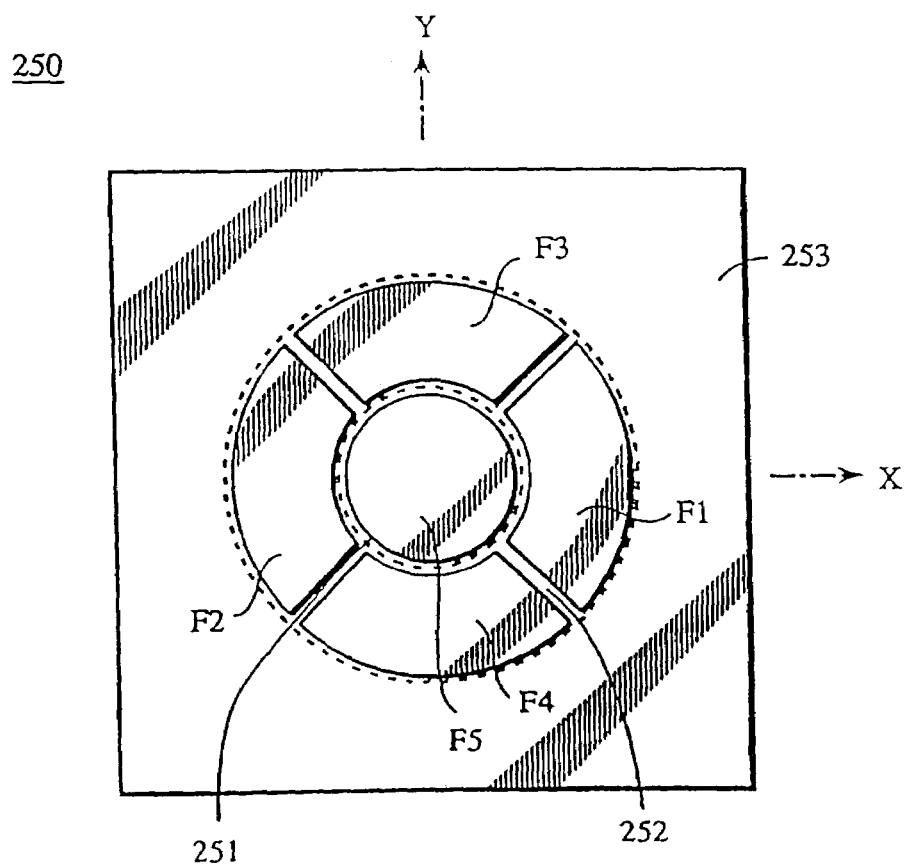
FIG. 34 is a top view of flexible substrate 250 of the multi-axial angular velocity sensor shown in FIG. 33.

A sensor shown in FIG. 33 is another modification of the sensor according to the second embodiment shown in FIG. 28. The substrate functioning as the center of this sensor is a flexible substrate 250. FIG. 34 is a top view of this flexible substrate 250. As indicated by broken lines in the figure, an annular groove is formed at the lower surface of the flexible substrate 250. Since the portion where such groove is formed has a thin thickness, it has flexibility (which is indicated as a flexible portion 252 in FIG. 33). It is now assumed that the inside portion encompassed by the annular flexible portion 252 is called a working portion 251 and the outside portion of the flexible portion 252 is called a fixed portion 253. On the lower surface of the working portion 251, an oscillator 260 in a block form is fixed. Further, the fixed portion 253 is supported by a pedestal 270 and the pedestal 270 is fixed on a base substrate 280. Eventually, the oscillator 260 is placed in hanging state within a space encompassed by the pedestal 270. Since the flexible portion 252 with a thin thickness has flexibility, the oscillator 260 can undergo displacement within this space with a certain degree of freedom. Further, a cover substrate 290 is attached at the upper portion of the flexible substrate 250 in such a manner to cover it while keeping a predetermined space.

As shown in FIG. 34, five lower electrode layers F1 to F5 are formed on the upper surface of flexible substrate 250. These electrode layers have the same shape and the same arrangement as those of the lower electrode layers F1 to F5 in the sensor according to the first embodiment shown in FIG. 6. Further, a common upper electrode layer E0 opposite to all the five lower electrode layers F1 to F5 is formed on the lower surface of the cover substrate 290. It is to be noted that since the operation of this sensor is equivalent to the operation of the sensor shown in FIG. 27, the detailed explanation is omitted here.

§3 Third Embodiment

<3.1> Structure of Sensor According to Third Embodiment

Subsequently, a multi-axial angular velocity sensor according to the third embodiment of this invention will be described. While the third embodiment is the same as the previously described sensors of the first and second embodiments in that mechanism utilizing Coulomb's force is used as an oscillating mechanism, it is characterized in that mechanism utilizing a piezo resistance element is used as a detecting mechanism.

Figure 35:
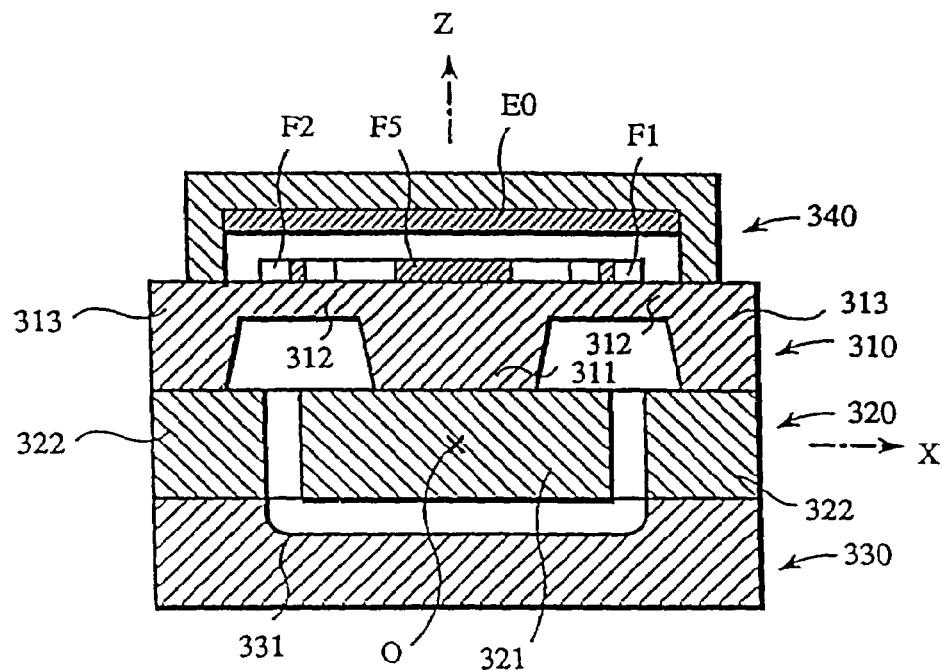
FIG. 35 is a side cross sectional view showing the structure of a multi-axial angular velocity sensor according to a third embodiment of this invention.
Figure 36:
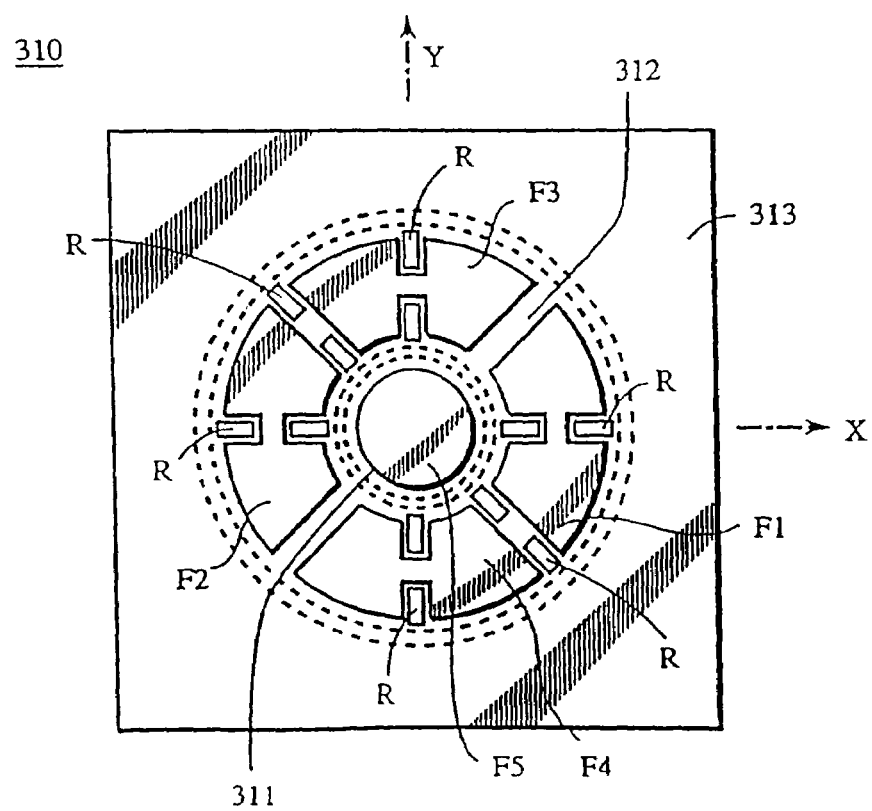
FIG. 36 is a top view of flexible substrate 310 of the multi-axial angular velocity sensor shown in FIG. 35.

FIG. 35 is a side cross sectional view of the multi-axial angular velocity sensor according to the third embodiment. This sensor includes, as major components, a first substrate 310, a second substrate 320, a third substrate 330, and a fourth substrate 340. In this embodiment, the first and third substrates 310 and 330 are constituted with silicon substrate, and the second and fourth substrates 320 and 340 are constituted with a glass substrate. Such structure comprised of four layers of substrates is substantially the same as the modification shown in FIG. 32 in the previously described second embodiment. The first substrate 310 is a substrate which performs the role serving as the center of this sensor, and FIG. 36 is a top view of the first substrate 310. As indicated by broken lines in the figure, an annular groove is formed at the lower surface of the first substrate 310. Since the portion where this groove is formed has a thin thickness, it has flexibility (which is indicated as a flexible portion 312 in FIG. 35). It is now assumed that the inside portion encompassed by the annular flexible portion 312 is called a working portion 311 and the outside portion of the flexible portion 312 is called a fixed portion 313. The second substrate 320 is constituted with an oscillator 321 in a block form and a pedestal 322 in a frame form to surround the periphery thereof. The oscillator 321 is fixed on the bottom surface of the working portion 311. Further, the pedestal 322 is fixed on the bottom surface of the fixed portion 313.

A third substrate 330 performs the role as a base substrate for supporting the pedestal 322. To realize this, at the portion except for the periphery on the upper surface side of the third substrate 330, a recess 331 is formed. By formation of this recess 331, the oscillator 321 is supported without being in contact with the third substrate 330. Eventually, the oscillator 321 is in hanging state within a space encompassed by the pedestal 322. Since the flexible portion 312 with a thin thickness has flexibility in the first substrate 310, the oscillator 321 can undergo displacement within this space with a certain degree of freedom. Further, a fourth substrate 340 is attached at the upper part of the first substrate 310 in a manner to cover it while keeping a predetermined space.

As shown in FIG. 36, five lower electrode layers F1 to E5 are formed on the upper surface of the first substrate 310. These electrode layers are equivalent to the lower electrode layers F1 to F5 in the sensor according to the first embodiment shown in FIG. 6. It is to be noted that, as described later, a plurality of piezo resistance elements R are formed on the upper surface of the first substrate 310, and the shape of lower electrode layers F1 to F4 is somewhat different from the shape of the lower electrode layers F1 to F4 in the sensor shown in FIG. 6 so as to avoid the region where these piezo resistance elements R are formed. Further, a common upper electrode layer E0 face to all the five lower electrode layers F1 to F5 is formed on the lower surface of the fourth substrate 340.

Figure 37:
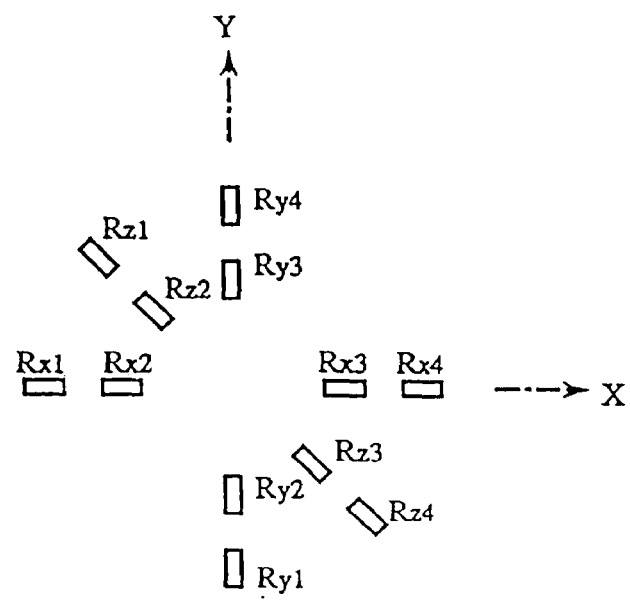
FIG. 37 is a view showing arrangement of resistance elements R shown in FIG. 36.

Piezo resistance elements R are an element formed by injecting impurity at predetermined positions on the upper surface side of the first substrate 310 comprised of silicon, and have the property that electric resistance varies by action of mechanical stress. As shown in FIG. 36, twelve piezo resistance elements R in total, that is, four elements along the X-axis, four elements along the Y-axis, and four elements along an oblique axis inclined at 45 degrees relative to the Y-axis are arranged. All elements are arranged on the flexible portion 312 having thin thickness. When bending takes place in the flexible portion 312 by displacement of the oscillator 321, resistance values of the piezo-resistance elements vary in correspondence with this bending. It is to be noted that, in the side cross sectional view of FIG. 35, indication of these piezo resistance elements R is omitted for avoidance of complexity of the figure. It is now assumed that, as shown in FIG. 37, with respect to these twelve resistance elements, four resistance elements arranged along the X-axis are called Rx1, Rx2, Rx3, Rx4, four resistance elements arranged along the Y-axis are called Ry1, Ry2, Ry3, Ry4, and four resistance elements arranged along the oblique axis are called Rz1, Rz2, Rz3, Rz4.

<3.2> Mechanism for Oscillating Oscillator

In this sensor, the mechanism for oscillating the oscillator 321 in a predetermined axis direction is exactly the same as that of the sensor according to the first embodiment shown in FIG. 6. The five lower electrode layers F1 to F5 shown in FIG. 36 is completely equivalent to the five lower electrode layers F1 to F5 shown in FIG. 7 in point of the essential function although the shape is somewhat different. Accordingly, by applying a predetermined voltage to the five lower electrode layers F1 to F5 and the common upper electrode layer E0 opposite thereto at a predetermined timing, Coulomb's force is applied across both the electrode layers, thus making it possible to oscillate the oscillator 321 in any direction of the X-axis, the Y-axis and the Z-axis in the XYZ three-dimensional coordinate system.

<3.3> Mechanism for Detecting Coriolis Force

Figure 38:
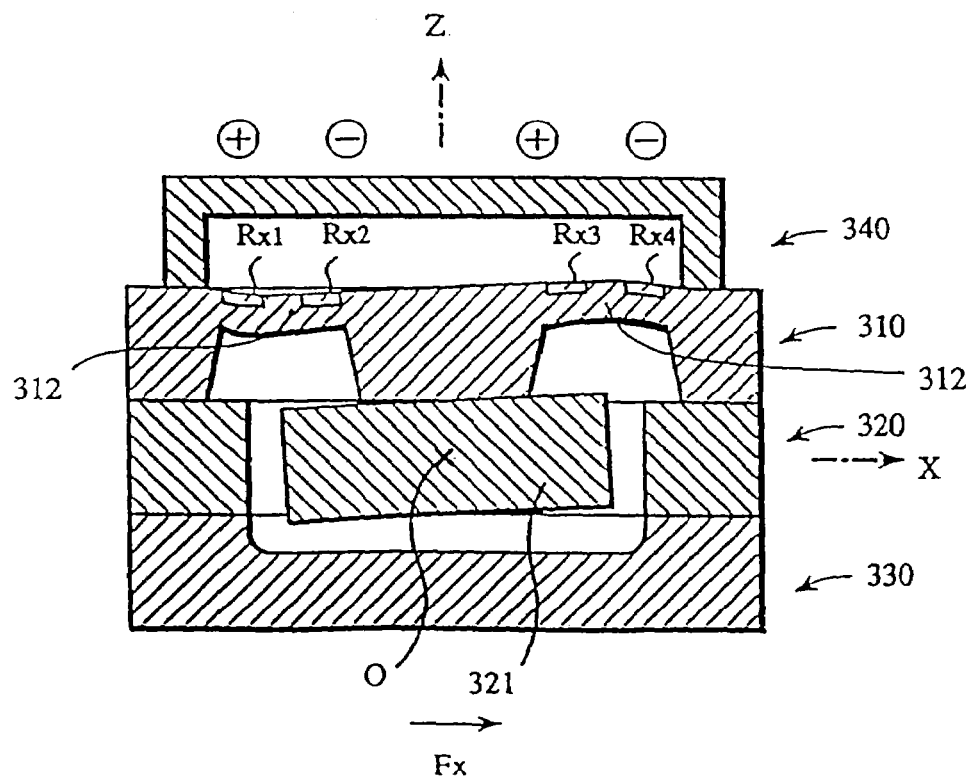
FIG. 38 is a side cross sectional view showing a state where Coriolis force Fx is exerted on the multi-axial angular velocity sensor shown in FIG. 35.

The feature of the sensor according to this third embodiment resides in that detection of Coriolis force is carried out by using piezo resistance elements. This detecting method will now be described. Let now consider the case where a Coriolis force Fx in the positive direction of the X-axis is applied to the oscillator 321 as shown in FIG. 38 (indication of respective electrode layers is omitted in this figure for the purpose of avoiding complexity of the figure). When Coriolis force Fx is applied, bending as shown in the figure takes place in the flexible portion 312 of the first substrate 310. Such a bending varies resistance values of the four piezo-resistance elements Rx1 to Rx4 arranged along the X-axis. In actual terms, resistance values of the piezo resistance elements Rx1, Rx3 increase (indicated by "+" sign in the figure), whereas resistance values of the piezo resistance elements Rx2, Rx4 decrease (indicated by "−" sign in the figure). In addition, the degree of increase/decrease is proportional to the magnitude of Coriolis force Fx applied. On the other hand, in the case where Coriolis force −Fx in the negative direction of the X-axis is applied, the relationship of increase/decrease is inverted. Accordingly, if changes of resistance values of respective piezo resistance elements are detected, it is possible to determine the applied Coriolis force Fx.

Figure 39:
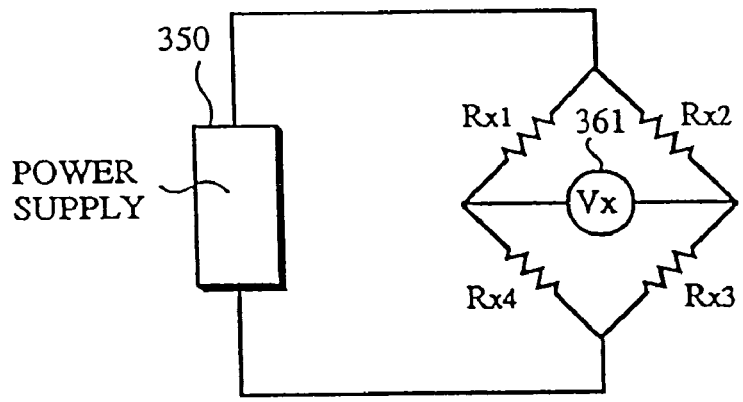
FIG. 39 is a circuit diagram showing an example of a circuit for detecting Coriolis force Fx in the X-axis direction exerted on the multi-axial angular velocity sensor shown in FIG. 35.

In more practical sense, a bridge circuit as shown in FIG. 39 is formed by the four piezo resistance elements Rx1 to Rx4 to apply a predetermined voltage by using a power supply 350. Then, a bridge voltage Vx is measured by a voltage meter 361. Here, in the reference state where no Coriolis force is applied (the state shown in FIG. 35), when setting is made such that the bridge circuit is equilibrated (bridge voltage Vx becomes equal to zero), bridge voltage Vx measured by the voltage meter 361 indicates Coriolis force Fx.

Figure 40:
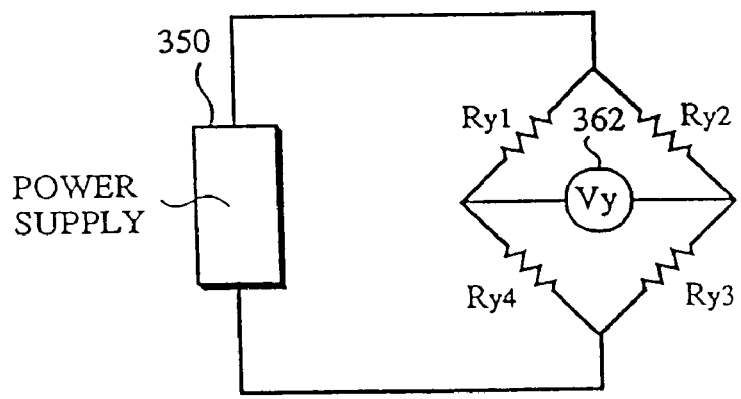
FIG. 40 is a circuit diagram showing an example of a circuit for detecting Coriolis force Fy in the Y-axis direction exerted on the multi-axial angular velocity sensor shown in FIG. 35.

On the other hand, when Coriolis force Fy in the Y-axis direction is applied, similar resistance value changes take place with respect to the four piezo resistance elements Ry1 to Ry4 arranged along the Y-axis. Accordingly, when a bridge circuit as shown in FIG. 40 is formed by these four piezo resistance elements to deliver a predetermined voltage by using a power supply 350, a bridge voltage Vy measured by a voltage meter 362 indicates Coriolis force Fy.

Figure 41:
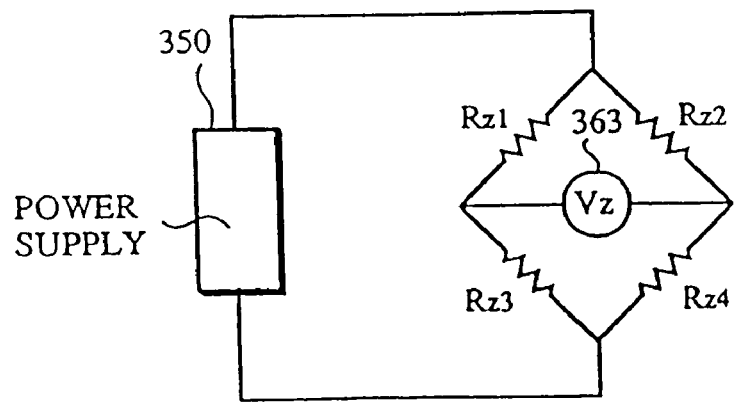
FIG. 41 is a circuit diagram showing an example of a circuit for detecting Coriolis force Fz in the Z-axis direction exerted on the multi-axial angular velocity sensor shown in FIG. 35.

Further, when Coriolis force Fz in the Z-axis direction is applied, resistance value changes take place with respect to the four piezo resistance elements Rz1 to Rz4 arranged along the oblique axis. For example, when Coriolis force in the positive direction of the Z-axis is applied, resistance values of the piezo resistance elements Rz1, Rz4 decrease, whereas resistance values of the piezo resistance elements Rz2, Rz3 increase. Accordingly, when a bridge circuit as shown in FIG. 41 is formed by these four piezo resistance elements to deliver a predetermined voltage by using a power supply 350, a bridge voltage Vz measured by a voltage meter 363 indicates Coriolis force Fz.

When detection of Coriolis force is carried out by using piezo resistance elements in this way, the mechanism for oscillating the oscillator 321 in a predetermined axial direction (utilizing Coulomb's force between electrode layers) and the mechanism for detecting Coriolis force are completely independent. Thus, there is no possibility that they may interfere with each other.

<3.4> Modification

Respective lower electrode layers F1 to F4 in the above-described sensor are arranged on the X-axis and the Y-axis similarly to the previously described sensor of the first embodiment. On the contrary, as in the lower electrode layers G1 to G4 in the sensor according to the second embodiment shown in FIG. 29, they may be arranged in the first to fourth quadrants with respect to the XY plane. Further, the four piezo resistance elements Rz1 to Rz4 may be arranged in any axial direction, e.g., may be arranged along the axis in parallel to the X-axis or Y-axis.

§4 Fourth Embodiment

<4.1> Structure of Sensor According to the Fourth Embodiment

A multi-axial angular velocity sensor according to the fourth embodiment of this invention will now be described. The fourth embodiment is directed to a sensor using piezo-electric elements for both the oscillating mechanism and the detecting mechanism.

Figure 42:
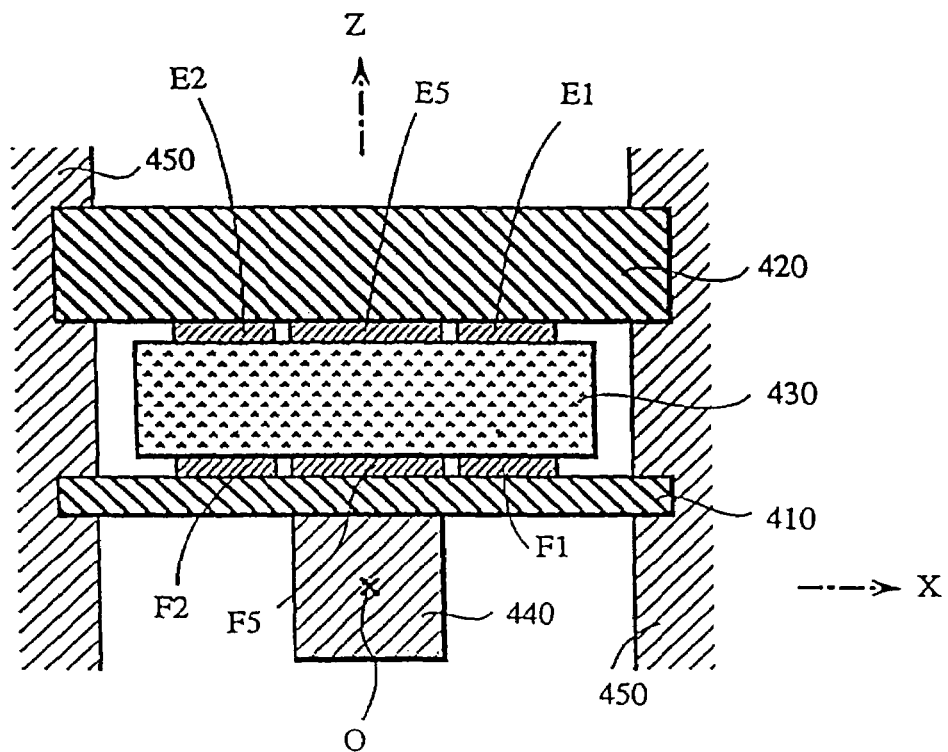
FIG. 42 is a side cross sectional view showing a structure of a multi-axial angular velocity sensor according to a fourth embodiment of this invention.

FIG. 42 is a side cross sectional view of the multi-axial angular velocity sensor according to the fourth embodiment. This sensor has a structure very similar to the sensor according to the first embodiment shown in FIG. 6, and comprises respective components as described below. Namely, fundamentally, this sensor is of a structure such that, between a disk-shaped flexible substrate 410 and a disk-shaped fixed substrate 420, a piezoelectric element 430 similarly disk-shaped is inserted. On the lower surface of the flexible substrate 410, a columnar oscillator 440 is fixed. Further, the outer circumferential portion of the flexible substrate 410 and the outer circumferential portion of the fixed substrate 420 are both supported by a sensor casing 450. On the upper surface of the piezoelectric element 430, five upper electrode layers E1 to E5 (only a portion thereof is indicated in FIG. 42) are formed. Similarly, on the lower surface thereof, five lower electrode layers F1 to F5 (only a portion thereof is similarly indicated) are formed. The upper surfaces of the upper electrode layers E1 to E5 are fixed on the lower surface of the fixed substrate 420, and the lower surfaces of the lower electrode layers F1 to F5 are fixed on the upper surface of the flexible substrate 410. In this example, the fixed substrate 420 has a sufficient rigidity to such a degree that no bending takes place. On the other hand, the flexible substrate 410 has flexibility and functions as so called diaphragm. Let now consider an XYZ three-dimensional coordinate system using gravity position O of the oscillator 440 as the origin. Namely, an X-axis is defined in a right direction in the figure, as a Z-axis is defined in an upper direction, and a Y-axis is defined in a direction Perpendicular to the plane surface of paper. FIG. 42 is a cross sectional view cut along the XZ plane of this sensor. It is to be noted that shape and arrangement of the upper electrode layers E1 to E5 and the lower electrode layers F1 to F5 are exactly the same as those of the sensor of the first embodiment shown in FIG. 6 (see FIGS. 7 and 8). Further, in this embodiment, the flexible substrate 410 and the fixed substrate 420 are both constituted by insulating material. In the case of attempting to constitute these substrates with conductive material such as metal, etc., it is sufficient to provide insulating films between these substrates and respective electrode layers so that the respective electrode layers are not short-circuited with each other.

Figure 43A:
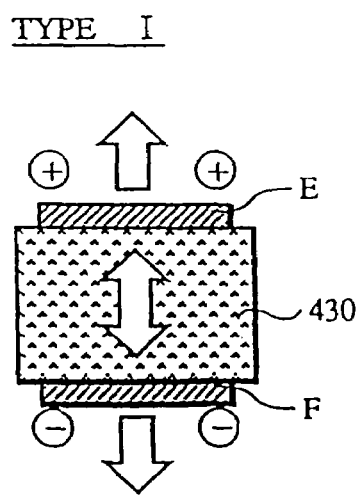
FIGS. 43(*a*) and 43(*b*) are views showing a polarization characteristic of a piezoelectric element used in the multi-axial angular velocity sensor shown in FIG. 42.
Figure 43B:
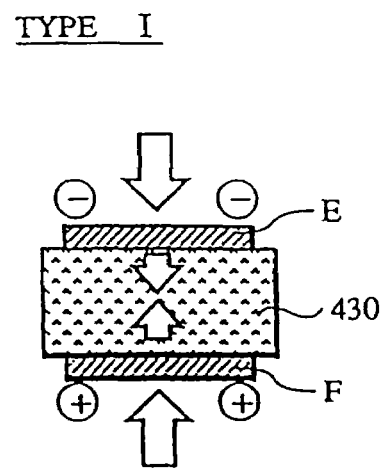

Generally, a piezoelectric element has the first property that when pressure is applied thereto from the external, a voltage is produced in a predetermined direction within the piezoelectric element and the second property that when voltage is applied thereto from the external, pressure is produced in a predetermined direction within the piezoelectric element in a manner opposite to the above. These two properties have the reverse of each other. The relationships between directions in which pressure/voltage is applied and directions in which voltage/pressure is produced are inherent in individual piezoelectric elements. Here, the property of such directivity is called "polarization characteristic". The piezoelectric element 430 used in the sensor of this embodiment has a polarization characteristic as shown in FIGS. 43(a) and 43(b). Namely, when considered from the viewpoint of the previously described first property, the piezoelectric element has a polarization characteristic such that in the case where a force to expand in a thickness direction is applied as shown in FIG. 43(a), positive charges and negative charges are respectively produced on the upper electrode layer E side and on the lower electrode layer F side, while in the case where a force to contract in the thickness direction is applied as shown in FIG. 43(b), negative charges and positive charges are respectively produced on the upper electrode layer E side and on the lower electrode layer F side. When considered from a view-point of the second property in a manner opposite to the above, the piezoelectric element has a polarization characteristic such that when positive charges and negative charges are respectively delivered to the upper electrode layer E side and the lower electrode layer F side as shown in FIG. 43(a), a force to expand in the thickness direction is produced, while when negative charges and positive charges are respectively delivered to the upper electrode layer E side and the lower electrode layer F side, a force to contract in the thickness direction is produced as shown in FIG. 43(b).

<4.2> Mechanism for Oscillating Oscillator

Figure 44:
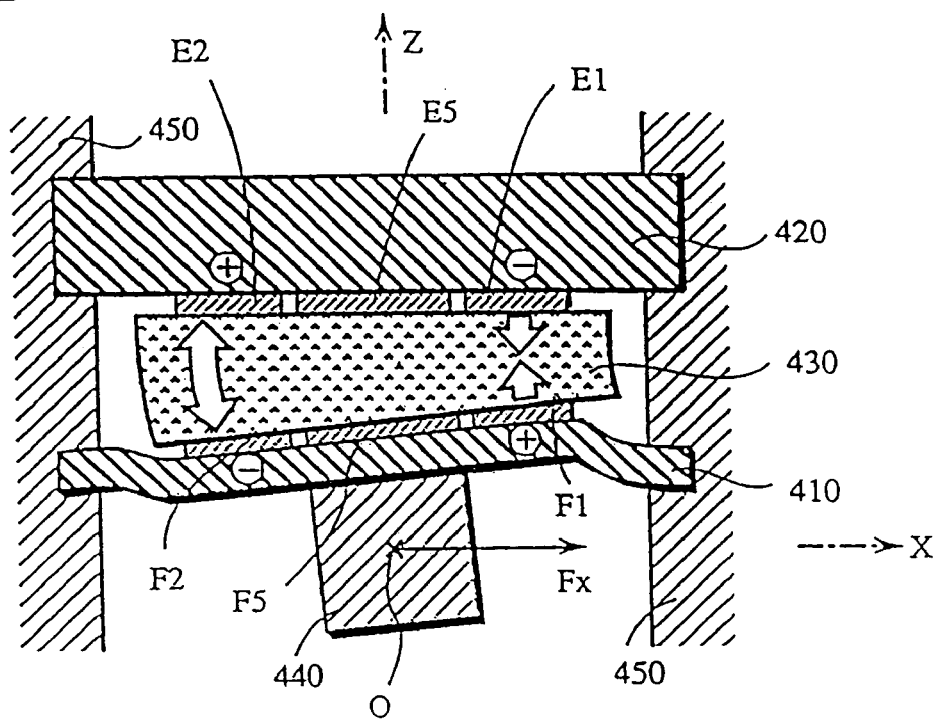
FIG. 44 is a side cross sectional view showing a state where the multi-axial angular velocity sensor shown in FIG. 42 is caused to undergo displacement in the X-axis direction.

Let now study what phenomenon takes place in the case where charges having a predetermined polarity are delivered to a predetermined electrode layer of this sensor. When negative charges and positive charges are respectively delivered to the electrode layer E1 and F1, a force to contract in a thickness direction is produced at a portion of the piezoelectric element 430 put between both the electrode layers by the property shown in FIG. 43(b). On the other hand, when positive charges and negative charges are respectively delivered to the electrode layers E2, F2, a force to expand in a thickness direction is produced at a portion of the piezoelectric element 430 put between both the electrode layers by the property shown in FIG. 43(a). As a result, the piezoelectric element 430 is deformed as shown in FIG. 44 and the oscillator 440 is caused to undergo displacement in the positive direction of the X-axis. Now, when the polarity of charges which have been delivered to the electrode layers E1, F1, E2, F2 is inverted, the expanding/contracting state of the piezoelectric element 430 is also inverted. Thus, the oscillator 440 is caused to undergo displacement in the negative direction of the X-axis. When an approach is employed to interchangeably invert the polarity of charges delivered so that these two displacement states take place one after another, it is possible to reciprocate the oscillator 440 in the X-axis direction. In other words, the oscillator 440 is permitted to undergo oscillation Ux with respect to the X-axis direction.

Such charge supply can be realized by applying an a.c. signal across opposite electrode layers. Namely, a first a.c. signal is applied across the electrode layers E1, F1, and a second a.c. signal is applied across the electrode layers E2, F2. If signals having the same frequency and phases opposite to each other ate used as the first and second a.c. signals, the oscillator 440 can be oscillated in the X-axis direction.

A method of allowing the oscillator 440 to undergo oscillation Uy with respect to the Y-axis direction is also exactly the same. Namely, it is sufficient to apply a first a.c. signal across the electrode layers E3, F3, and to apply a second a.c. signal across the electrode layers E4, F4.

Figure 45:
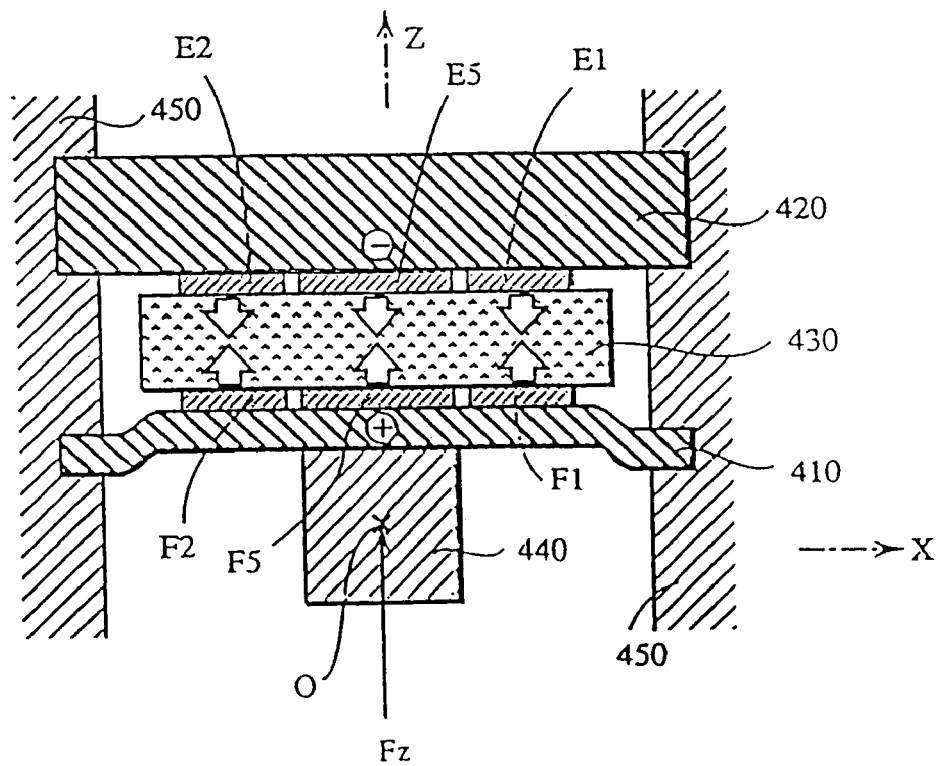
FIG. 45 is a side cross sectional view showing a state where the multi-axial angular velocity sensor shown in FIG. 42 is caused to undergo displacement in the Z-axis direction.

Let now consider a method of allowing the oscillator 440 to undergo oscillation Uz with respect to the Z-axis direction. Assuming now that negative charges and positive charges are respectively delivered to the electrode layers E5, F5, a force to contract in a thickness direction is produced at a portion of the piezoelectric element 430 put between both the electrode layers. As a result, the piezoelectric element 430 is deformed as shown in FIG. 45 and the oscillator 440 is caused to undergo displacement in the positive direction of the Z-axis. When the polarity of charges which have been delivered to the electrode layers E5, F5 is inverted, the expanding/contracting state of the piezoelectric element 430 is also inverted. Thus, the oscillator 440 is caused to undergo displacement in the negative direction of the Z-axis. If the polarity of charges delivered is reciprocally inverted so that these two displacement states take place one after another, the oscillator 440 can be reciprocated in the Z-axis direction. In other words, the oscillator is permitted to undergo oscillation Uz with respect to the Z-axis direction. Such charge supply can be realized by applying an a.c. signal across the opposite electrode layers E5, F5.

As stated above, if a predetermined a.c. signal is delivered to a specific set of electrode layers, it is possible to oscillate the oscillator 430 along the X-axis, the Y-axis and the Z-axis.

<4.3> Mechanism for Detecting Coriolis Force

Subsequently, a method of detecting Coriolis force components exerted in respective axial directions in the sensor according to the fourth embodiment will be described. It is to be noted that, for the purpose of saving paper, FIGS. 44 and 45 which were used for explanation of the previously described method of oscillating the oscillator are used also in the explanation of the method of detecting Coriolis force.

Figure 5:
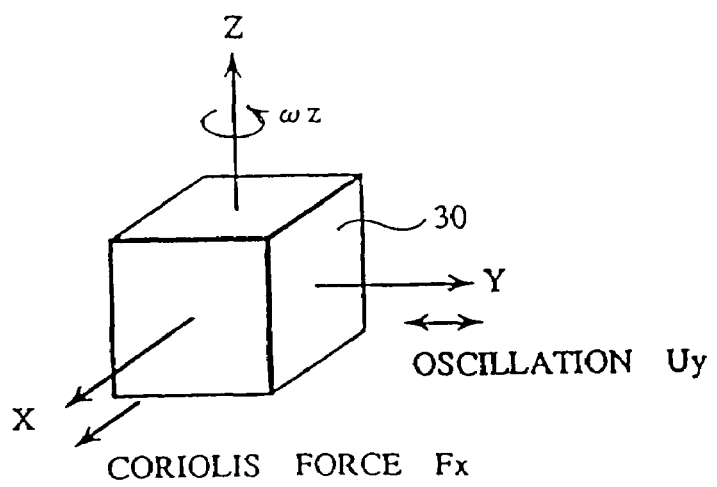
FIG. 5 is a view for explaining the fundamental principle for detecting an angular velocity component ωz about the Z-axis by this invention.

First, let consider the case where Coriolis force Fx in the X-axis direction is applied to the oscillator 440 as shown in FIG. 44 (In accordance with the principle shown in FIG. 5, since measurement of such Coriolis force Fx is carried out in the state caused to undergo oscillation Uy in the Y-axis direction, the oscillator 440 is assumed to be oscillated in a direction perpendicular to plane surface of paper in FIG. 44, but such oscillating phenomenon in the Y-axis direction has no influence on measurement of Coriolis force Fx in the X-axis direction). By action of such Coriolis force Fx, bending is produced in the flexible substrate 410 performing the function of diaphragm, so a force to contract in thickness direction is exerted at the right half of the piezoelectric element 430, and a force to expand in thickness direction is exerted at the left half. Also in the case where Coriolis force Fy in the Y-axis direction is exerted, the direction of the axis is only shifted by 90 degrees, but a phenomenon similar to the above is to take place. In addition, in the case where Coriolis force in the Z-axis direction is exerted, the piezoelectric element 430 undergoes a force to contract in thickness direction as a whole as shown in FIG. 45.

Figure 46:
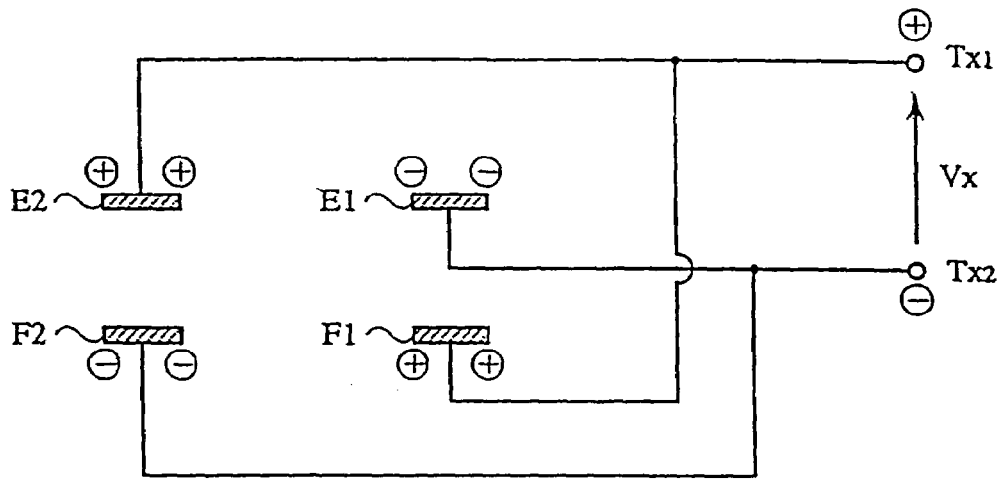
FIG. 46 is a wiring diagram showing a wiring for detecting Coriolis force Fx in the X-axis direction exerted on the multi-axial angular velocity sensor shown in FIG. 42.
Figure 47:
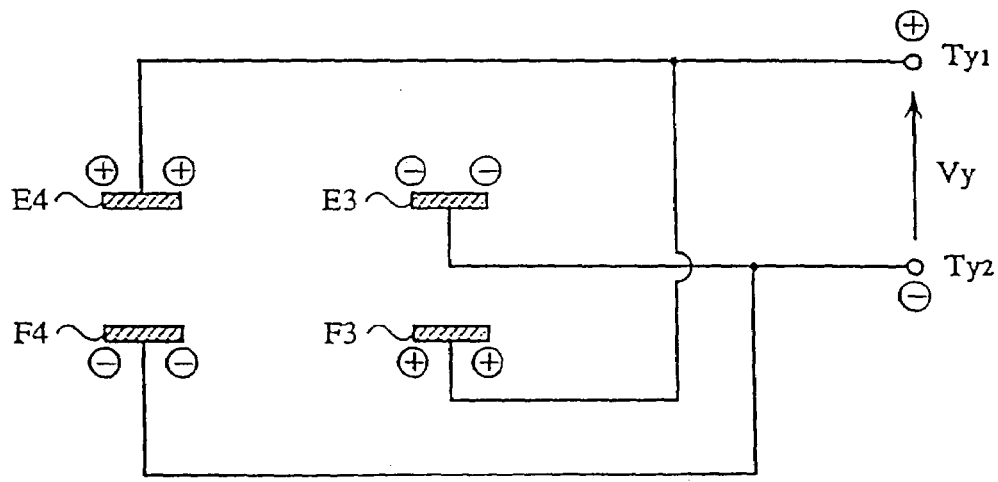
FIG. 47 is a wiring diagram showing a wiring for detecting Coriolis force Fy in the Y-axis direction exerted on the multi-axial angular velocity sensor shown in FIG. 42.
Figure 48:
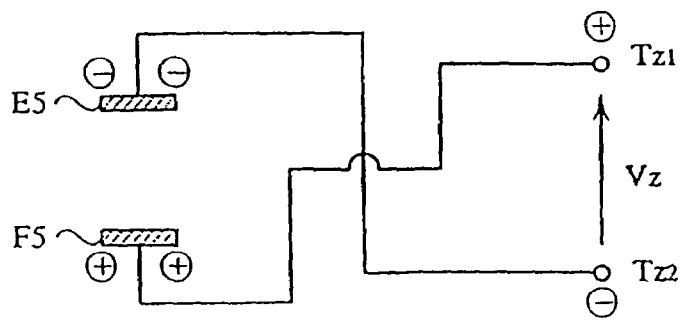
FIG. 48 is a wiring diagram showing a wiring for detecting Coriolis force Fz in the Z-axis direction exerted on the multi-axial angular velocity sensor shown in FIG. 42.

When a pressure as described above is applied to the piezoelectric element 430, charges of a predetermined polarity are produced at respective electrode layers by the property shown in FIGS. 43(a) and 43(b). Accordingly, if charges thus produced are detected, a Coriolis force applied can be detected. In more practical sense, wirings as shown in FIGS. 46 to 48 are implemented to respective electrode layers, thereby making it possible to detect applied Coriolis force components Fx, Fy, Fz. For example, Coriolis force component Fx in the X-axis direction can be detected as voltage difference Vx produced between terminals Tx1 and Tx2 as shown in FIG. 46. It is possible to easily understand the reason when consideration is made in connection with the polarity of charges produced at respective electrode layers. Namely, with respect to the electrode layers E2, F2, since a portion of the piezoelectric element 430 put therebetween is subject to a force to expand in a thickness direction, positive charges and negative charges are respectively produced at the upper electrode layer E2 and the lower electrode layer F2 as shown in FIG. 43(a). On the other hand, with respect to the electrode layers E1, F1, since a portion of the piezoelectric element 430 put therebetween is subject to a force to contract in thickness direction, negative charges and positive charges are respectively produced at the upper electrode layer E1 and the lower electrode layer F1 as shown in FIG. 43(b). Accordingly, when a wiring as shown in FIG. 46 is implemented, positive charges are all gathered at terminal Tx1 and negative charges are all gathered at terminal Tx2. Thus, a potential difference Vx across both terminals indicates Coriolis force Fx. Entirely in the same manner, when a wiring as shown in FIG. 47 is implemented to the upper electrode layers E3, E4 and the lower electrode layers F3, F4, it is possible to detect Coriolis force Fy in the Y-axis direction as a potential difference Vy across terminals Ty1 and Ty2. In addition, it is possible to detect a Coriolis force Fz in the Z-axis direction as a potential difference Vz produced across terminals Tz1 and Tz2 as shown in FIG. 48. The reason can be easily understood when consideration is made in connection with polarity of charges produced at respective electrode layers by bending as shown in FIG. 45. Namely, with respect to the electrode layers E5, F5, since a portion of the piezoelectric element 430 put therebetween is subject to a force to contract in thickness direction, negative charges and positive charges are respectively produced at the upper electrode layer E5 and the lower electrode layer F5 as shown in FIG. 43(b). Accordingly, when such a wiring to gather positive charges at terminal Tz1 and to gather negative charges at terminal Tz2 is implemented as shown in FIG. 48, a potential difference Vz across both terminals indicates Coriolis force Fz in the Z-axis direction.

<4.4> Detection of Angular Velocity

The object of the multi-axial angular velocity sensor according to this invention resides in that as explained in §0, in order to detect an angular velocity ω about a first axis, an oscillator is allowed to undergo oscillation U in a second axis direction to detect a Coriolis force F produced in a third axis direction at that time. As described above, in the sensor according to the fourth embodiment, an a.c. signal is applied across a predetermined pair of electrode layers, thereby making it possible to oscillate the oscillator 430 along any axial direction of the X-axis, the Y-axis and the Z-axis, and to respectively detect Coriolis force components Fx, Fy, Fz in respective axes directions produced at that time as potential differences Vx, Vy, Vz. Accordingly, by the principle shown in FIGS. 3 to 5, it is possible to detect an angular velocity ω about any axis of the X-axis, the Y-axis and the Z-axis.

It should be noted that, in the sensor according to this embodiment, a piezoelectric element is used for both the oscillating mechanism and the detecting mechanism. In other words, the same electrode layer may perform the role for delivering charges for producing oscillation (the role as the oscillating mechanism), or may perform the role for detecting charges produced by Coriolis force (role as the detecting mechanism). With the same electrode layer, it is relatively difficult to permit these two roles to be performed at the same time. However, in this sensor, since sharing of roles as described below is made with respect to respective electrode layers, there is no possibility that two roles may be given to the same electrode layer at the same time.

Let first consider the operation for detecting angular velocity ω about the X-axis on the basis of the principle shown in FIG. 3. In this case, it is necessary to detect a Coriolis force Fy produced in the Y-axis direction when an oscillator is caused to undergo oscillation Uz in the Z-axis direction. In the sensor shown in FIG. 42, in order to allow the oscillator 430 to undergo oscillation Uz, it is sufficient to apply an a.c. signal across the electrode layers E5, F5. Further, in order to detect Coriolis force Fy exerted on the oscillator 430, it is sufficient to detect charges produced at the electrode layers E3, F3, E4, F4 as shown in the circuit diagram of FIG. 47. The remaining electrode layers E1, F1, E2, F2 are not used in this detecting operation.

Subsequently, let consider the operation for detecting angular velocity ωy about the Y-axis on the basis of the principle shown in FIG. 4. In this case, it is necessary to detect a Coriolis force Fz produced in the Z-axis direction when an oscillator is caused to undergo oscillation Ux in the X-axis direction. In the sensor shown in FIG. 42, in order to allow the oscillator 430 to undergo oscillation Ux, it is sufficient to apply a.c. signals having phases opposite to each other across the electrode layers E1, F1 and across the electrode layers E2, F2. Further, in order to detect Coriolis force Fz exerted on the oscillator 430, it is sufficient to detect charges produced at the electrode layers E5, F5 as shown in the circuit diagram of FIG. 48. The remaining electrode layers E3, F3, E4, F4 are not used in this detecting operation.

Finally, let consider the operation for detecting an angular velocity ωz about the Z-axis on the basis of the principle shown in FIG. 5. In this case, it is necessary to detect Coriolis Fx produced in the X-axis direction when an oscillator is caused to undergo oscillation Uy in the Y-axis direction. In the sensor shown in FIG. 42, in order to allow the oscillator 430 to undergo oscillation Uy, it is sufficient to apply a.c. signals having phases opposite to each other across the electrode layers E3, F3 and across the electrode layers E4, F4. Further, in order to detect Coriolis force Fx exerted on the oscillator 430, it is sufficient to detect charges produced at the electrode layers E1, F1, E2, F2 as shown in the circuit diagram of FIG. 46. The remaining electrode layers E5, F5 are not used in this detecting operation.

It is seen that in the case of detecting any one of angular velocities ωx, ωy, ωz by using this sensor as stated above, sharing of roles with respect to respective electrode layers is conveniently carried out so that detection can be carried out without hindrance. It should be noted that since it is unable to detect plural ones of angular velocities ωx, ωy, ωz, in the case where an attempt is made to detect three angular velocity components, it is required to carry out time-division processing as described later to sequentially carry out detections one by one.

<4.5> Modification 1

In accordance with the above-described sensor according to the fourth embodiment, it is possible to detect Coriolis force Fx, Fy, Fz in the XYZ three-dimensional coordinate system as potential differences Vx, Vy, Vz, respectively. Thus, detection of angular velocity can be made on the basis of these potential differences. However, in order to detect these potential differences, it is necessary to implement wirings as shown in the circuit diagrams of FIGS. 46 to 48 to respective electrode layers. Such wirings are such that upper electrode layers and lower electrode layers are mixed. Accordingly, in the case of mass-producing such sensors, the cost for wiring is not negligible as compared to the total cost of product. In this modification 1, the polarization characteristic of a piezoelectric element is partially varied, thereby simplifying wiring to reduce the manufacturing cost.

Generally, it is possible to manufacture piezoelectric elements having an arbitrary polarization characteristic by the present technology. For example, the piezoelectric element 430 used in the above-described sensor according to the fourth embodiment had a polarization characteristic as shown in FIGS. 43(*a*) and 43(*b*). On the other hand, it is also possible to manufacture a piezoelectric element 460 having a polarization characteristic as shown in FIGS. 49(*a*) and 49(*b*). Namely, this piezoelectric element 460 has a polarization characteristic such that in the case where a force to expand in thickness direction is applied as shown in FIG. 49(*a*), negative charges and positive charges are respectively produced on the upper electrode layer E side and on the lower electrode layer F side, while when a force to contract in thickness direction is applied as shown in FIG. 49(*b*), positive charges and negative charges are respectively produced on the upper electrode layer E side and on the lower electrode layer F side. It is now assumed that, for convenience, polarization characteristic as shown in FIGS. 43(*a*) and 43(*b*) is called type I and polarization characteristic as shown in FIGS. 49(*a*) and 49(*b*) is called type II. The piezoelectric element 430 having polarization characteristic of the type I and the piezoelectric element 460 having polarization characteristic of the type II are such that signs of charges produced on the upper surface side and on the lower surface side are inverted. It should be noted that since upsetting of the piezoelectric element 430 results in the piezoelectric element 460, it can be said that both the piezoelectric elements are exactly the same piezoelectric element when viewed as a single body. Therefore, it is not so significant to discriminate between both the piezoelectric elements. However, there may be employed a configuration such that a portion of one piezoelectric element is caused to have polarization characteristic of the type I and another portion thereof is caused to have polarization characteristic of the type II. The modification described below is characterized in that a piezoelectric element to which such a localized polarization processing is implemented is used to thereby simplify the structure of a multi-axial angular velocity sensor.

Let now consider a piezoelectric element 470 as shown in FIG. 50. This piezoelectric element 470 is a disk-shaped element which is exactly the same in shape as the piezoelectric element 430 used in the above-described sensor of FIG. 42, but its polarization characteristic is different from that of the piezoelectric element 430. The piezoelectric element 430 was an element in which all portions have polarization characteristic of the type I as previously described. On the contrary, the piezoelectric element 470 has a polarization characteristic of either the type I or the type II in five regions A1 to A5 as shown in FIG. 50. Namely, this piezoelectric element indicates polarization characteristic of the type I in regions A2, A4 and indicates polarization characteristic of the type II in regions A1, A3, A5. In this example, regions A1 to A5 correspond to regions where the upper electrode layers E1 to E5 or the lower electrode layers F1 to F5 are respectively formed.

Figure 51:
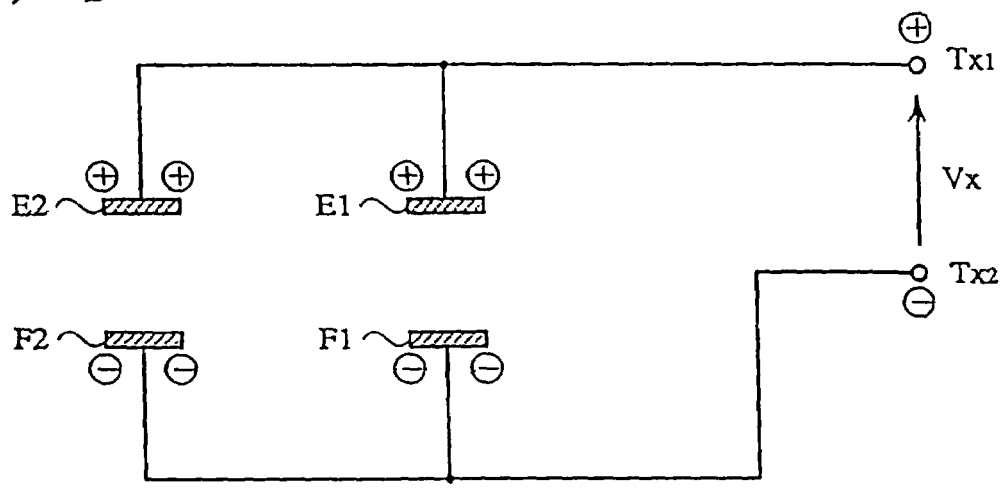
FIG. 51 is a wiring diagram showing a wiring for detecting Coriolis force Fx in the X-axis direction exerted on the multi-axial angular velocity sensor using piezoelectric elements shown in FIG. 50.
Figure 52:
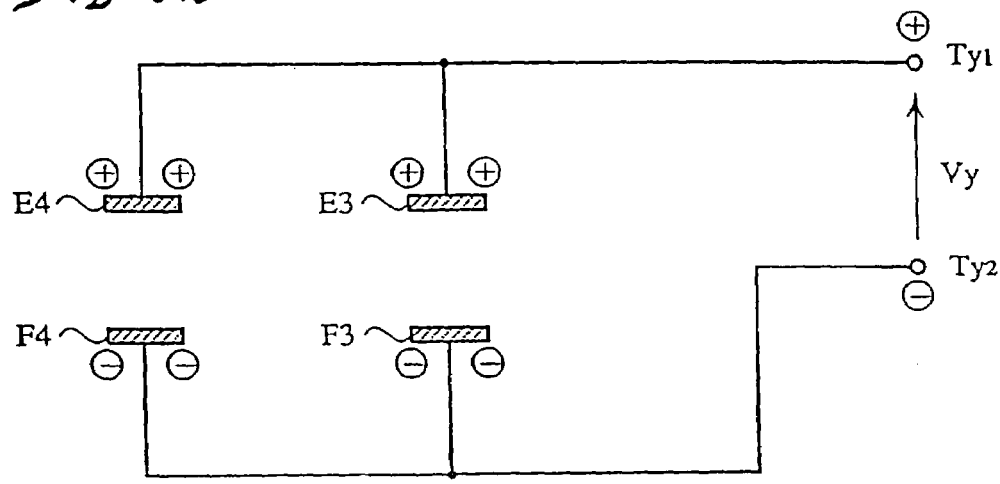
FIG. 52 is a wiring diagram showing a wiring for detecting Coriolis force Fy in the Y-axis direction exerted on the multi-axial angular velocity sensor using piezoelectric elements shown in FIG. 50.
Figure 53:
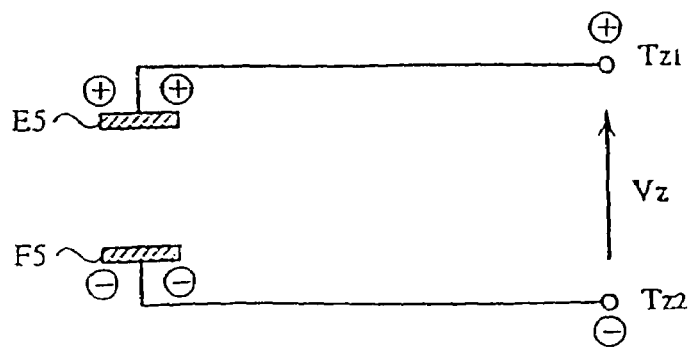
FIG. 53 is a wiring diagram showing a wiring for detecting Coriolis force Fz in the Z-axis direction exerted on the multi-axial angular velocity sensor using piezoelectric elements shown in FIG. 50.

Let now consider what polarities of charges produced on respective electrode layers in the case where the piezoelectric element 470 having localized polarization characteristic as shown in FIG. 50 is used in place of the piezoelectric element 430. It is thus understood that polarities of charges produced at the upper electrode layers E1, E3, E5 and the lower electrode layers F1, F3, F5 provided in the region having polarization characteristic of the type II is inverted with respect to the sensor using the piezoelectric element 430. For this reason, when wirings as shown in FIGS. 51 to 53 are implemented to the respective electrode layers, it is possible to determine Coriolis force components Fx, Fy, Fz as potential differences Vx, Vy, Vz, respectively. For example, with respect to Coriolis force Fx in the X-axis direction, since polarities of charges produced at the electrode layers E1, F1 are inverted with respect to the previously described example, the wiring shown in FIG. 46 is replaced by the wiring shown in FIG. 51. Similarly, with respect to Coriolis force Fy in the Y-axis direction, since polarities of charges produced at the electrode layers E3, F3 are inverted, the wiring shown in FIG. 47 is replaced by the wiring shown in FIG. 52. Further, with respect to Coriolis force Fz in the Z-axis direction, since polarities of charges produced at the electrode layers E5, F5 are inverted, the wiring shown in FIG. 48 is replaced by the wiring shown in FIG. 53.

It is to be noted that in the case where the piezoelectric element 470 having localized polarization characteristic is used, the polarity of an a.c. signal applied for oscillating the oscillator 430 must be varied as occasion demands. Namely, it is understood that in the case where the piezoelectric element 470 having a localized polarization characteristic is used, when a.c. signals having the same phase are applied across the electrode layers E1, F1 formed in the region A1 and the electrode layers E2, F2 formed in the region A2, it is possible to oscillate the oscillator 430 in the X-axis direction, and when a.c. signals having the same phase are similarly applied across the electrode layers E3, F3 formed in the region A3 and the electrode layers E4, F4 formed in the region A4, it is possible to oscillate the oscillator 430 in the Y-axis direction.

The wirings shown in FIGS. 51 to 53 have significant merits in manufacturing actual sensors as compared to the wirings shown in FIGS. 46 to 48. The feature of the wirings shown in FIGS. 51 to 53 resides in that even in the case where a Coriolis force in any direction of the X-axis, the Y-axis and the Z-axis is applied, if Coriolis force is applied in the positive direction of each axis, positive charges and negative charges are necessarily produced on the upper electrode layer side and on the lower electrode layer side. By making use of this feature, the wiring of the entirety of sensor can be simplified. For example, let consider the case where terminals Tx2, Ty2, Tz2 in FIGS. 51 to 53 are connected to the sensor casing 450 to allow those terminals to have a reference potential (earth). In this case, the five lower electrode layers F1 to F5 are brought into the state where they are conductive with each other. Even if such an approach is employed, potential difference Vx indicating Coriolis force Fx in the X-axis direction is obtained as a voltage with respect to the earth of terminal Tx1, potential difference Vy indicating Coriolis force Fy in the Y-axis direction is obtained as a voltage with respect to the earth of terminal Ty1, and potential difference Vz indicating Coriolis force Fz in the Z-axis direction is obtained as a voltage with respect to the earth of terminal Tz1. Accordingly, this sensor operates without any hindrance. In addition, since wirings with respect to the five lower electrode layers F1 to F5 are caused to conduct with each other, wiring can become very simple.

<4.6> Modification 2

Figure 54:
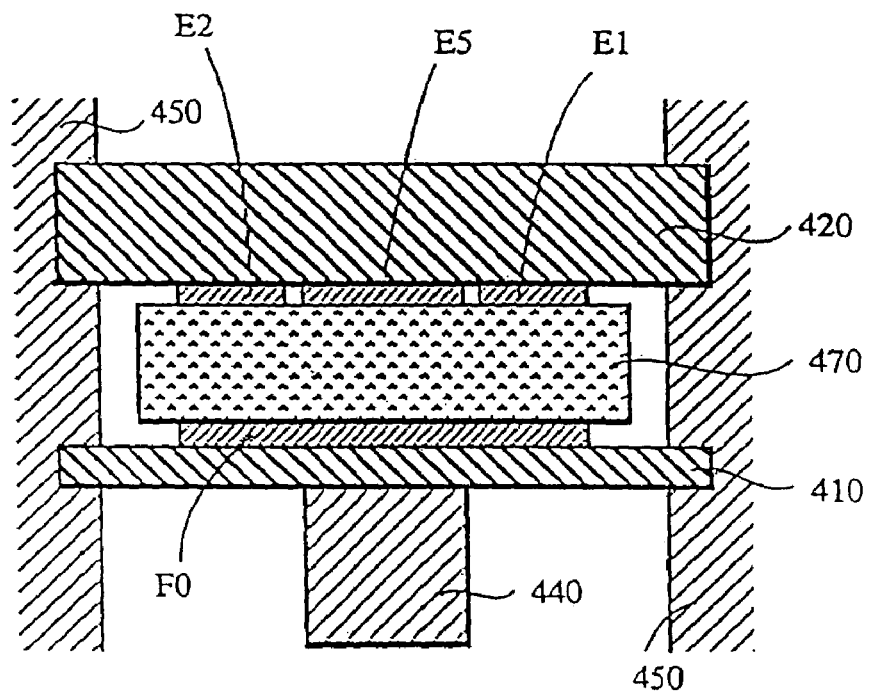
FIG. 54 is a side cross sectional view showing a structure of a second modification of the multi-axial angular velocity sensor shown in FIG. 42.

In the case where the piezoelectric element 470 having localized polarization characteristic as described in the above-described modification 1, it is possible to provide wiring which allows the five lower electrode layers F1 to F5 to be conductive. If the lower electrode layers F1 to F5 are permitted to be conductive in this way, there is no necessity of intentionally allowing these five electrode layers to be independent electrode layers, respectively. Namely, as shown in the side cross sectional view of FIG. 54, it is sufficient to provide only one common lower electrode layer F0. The common lower electrode layer F0 is a single disk-shaped electrode layer, and serves as an electrode opposite to all of five upper electrode layers E1 to E5.

<4.7> Modification 3

Figure 55:
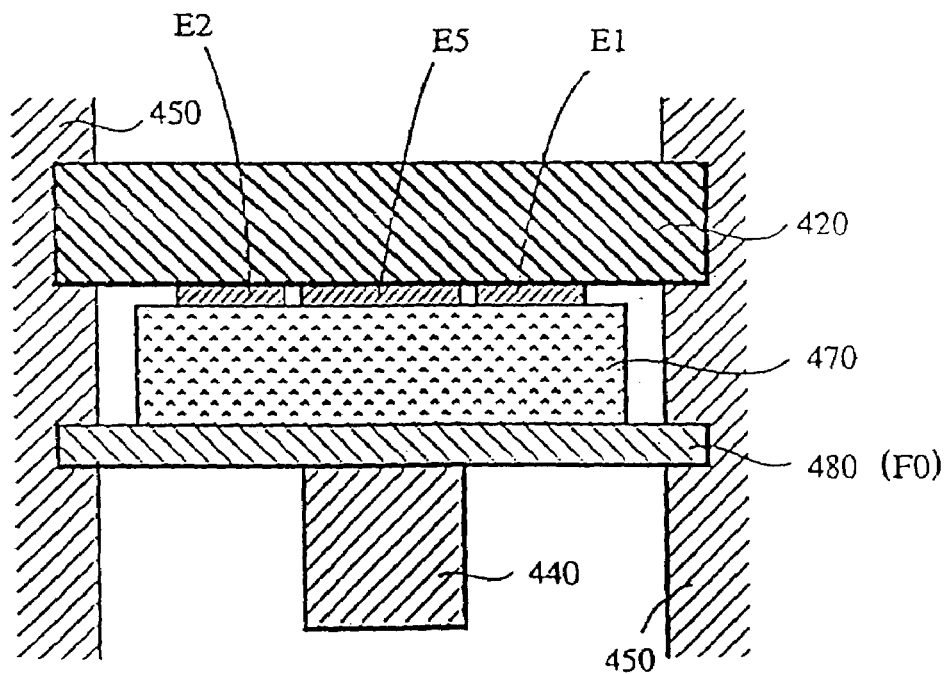
FIG. 55 is a side cross sectional view showing a structure of a third modification of the multi-axial angular velocity sensor shown in FIG. 42.

In order to further simplify the structure of the above-described second embodiment, it is sufficient to use a flexible substrate 480 comprised of a conductive material (e.g., metal) in place of flexible substrate 410. If such a substrate is employed, it is possible to realize the structure in which the lower surface of the piezoelectric element 470 is directly connected to the upper surface of the flexible substrate 480, without using special lower electrode layer F0 as shown in the side cross sectional view of FIG. 55. In this case, the flexible substrate 480 itself functions as common lower electrode layer F0.

Further, while the lower electrode layer side is caused to be a common single electrode layer in the above-described modifications 2, 3, the upper electrode layer side may be a common single electrode layer in a manner opposite to the above.

<4.8> Other Modifications

While the above-described sensors all use physically single piezoelectric element 430 or 470, they may be comprised of physically plural piezoelectric elements. For example, in FIG. 50, there may be employed a configuration in which respective regions A1 to A5 are constituted is individual piezoelectric elements, and five piezoelectric elements in total are used. As stated above, how many piezoelectric elements are used from a physical point of view is the manner which can be suitably changed in design.

Figure 56:
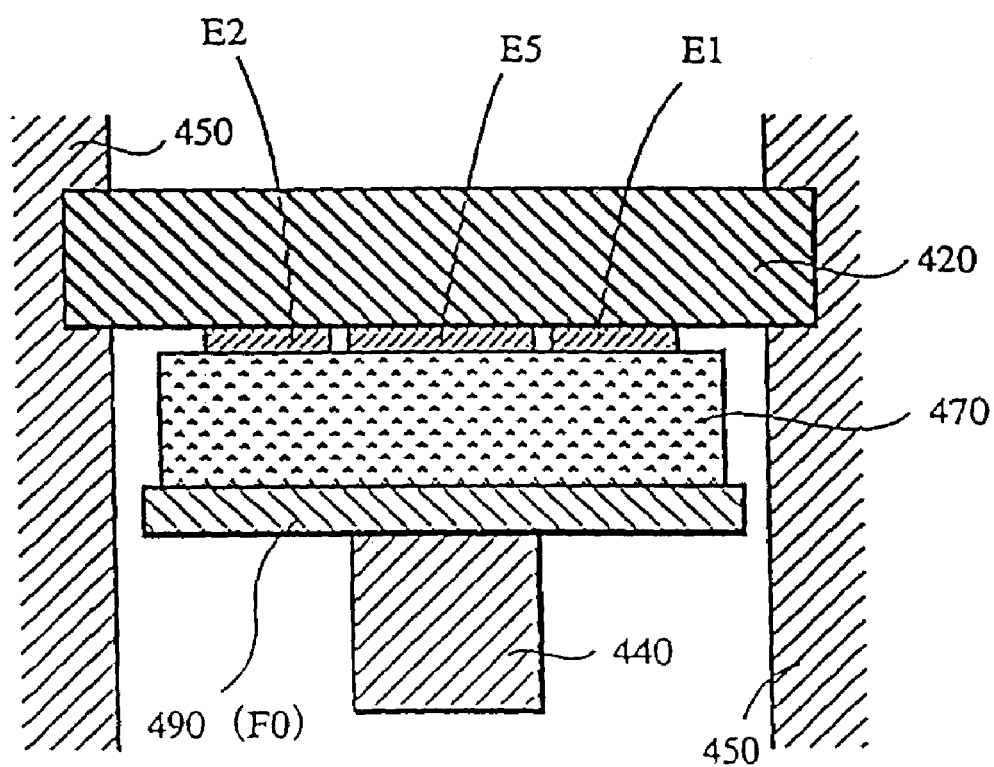
FIG. 56 is a side cross sectional view showing a structure of a fourth modification of the multi-axial angular velocity sensor shown in FIG. 42.

Further, while the outer peripheral portions of flexible substrates 410, 480 are supported by sensor casing 450 in the above-described sensor, it is not necessarily required to fix a flexible substrate to a sensor casing. For example, there may be employed, as shown in FIG. 56, a configuration in which a flexible substrate 490 having a slightly smaller diameter is used in place of flexible substrate 480 and the periphery of flexible substrate 490 is allowed to be the end of freedom.

§5 Fifth Embodiment

<5.1> Structure of Sensor According to Fifth Embodiment

A multi-axial angular velocity sensor according to the fifth embodiment of this invention will now be described. The fifth embodiment is also directed to a sensor using a piezoelectric element for both the oscillating mechanism and the detecting mechanism similarly to the previously described fourth embodiment.

Figure 57:
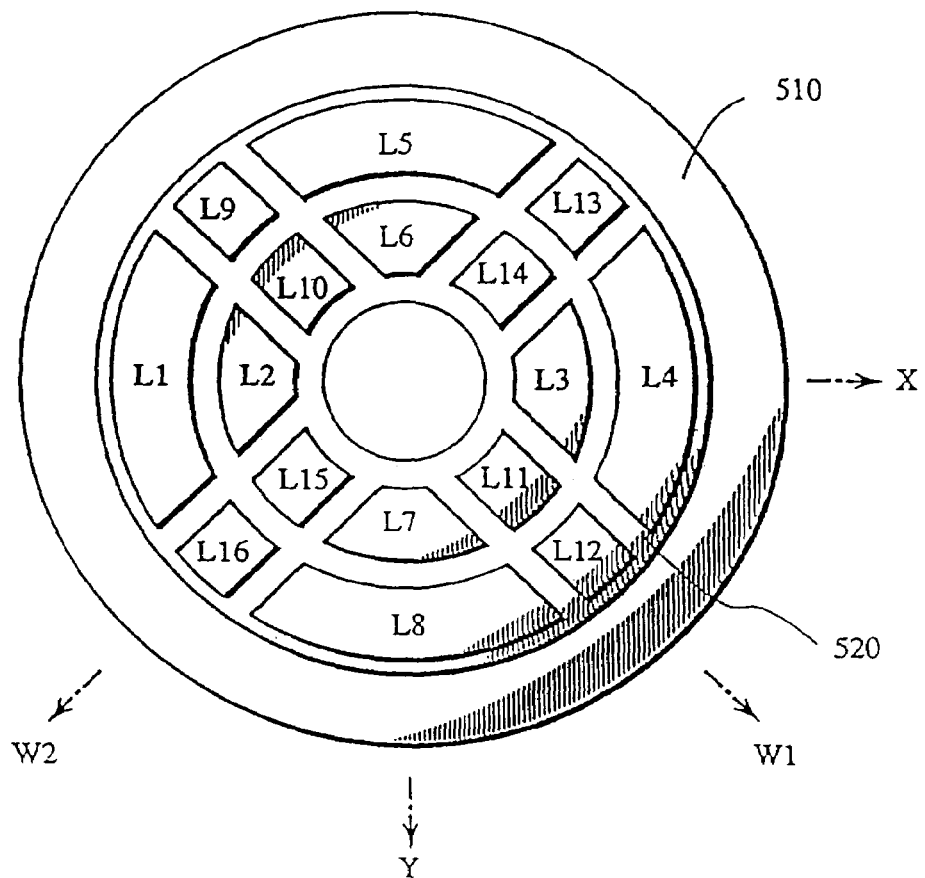
FIG. 57 is a top view showing a structure of a multi-axial angular velocity sensor according to a fifth embodiment of this invention.
Figure 58:
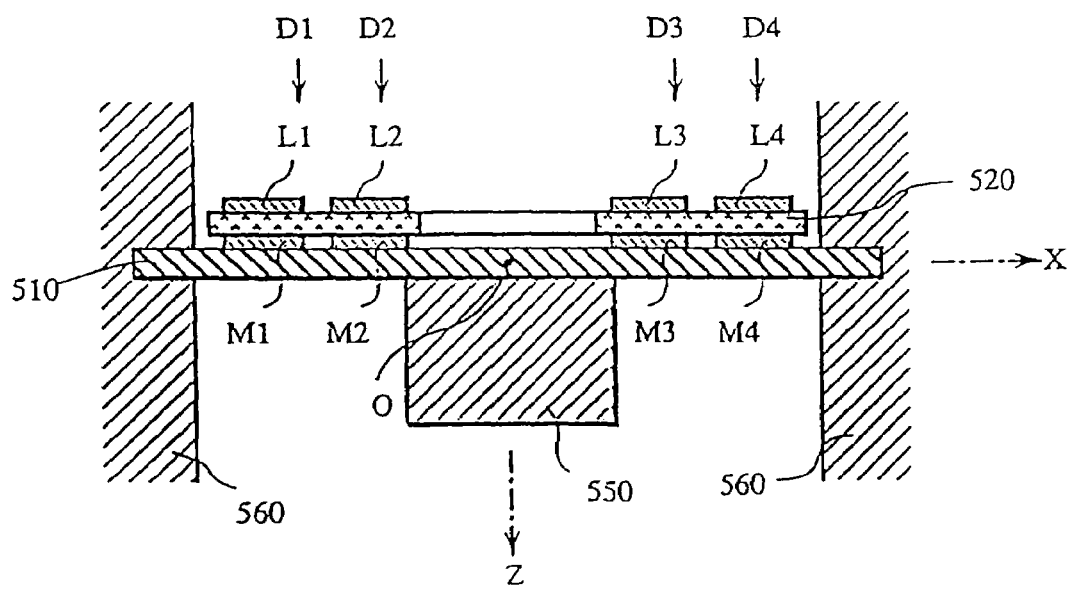
FIG. 58 is a side cross sectional view showing the structure of the multi-axial angular velocity sensor shown in FIG. 57.

FIG. 57 is a top view of the multi-axial angular velocity sensor according to the fifth embodiment. Flexible substrate 510 is a disk-shaped substrate having flexibility which functions as so called diaphragm. On the flexible substrate 510, so called a doughnut disk-shaped piezoelectric element 520 is disposed. On the upper surface of the piezoelectric element 520, sixteen upper electrode layers L1 to L16 in forms as shown in the figure are formed at positions shown, respectively. Further, on the lower surface of the piezoelectric element 520, sixteen lower electrode layers M1 to M16 (although not shown in FIG. 57) having exactly the same shapes as those of the upper electrode layers L1 to L16 are formed at positions respectively opposite to the upper electrode layers L1 to L16. FIG. 58 is a side cross sectional view of this sensor (For the purpose of avoiding complexity of the figure, only cross sectional portions are illustrated with respect to respective electrode layers. This similarly applies to side cross sectional views mentioned below). As clearly shown in this figure, the doughnut disk shaped piezoelectric element 520 is in so called a sandwich state where it is put between sixteen upper electrode layers L1 to L16 (only L1 to L4 are shown in FIG. 58) and sixteen lower electrode layers M1 to M16 (only M1 to M4 are shown in FIG. 58). The lower surfaces of the lower electrode layers M1 to M16 are fixed on the upper surface of the flexible substrate 510. On the other hand, an oscillator 550 is fixed on the lower surface of the flexible substrate 510, and the peripheral portion of the flexible substrate 510 is fixedly supported by sensor casing 560. In this embodiment, the flexible substrate 510 is constituted by an insulating material. In the case where flexible substrate 510 is constituted with a conductive material such as metal, an insulating film is formed on the upper surface thereof, thereby preventing sixteen lower electrode layers M1 to M16 from being short-circuited.

Here, for convenience of explanation, let consider an XYZ three-dimensional coordinate system in which the central position of the flexible substrate 510 is allowed to be origin. Namely, in FIG. 57, an X-axis is defined in a right direction, a Y-axis is defined in a lower direction, and a Z-axis is defined in a direction perpendicular to the plane surface of paper. FIG. 58 is a cross sectional view cut along the XZ plane of this sensor, and flexible substrate 510, piezoelectric element 520, respective electrode layers L1 to L16, M1 to M16 are all arranged in parallel to the XY plane (In the fifth embodiment, for convenience of explanation, the lower direction in the side cross sectional view is taken as the positive direction of the Z-axis). Further, as shown in FIG. 57, on the XY plane, a W1-axis and a W2-axis are defined in directions to form an angle of 45 degrees relative to the X-axis or the Y-axis. These W1-axis and W2-axis are both passed through the origin O. When such a coordinate system is defined, upper electrode layers L1 to L4 and lower electrode layers M1 to M4 are arranged in order from the negative direction toward the positive direction of the X-axis, upper electrode layers L5 to L8 and lower electrode layers M5 to M8 are arranged in order from the negative direction toward the positive direction of the Y-axis, upper electrode layers L9 to L12 and lower electrode layers M9 to M12 are arranged in order from the negative direction toward the positive direction of the W1-axis, and upper electrode layers L13 to L16 and lower electrode layers M13 to M16 are arranged in order from the negative direction toward the positive direction of the W2-axis.

As previously described, there is the property that when electrode layers are respectively formed on the upper and lower surfaces of a piezoelectric element to apply a predetermined voltage across such a pair of electrode layers, a predetermined pressure is produced within the piezoelectric element, while when a predetermined force is applied to the piezoelectric element, a predetermined voltage is produced across the pair of electrode layers. In view of this, it is now assumed that sixteen sets of localized elements D1 to D16 are provided by the above-described sixteen upper electrode layers L1 to L16, the above-described sixteen lower electrode layers M1 to M16, and sixteen portions of the piezoelectric element 520 put between those electrode layers. For example, a localized element D1 is provided by upper electrode layer L1, lower electrode layer M1, and a portion of piezoelectric element 520 put therebetween. Eventually, sixteen sets of localized elements D1 to D16 are arranged as shown in the top view of FIG. 59.

Figure 60A:
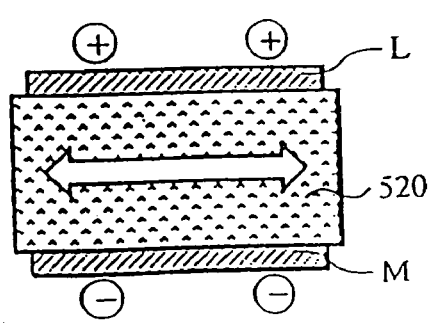
FIGS. 60(*a*) and 60(*b*) are views showing a polarization characteristic of a piezoelectric element used in the multi-axial angular velocity sensor shown in FIG. 57.
Figure 60B:
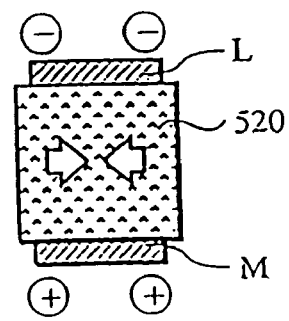

In this example, as piezoelectric element 520 in this sensor, a piezoelectric ceramics having a polarization characteristic as shown in FIGS. 60(a) and 60(b) is used. Namely, this piezoelectric ceramics has a polarization characteristic such that in the case where a force to expand along the XY-plane is applied as shown in FIG. 60(a), positive charges and negative charges are respectively produced on the upper electrode layer L side and on the lower electrode layer M side, while in the case where a force to contract along the XY-plane is applied as shown in FIG. 60(b), negative charges and positive charges are respectively produced on the upper electrode layer L Side and the lower electrode layer M side. Here, such a polarization characteristic is called type III. Sixteen sets of localized elements D1 to D16 in this sensor all have a piezoelectric element having the polarization characteristic of the type III.

<5.2> Mechanism for Oscillating Oscillator

Figure 61:
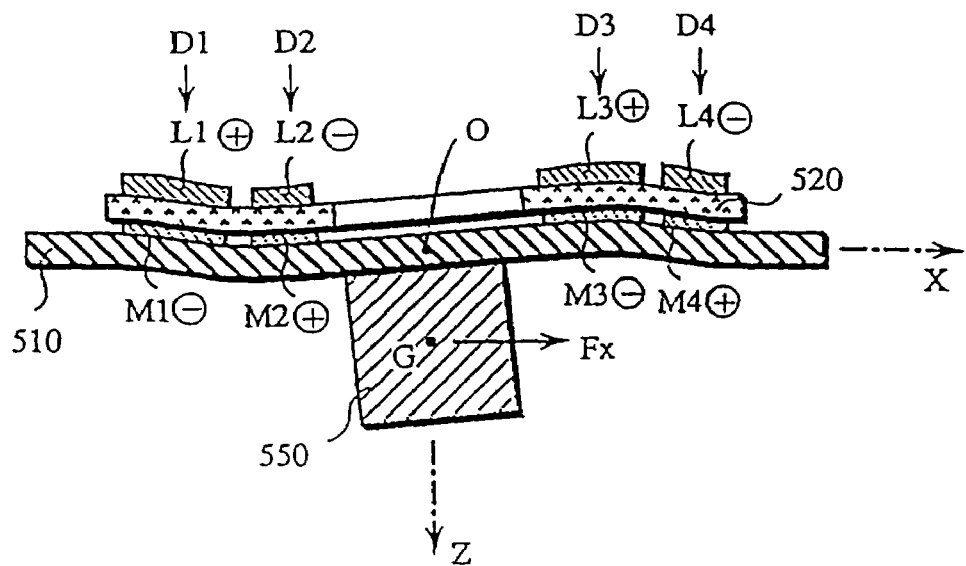
FIG. 61 is a side cross sectional view showing a state where the multi-axial angular velocity sensor shown in FIG. 57 is caused to undergo displacement in the X-axis direction.

Subsequently, let study what phenomenon takes place in the case where charges having a predetermined polarity are delivered to a predetermined pair of electrode layers of this sensor. Let now consider the case where charges of polarities as shown in FIG. 61 are delivered to respective electrode layers constituting four localized elements D1 to D4 arranged on the X-axis. Namely, positive charges and negative charges are delivered to electrode layers L1, M2, L3, M4 and electrode layers M1, L2, M3, L4, respectively. Thus, localized elements D1 and D3 expand along the XY-plane by the property shown in FIG. 60(a). On the contrary, localized elements D2 and D4 contract along the XY-plane by the property shown in FIG. 60(b). As a result, the flexible substrate 510 is deformed as shown in FIG. 61, and the oscillator 550 is caused to undergo displacement in the positive direction of the X-axis. Now, when polarities of charges which have been delivered to respective electrode layers are inverted, the expanding/contracting state of the piezoelectric element is also inverted. Thus, the oscillator 550 is caused to undergo displacement in the negative direction of the X-axis. If the polarities of charges delivered are reciprocally inverted so that such two displacement states take place one after another, it is possible to reciprocate the oscillator 550 in the X-axis direction. In other words, the oscillator 550 is permitted to undergo oscillation Ux with respect to the X-axis direction.

Such supply of charges can be realized by applying an a.c. signal across opposite electrode layers. Namely, a first a.c. signal is applied across electrode layers L1, M1 and across electrode layers L3, M3, and a second a.c. signal is applied across electrode layers L2, M2 and across electrode layers L4, M4. If signals having the same frequency and phases opposite to each other are used as the first and second a.c. signals, it is possible to oscillate the oscillator 550 in the X-axis direction.

A method of allowing the oscillator 550 to undergo oscillation Uy with respect to the Y-axis direction is exactly the same as above. Namely, a first a.c. signal is applied across electrode layers L5, M5 and across electrode layers L7, M7, and a second a.c. signal is applied across electrode layers L6, M6 and across electrode layers L8, M8. If signals having the same frequency and phases opposite to each other are used as the first and second a.c. signals, it is possible to oscillate the oscillator 550 in the Y-axis direction.

Figure 62:
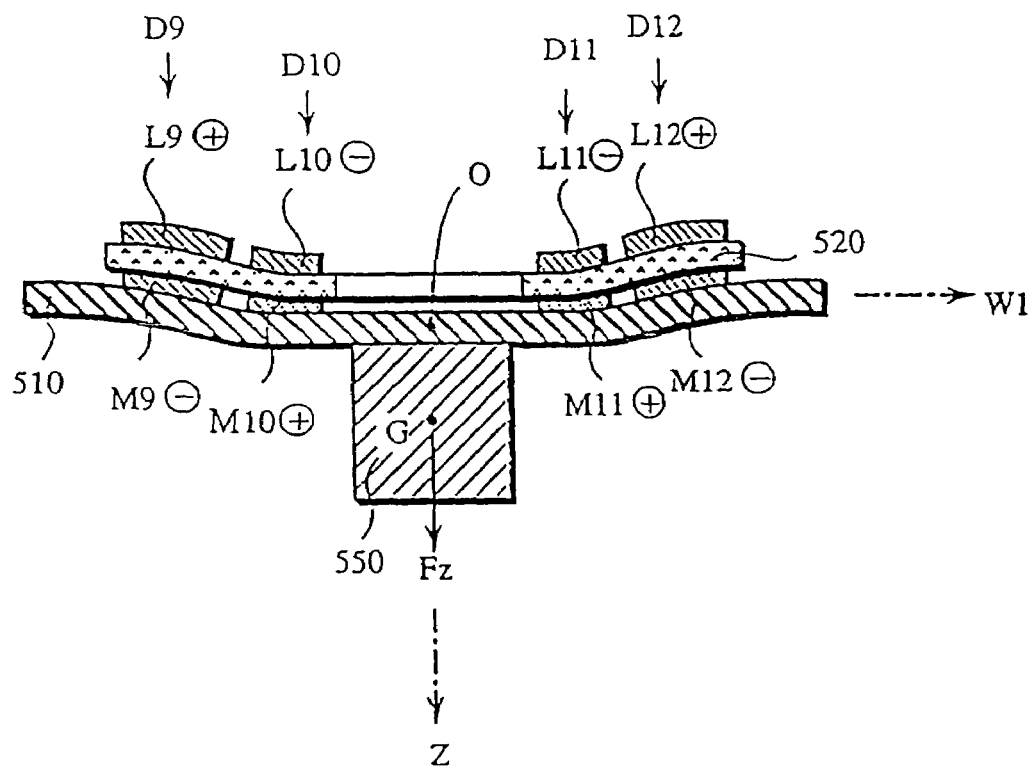
FIG. 62 is a side cross sectional view showing a state where the multi-axial angular velocity sensor shown in FIG. 57 is caused to undergo displacement in the Z-axis direction.

Consideration will be described in connection with a method of allowing the oscillator 550 to undergo oscillation Uz with respect to the Z-axis direction. Let now consider the case where charges of polarities as shown in FIG. 62 are delivered to respective electrode layers constituting four localized elements D9 to D12 arranged on the W1-axis. Namely, positive charges and negative charges are delivered to electrode layers L9, M10, M11, L12 and electrode layers M9, L10, L11, M12, respectively. Thus, localized elements D9 and D12 expand along the XY-plane by the property shown in FIG. 60(a). On the contrary, localized elements D10 and D11 contract along the XY-plane by the property shown in FIG. 60(b). As a result, the flexible substrate 510 is deformed as shown in FIG. 62, and the oscillator 550 is caused to undergo displacement in the positive direction of the Z-axis. Now, when polarities of charges which have been delivered to respective electrode layers are inverted, the expanding/contracting state of the piezoelectric element is also inverted, so the oscillator 550 is caused to undergo displacement in the negative direction of the Z-axis. If polarities of charges delivered are reciprocally inverted so that such two displacement states take place one after another, it is possible to reciprocate the oscillator 550 in the Z-axis direction. In other words, the oscillator 550 can be caused to undergo oscillation Uz with respect to the Z-axis direction.

Such supply of charges can be also realized by applying an a.c. signal across opposite electrode layers. Namely, a first a.c. signal is applied across electrode layers L9, M9 and across electrode layers L12, M12, and a second a.c. signal is applied across electrode layers L10, M10 and across electrode layers L11, M11. If signals having the same frequency and phases opposite to each other are used as the first and second a.c. signals, it is possible to oscillate the oscillator 550 in the Z-axis direction.

Figure 59:
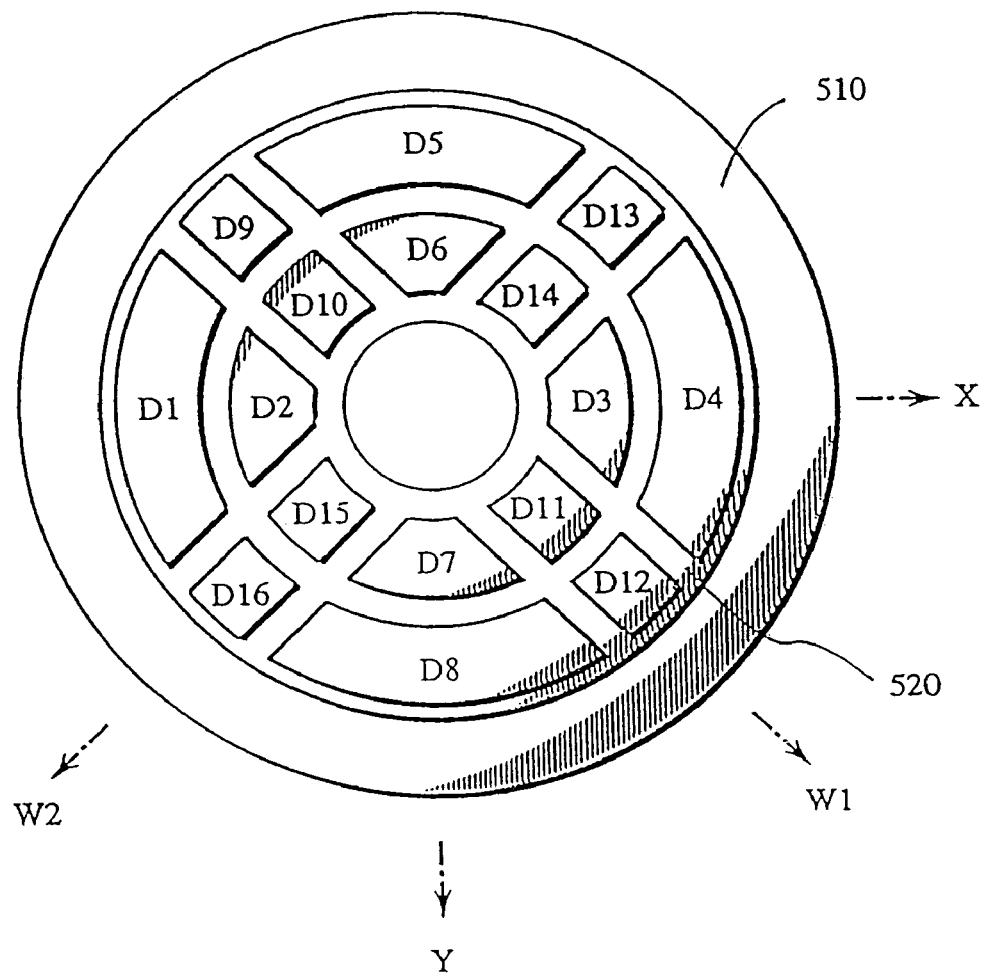
FIG. 59 is a top view showing an arrangement of localized elements defined in the multi-axial angular velocity sensor shown in FIG. 57.

As shown in FIG. 59, this sensor is further provided with four localized elements D13 to D16 along the W2-axis. Although these four localized elements are not necessarily required, they are provided for the purpose of allowing oscillating operation in the Z-axis to be more stable and enhancing, to more degree, the detection accuracy of Coriolis force Fz in the Z-axis direction which will be described later. These four localized elements D13 to D16 perform exactly the same functions of the above-described four localized elements D9 to D12. Namely, if a.c. signals which are the same as those delivered to localized elements D9 to D12 are delivered to localized elements D13 to D16, it is possible to carry out oscillating operation in the Z-axis direction by eight localized elements D9 to D16. Thus, more stable oscillating operation can be conducted.

As stated above, if a predetermined a.c. signal is delivered to specific localized elements, it is possible to oscillate the oscillator 550 along the X-axis, the Y-axis and the Z-axis.

<5.3> Mechanism for Detecting Coriolis Force

Subsequently, a method of detecting Coriolis force components exerted in respective axes directions in the sensor according to the fifth embodiment will now be described. It is to be noted that, for the purpose of saving paper, FIGS. 61 and 62 used for explaining the method of oscillating the previously described oscillator are used in the explanation of the method of detecting this Coriolis force.

First, let consider the case where Coriolis force Fx in the X-axis direction is applied to a center of gravity G of the oscillator 550 as shown in FIG. 61 (In accordance with the principle shown in FIG. 5, since such a measurement of Coriolis force Fx is carried out in the state where oscillation Uy in the Y-axis direction is given, the oscillator 550 is assumed to be oscillating in a direction perpendicular to the plane surface of paper in FIG. 61, but such oscillating phenomenon in the Y-axis direction does not affect measurement of Coriolis force Fx in the X-axis direction). By action of such Coriolis force Fx, bending takes place in the flexible substrate 510 which performs the function of diaphragm. Thus, a deformation as shown in FIG. 61 takes place. As a result, localized elements D1, D3 arranged along the X-axis expand in the X-axis direction, and localized elements D2, D4 similarly arranged on the X-axis contract in the X-axis direction. Since the piezoelectric element put between these respective electrode layers has a polarization characteristic as shown in FIGS. 60(*a*) and 60(*b*), charges of polarity indicated by sign "+" or "−" encompassed by small circle in FIG. 61 are produced in these respective electrode layers. Further, in the case where Coriolis force Fy in the Y-axis direction is applied, charges of predetermined polarities are produced similarly with respect to respective electrode layers constituting localized elements D5 to D8 arranged along the Y-axis.

Let now consider the case where Coriolis force Fz in the Z-axis direction is applied. In this case, the flexible substrate 510 which performs the function of diaphragm is deformed as shown in FIG. 62, localized elements D9, D12 arranged along the W1-axis expand in the W1-axis direction, and localized elements D10, D11 arranged along the W1-axis contract in the W1-axis direction. For this reason, charges of polarities as indicated by sign "+" or "−" encompassed by small circle in FIG. 62 are produced in respective electrode layers constituting localized elements D9 to D12. Similarly, charges of predetermined polarities are produced also in respective electrode layers constituting localized elements D13 to D16 arranged along the W2-axis.

Figure 63:
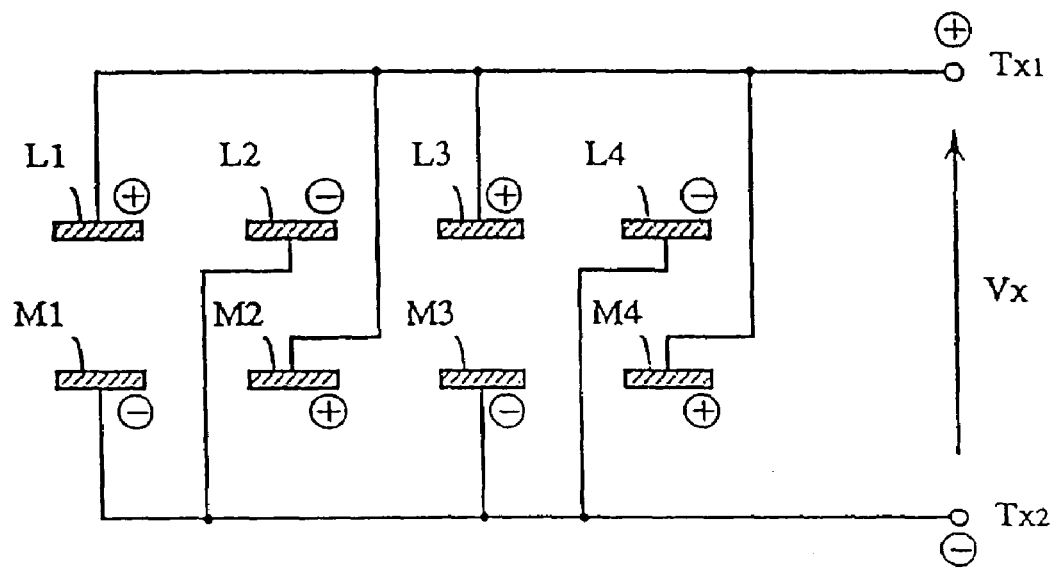
FIG. 63 is a wiring diagram showing a wiring for detecting Coriolis force Fx in the X-axis direction exerted on the multi-axial angular velocity sensor shown in FIG. 57.
Figure 64:
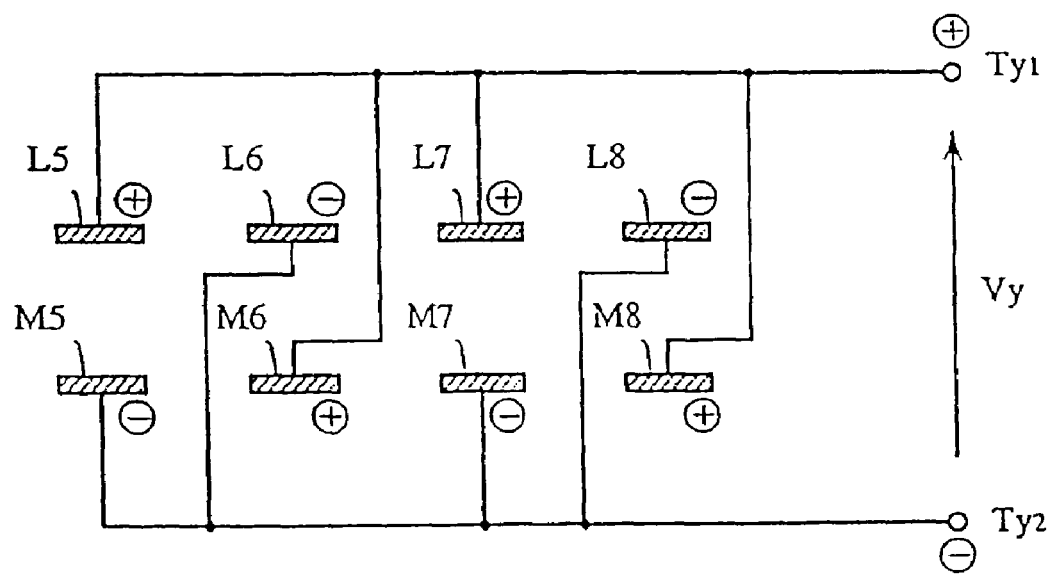
FIG. 64 is a wiring diagram showing a wiring for detecting Coriolis force Fy in the Y-axis direction exerted on the multi-axial angular velocity sensor shown in FIG. 57.
Figure 65:
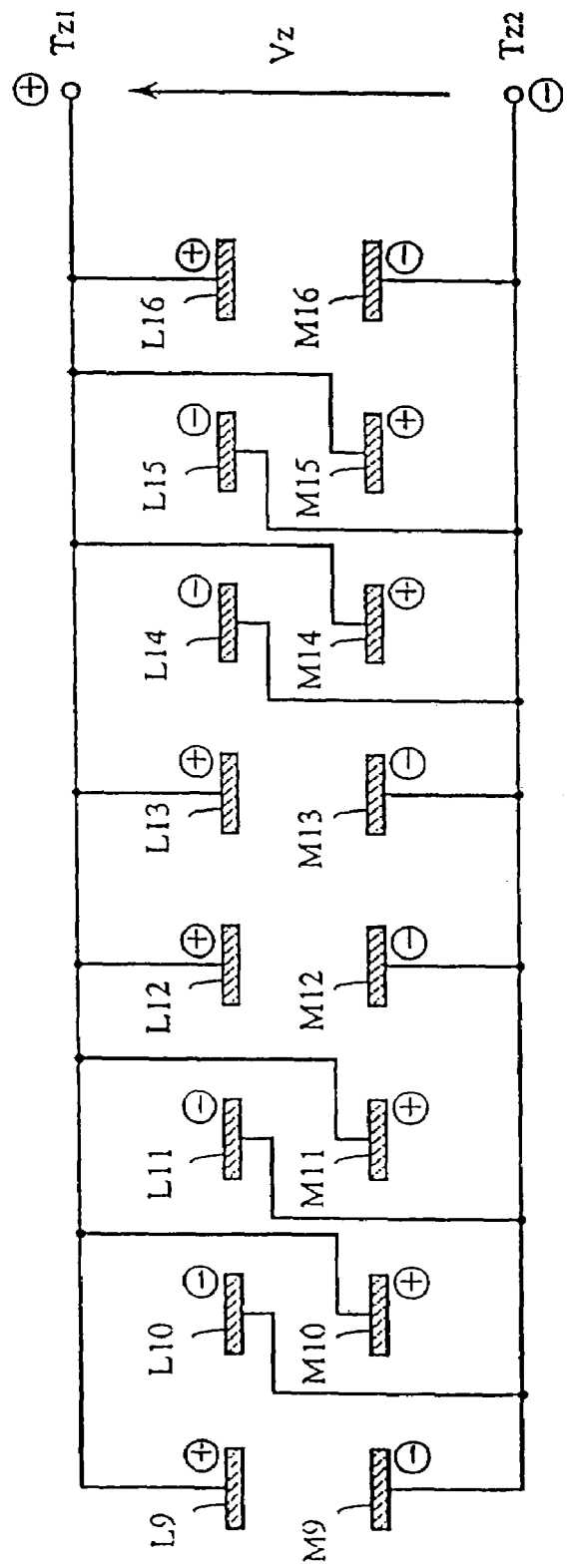
FIG. 65 is a wiring diagram showing a wiring for detecting Coriolis force Fz in the Z-axis direction exerted on the multi-axial angular velocity sensor shown in FIG. 57.

By making use of such a phenomenon, wirings as shown in FIGS. 63 to 65 are implemented to respective electrode layers, thereby making it possible to carry out detection of Coriolis force components Fx, Fy, Fz. For example, it is possible to detect Coriolis force Fx in the X-axis direction as a voltage difference Vx produced between terminals Tx1 and Tx2 as shown in FIG. 63. It is possible to easily understand this reason when consideration is made in connection with polarities of charges produced in respective electrode layers by bending as shown in FIG. 61. When a wiring as shown in FIG. 63 is implemented, positive charges are all gathered at terminal Tx1, and negative charges are all gathered at terminal Tx2. Thus, a potential difference Vx across both terminals indicates Coriolis force Fx in the X-axis direction. Entirely in the same manner, when a wiring as shown in FIG. 64 is implemented to respective electrode layers constituting localized elements D5 to D8, it is possible to detect Coriolis force Fy in the Y-axis direction as a potential difference Vy across terminals Ty1 and Ty2. Further, when a wiring as shown in FIG. 65 is implemented to respective electrode layers constituting localized elements D9 to D16, it is possible to detect Coriolis force Fz in the Z-axis direction as a voltage difference Vz produced across terminals Tz1 and Tz2. It should be noted that localized elements D13 to D16 are not necessarily required, but even if only four localized elements D9 to D12 are used, detection of Coriolis force Fz in the Z-axis direction can be made.

<5.4> Detection of Angular Velocity

As described above, in the multi-axial angular velocity sensor according to the fifth embodiment, an a.c. signal is applied across a predetermined pair of localized elements, thereby making it possible to oscillate the oscillator 550 along any axial direction of the X-axis, the Y-axis, and the Z-axis, and to detect Coriolis force components Fx, Fy, Fz in respective axes directions produced at that time as potential differences Vx, Vy, Vz, respectively. Accordingly, by the principle shown in FIGS. 3 to 5, it is possible to detect an angular velocity ω about any axis of the X-axis, the Y-axis and the Z-axis.

It is to be noted that, in the sensor according to the fifth embodiment, piezoelectric elements (localized elements) is used for both the oscillating mechanism and the detecting mechanism similarly to the previously described sensor according to the fourth embodiment. In view of this, let study sharing of roles of respective localized elements in the detecting operations of respective angular velocities.

First, let consider the operation for detecting angular velocity ωx about the X-axis on the basis of the principle shown in FIG. 3. In this case, it is necessary to detect Coriolis force Fy produced in the Y-axis direction when an oscillator is caused to undergo oscillation Uz in the Z-axis. In order to allow the oscillator 550 to undergo oscillation Uz, it is sufficient to deliver an a.c. signal to localized elements D9 to D16 arranged on the W1-axis and the W2-axis. Further, in order to detect Coriolis force Fy applied to the oscillator 550, it is sufficient to detect voltages produced at localized elements D5 to D8 arranged on the Y-axis. The remaining localized elements D1 to D4 are not used in this detecting operation.

Subsequently, let consider the operation for detecting angular velocity ωy about the Y-axis on the basis of the principle shown in FIG. 4. In this case, it is necessary to detect Coriolis force Fz produced in the Z-axis direction when an oscillator is caused to undergo oscillation Ux in the X-axis direction. In order to allow the oscillator 550 to undergo oscillation Ux, it is sufficient to deliver an a.c. signal to localized elements D1 to D4 arranged on the X-axis. Further, in order to detect Coriolis force Fz applied to the oscillator 550, it is sufficient to detect voltages produced at localized elements D9 to D16 arranged on the W1-axis and the W2-axis. The remaining localized elements D5 to D8 are not used in this detecting operation.

Finally, let consider the operation for detecting angular velocity ωz about the Z-axis on the basis of the principle shown in FIG. 5. In this instance, it is necessary to detect Coriolis force Fx produced in the X-axis direction when an oscillator is caused to undergo oscillation Uy in the Y-axis direction. In order to allow the oscillator 550 to undergo oscillation Uy, it is sufficient to deliver an a.c. signal to localized elements D5 to D8 arranged on the Y-axis. Further, in order to detect Coriolis force Fx applied to the oscillator 550, it is sufficient to detect voltages produced at localized elements D1 to D4 arranged on the X-axis. The remaining localized elements D9 to D16 are not used in this detecting operation.

As described above, it is seen that in the case of detecting any one of angular velocity components ωx, ωy, ωz by using this sensor, sharing of the role with respect to respective localized elements is conveniently carried out, so detection is carried out without hindrance. It should be noted that since it is unable to detect plural ones of angular velocity components ωx, ωy, ωz at the same time, in the case where an attempt is made to detect three angular velocity components, it is necessary to conduct time-division processing as described later to sequentially carry out detections one by one.

<5.5> Modification 1

In accordance with the above-described sensor of the fifth embodiment, it is possible to determine Coriolis force components Fx, Fy, Fz in the XYZ three-dimensional coordinate system as potential differences Vx, Vy, Vz, respectively. Further, it is possible to detect angular velocity components on the basis of these potential differences. However, in order to detect these potential differences, it is necessary to implement wirings as shown in the circuit diagrams of FIGS. 63 to 65 to respective electrode layers. Such wirings are such that upper electrode layers and lower electrode layers are mixed. Therefore, in the case of mass-producing such sensors, the cost for wiring cannot be neglected as compared to the total cost of product. This modification 1 is characterized in that the polarization characteristic of the piezoelectric is partially varied, thereby simplifying wiring to reduce the manufacturing cost.

Figure 66A:
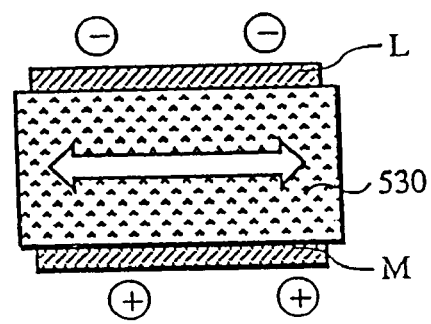
FIGS. 66(*a*) and 66(*b*) are views showing a polarization characteristic opposite to the polarization characteristic shown in FIG. 60.
Figure 66B:
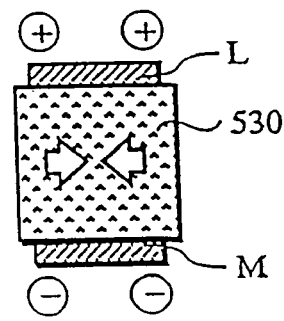

As previously described, it is possible to manufacture piezoelectric elements having an arbitrary polarization characteristic by the present technology. For example, the piezoelectric element 520 used in the above-described sensor according to the fifth embodiment had a polarization characteristic of the type III as shown in FIGS. 60(a) and 60(b). On the contrary, it is also possible to manufacture piezoelectric element 530 having a polarization characteristic of the type IV as shown in FIGS. 66(a) and 66(b). Namely, it is possible to manufacture piezoelectric element 530 having a polarization characteristic such that in the case where a force in a direction to expand along the XY plane is applied as shown in FIG. 66(a), negative charges and positive charges are respectively produced on the upper electrode layer L side and on the lower electrode layer M side, while in the case where a force in a direction to contract along the XY plane is applied as shown in FIG. 66(b), positive charges and negative charges are respectively produced on the upper electrode layer L side and on the lower electrode layer M side. Further, it is possible to allow a portion of one piezoelectric element to have polarization characteristic of the type III and to allow another portion to have polarization characteristic of the type IV. In the modification described below, a piezoelectric element to which such a localized polarization processing is implemented is used to thereby simplify the structure of the sensor.

Figure 67:
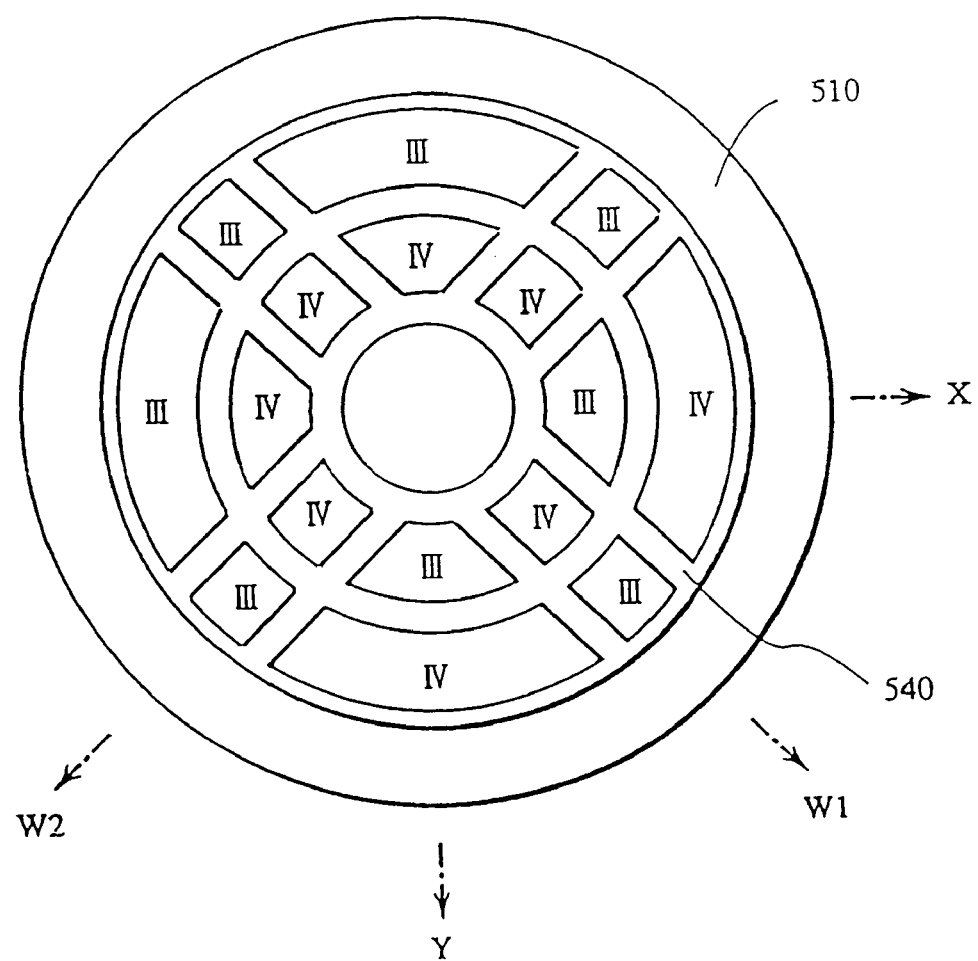
FIG. 67 is a plan view showing a distribution of the polarization characteristics of a piezoelectric element used in the first modification of the multi-axial angular velocity sensor shown in FIG. 57.

Let now consider piezoelectric element 540 as shown in FIG. 67. This piezoelectric element 540 is a doughnut disk shaped element which is entirely the same in shape as the piezoelectric element 520 used in the above-described sensor of FIG. 57. However, its polarization characteristic is different from that of the piezoelectric element 520. The piezoelectric element 520 was an element in which all portions have polarization characteristic of the type III as previously described. On the contrary, the piezoelectric element 540 has polarization characteristic of either the type III or the type IV in respective sixteen regions as shown in FIG. 67. Namely, this piezoelectric element 540 indicates polarization characteristic of the type III in the regions of localized elements D1, D3, D5, D7, D9, D12, D13, D16, and indicates polarization characteristic of the type IV in the regions of localized elements D2, D4, D6, D8, D10, D11, D14, D15 (see FIGS. 59 and 67).

Figure 68:
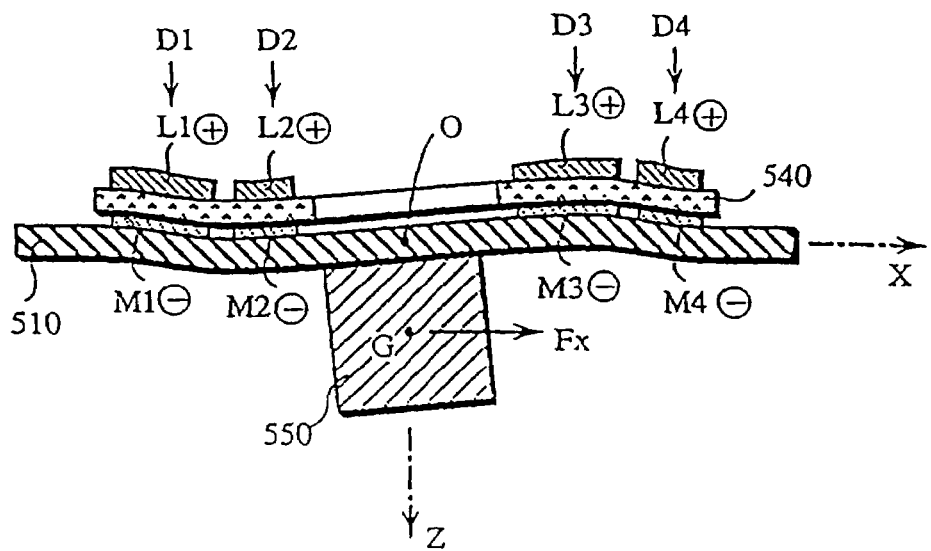
FIG. 68 is a side cross sectional view showing a state where Coriolis force Fx in the X-axis direction is exerted on the multi-axial angular velocity sensor using the piezoelectric element shown in FIG. 67.
Figure 69:
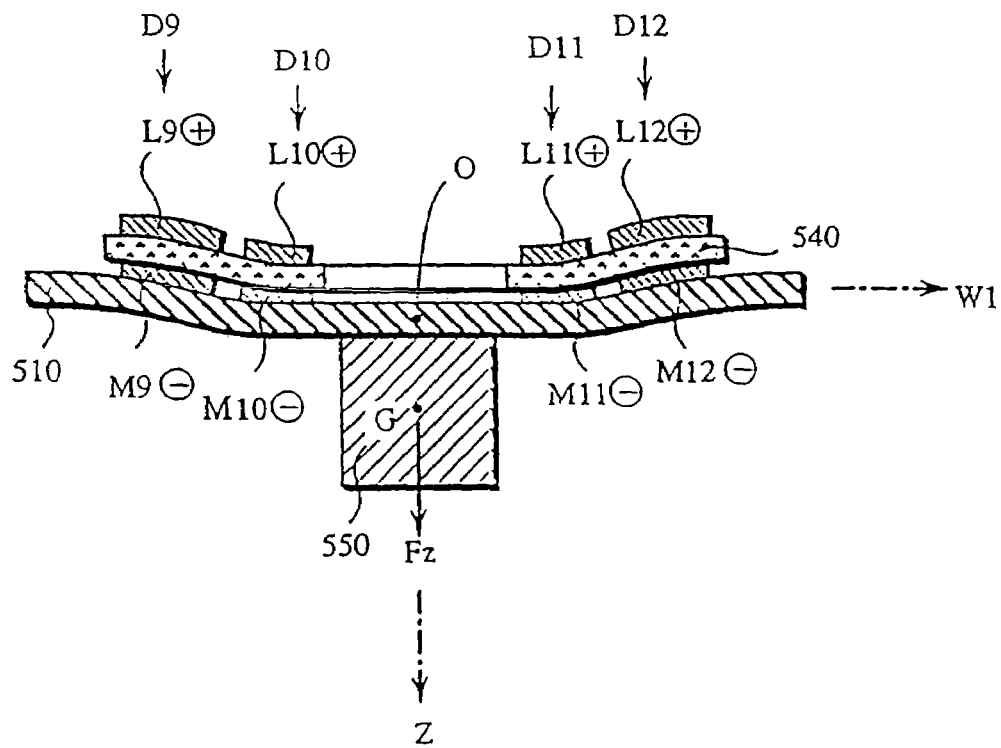
FIG. 69 is a side cross sectional view showing a state where Coriolis force Fz in the Z-axis direction is exerted on the multi-axial angular velocity sensor using the piezoelectric element shown in FIG. 67.

When consideration is now made as to how polarities of charges produced at respective electrode layers vary in the case where the piezoelectric element 540 having polarization characteristic as shown in FIG. 67 is used in place of the piezoelectric element 520, it is seen that polarities of charges produced at upper electrode layers L2, L4, L6, L8, L10, L11, L14, L15 and lower electrode layers M2, M4, M6, M8, M10, M11, M14, M15 are inverted. For example, in the case where Coriolis force Fx in the X-axis direction is applied, charges of polarities as shown in FIG. 61 are produced in the previously described sensor of FIG. 57, whereas charges of polarities as shown in FIG. 68 are produced in the sensor of this modification. Further, in the case where Coriolis force Fz in the Z-axis direction is applied, charges of polarities as shown in FIG. 62 are produced in the previously described sensor of FIG. 57, whereas charges of polarities as shown in FIG. 69 are produced in the sensor of this modification. For this reason, when wirings as shown in FIGS. 70 to 72 are implemented to respective electrode layers, it is possible to determine Coriolis force components Fx, Fy, Fz as potential differences Vx, Vy, Vz, respectively.

Figure 70:
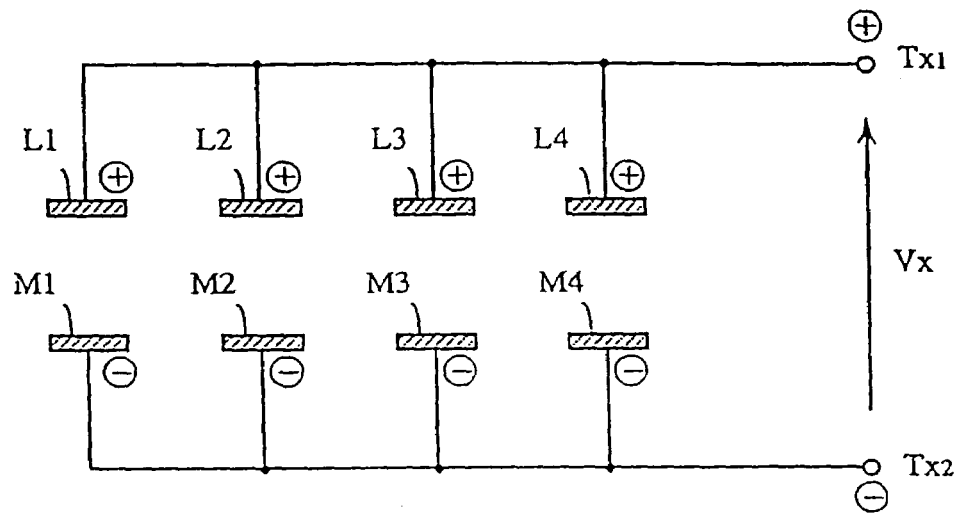
FIG. 70 is a wiring diagram showing a wiring for detecting Coriolis force Fx in the X-axis direction exerted on the multi-axial angular velocity sensor using the piezoelectric element shown in FIG. 67.

For example, with respect to the operation for detecting Coriolis force Fx in the X-axis direction, since polarities of charges produced at electrode layers L2, M2 and L4, M4 are inverted, the wiring shown in FIG. 63 is replaced by the wiring shown in FIG. 70. Similarly, with respect to the operation for detecting Coriolis force Fy in the Y-axis direction, since polarities of charges produced at electrode layers L6, M6 and L8, M8 are inverted, the wiring shown in FIG. 64 is replaced by the wiring shown in FIG. 71. In addition, with respect to the operation for detecting Coriolis force Fz in the Z-axis direction, since polarities of charges of electrode layers L10, M10, L11, M11, L14, M14, and L15, M15 are inverted, the wiring shown in FIG. 65 is replaced by the wiring shown in FIG. 72.

It is to be noted that in the case where the piezoelectric element 540 having localized polarization characteristic is used, an a.c. signal applied in order to oscillate the oscillator 550 is simplified. Namely, in order to oscillate the oscillator 550 in the X-axis direction, it is sufficient to deliver a.c. signals in phase to all the localized elements D1 to D4 as shown in FIG. 68. Similarly, in the case of oscillating the oscillator 550 in the Y-axis direction, it is sufficient to deliver a.c. signals in phase to all the localized elements D5 to D8. In addition, in the case of oscillating the oscillator 550 in the Z-axis direction, it is sufficient to deliver a.c. signals in phase to all the localized elements D9 to D16.

Figure 71:
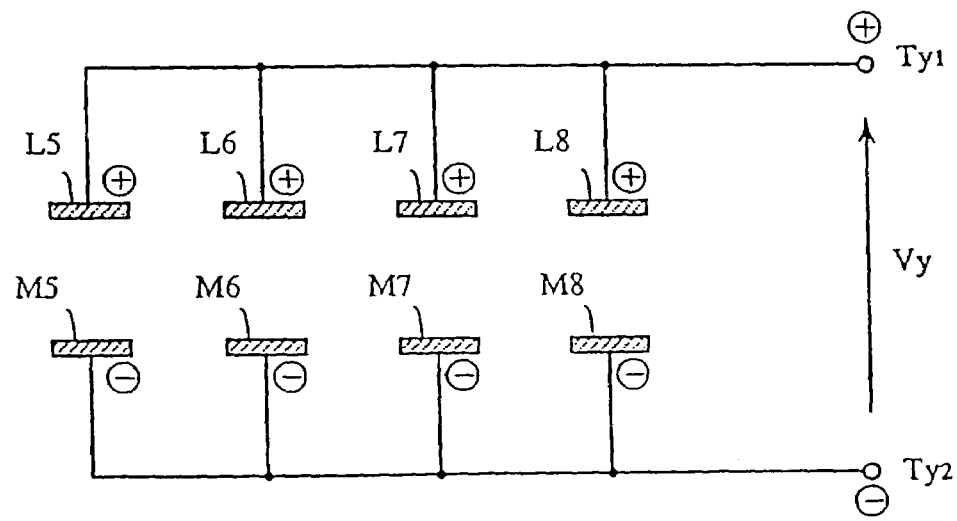
FIG. 71 is a wiring diagram showing a wiring for detecting Coriolis force Fy in the Y-axis direction exerted on the multi-axial angular velocity sensor using the piezoelectric element shown in FIG. 67.
Figure 72:
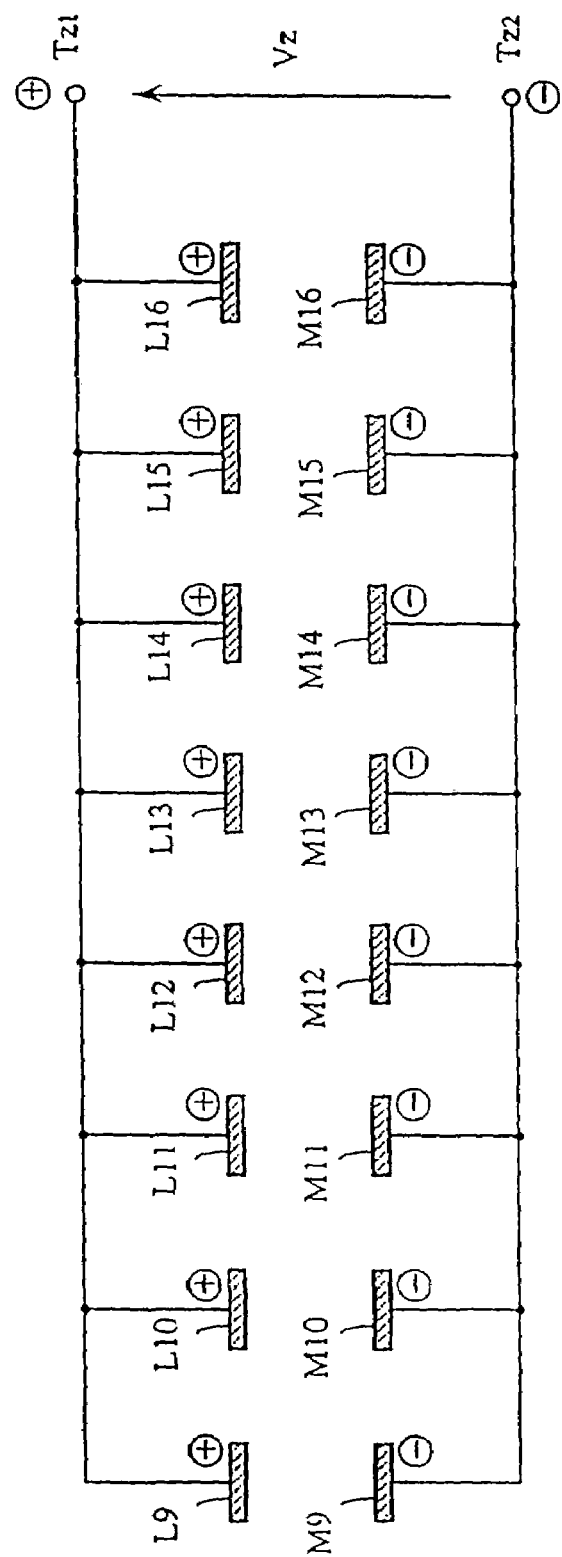
FIG. 72 is a wiring diagram showing a wiring for detecting Coriolis force Fz in the Z-axis direction exerted on the multi-axial angular velocity sensor using the piezoelectric element shown in FIG. 67.

The wirings shown in FIGS. 70 to 72 have significant merits in manufacturing actual sensors as compared to the wirings shown in FIGS. 63 to 65. The feature of the wirings shown in FIGS. 70 to 72 resides in that even in the case where a Coriolis force is applied in any direction of the X-axis, the Y-axis and the Z-axis, if Coriolis force is applied in the positive direction of each axis, positive charges and negative charges are necessarily produced on the upper electrode layer side and on the lower electrode layer side, respectively. By making use of this feature, it is possible to simplify wiring of the entirety of the sensor. Let consider the case where, e.g., terminals Tx2, Ty2, Tz2 in FIGS. 70 to 72 are connected to sensor casing 560 to take a potential thereon as a reference potential (earth). In this case, sixteen lower electrode layers M1 to M16 are in the state where they are conductive with each other. Even if such an approach is employed, a potential difference Vx indicating Coriolis force Fx in the X-axis direction is obtained as a voltage with respect to the earth of terminal Tx1, a potential difference Vy indicating Coriolis force Fy in the Y-axis direction is obtained as a voltage with respect to the earth of terminal Ty1, and a potential difference Vz indicating Coriolis force Fz in the Z-axis direction is obtained as a voltage with respect to the earth of terminal Tz1. Accordingly, this sensor operates without any hindrance. In addition, since wiring with respect to sixteen lower electrode layers M1 to M16 is carried out by allowing them to be conductive with each other, the wiring can be very simple.

<5.6> Modification 2

Figure 73:
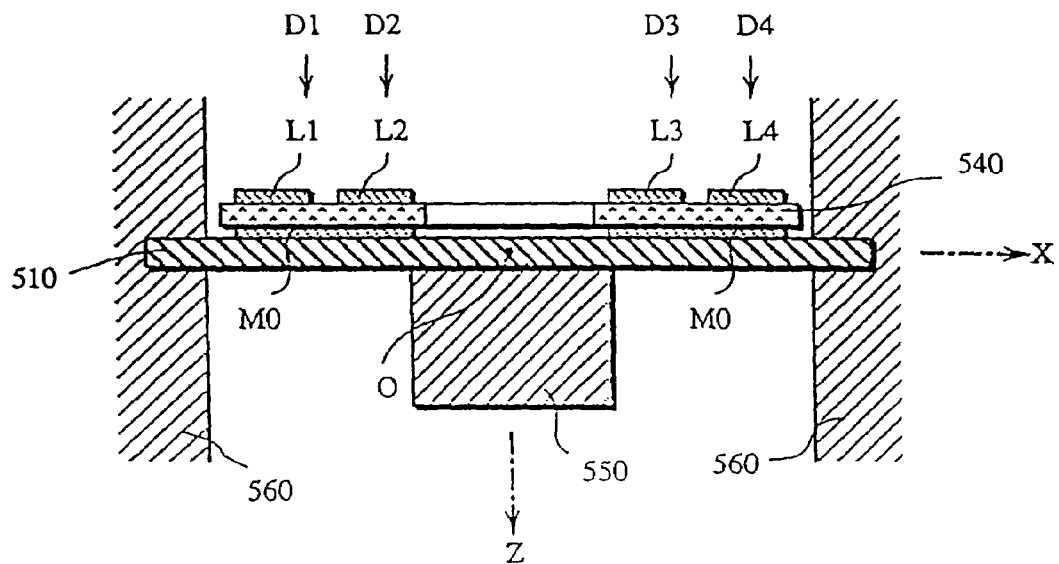
FIG. 73 is a side cross sectional view showing a structure of a second modification of the multi-axial angular velocity sensor shown in FIG. 57.

In the case where piezoelectric element 540 having localized polarization characteristic is used as in the above-described modification 1, it is possible to provide wiring which allows sixteen lower electrode layers M1 to M16 to be conductive. As stated above, if lower electrode layers M1 to M16 are permitted to be conductive, there is no necessity of allowing these sixteen electrode layers to be intentionally independent electrode layers, respectively. Namely, as shown in the side cross sectional view of FIG. 73, it is sufficient to provide only one common lower electrode layer M0. The common lower electrode layer M0 is a single doughnut disk shaped electrode layer, and serves as an electrode opposite to all the sixteen upper electrode layers L1 to L16.

<5.7> Modification 3

Figure 74:
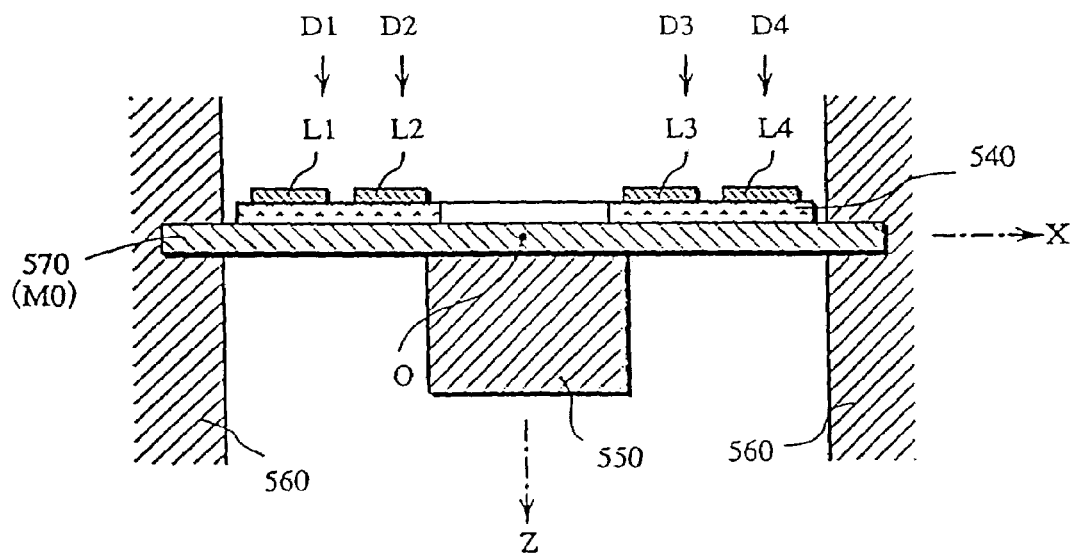
FIG. 74 is a side cross sectional view showing a structure of a third modification of the multi-axial angular velocity sensor shown in FIG. 57.

In order to further simplify the structure of the above-described modification 2, it is sufficient to use flexible substrate 570 comprised of a conductive material (e.g., metal) in place of flexible substrate 510. If such flexible substrate 570 is used, the structure in which the lower surface of the piezoelectric element 540 is directly connected to the upper surface of the flexible substrate 570 can be realized without using special lower electrode layer M0 as shown in the side cross sectional view of FIG. 74. In this case, the flexible substrate 570 itself functions as a common lower electrode layer M0.

In addition, while the lower electrode side is caused to be a common single electrode layer in the above-described modifications 2, 3, the upper electrode layer side may be a common single electrode layer in a manner opposite to the above.

<5.8> Other Modifications

While the above-described sensors all use a physically single piezoelectric element 520 or 540, they may be constituted with physically plural piezoelectric elements. For example, in FIG. 59, there may be employed a configuration in which respective localized elements D1 to D16 are constituted with separate independent piezoelectric elements thus to use sixteen piezoelectric elements in total. Further, there may be employed a configuration in which one localized elements are used with respective two localized elements such that a single localized element is used for localized elements D1, D2 and another piezoelectric element is used for localized elements D3, D4, thus to use eight piezoelectric elements in total. As stated above, how many piezoelectric elements are used from a physical point of view is the matter which can be suitably changed in design.

§6 Sixth Embodiment

<6.1> Principle of Sensor According to Sixth Embodiment

Figure 75:
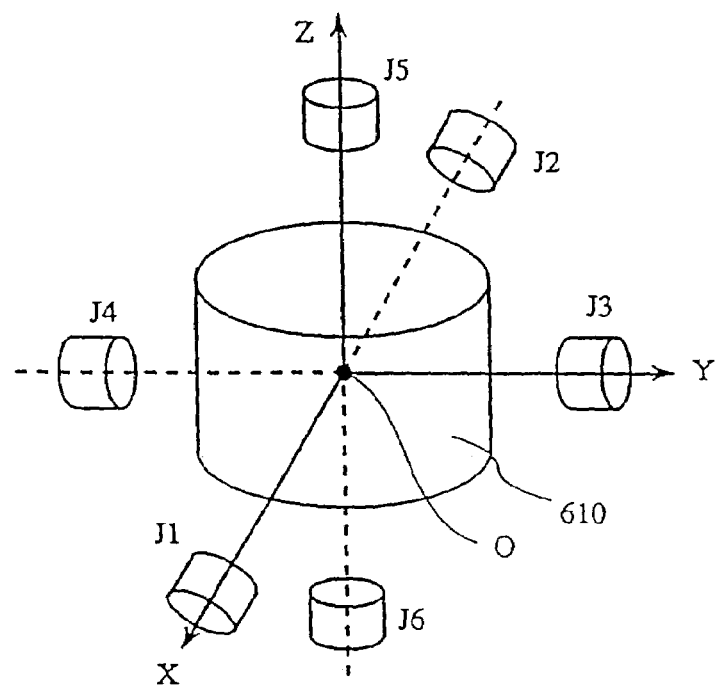
FIG. 75 is a perspective view showing a fundamental principle of a multi-axial angular velocity sensor according to a sixth embodiment of this invention.

A multi-axial angular velocity sensor according to the sixth embodiment which will be described below is a sensor using a electromagnetic force as the oscillating mechanism and using a differential transformer as the detecting mechanism. First, its principle will be briefly described with reference to FIG. 75. A center of gravity position of an oscillator 610 comprised of a magnetic material is assumed to be origin O to define an XYZ three-dimensional coordinate system. Then, a pair of coils J1, J2, a pair of coils J3, J4 and a pair of coils J5, J6 are provided in such a manner that the oscillator 610 is put therebetween.

When six coils are disposed in this way, it is possible to oscillate the oscillator 610 comprised of magnetic material in an arbitrary axis of the X-axis, the Y-axis, the Z-axis. For example, in order to produce oscillation Ux in the X-axis direction, it is sufficient to allow a current to reciprocally flow in coils J1, J2 arranged on the X-axis. When current is caused to flow in coil J1, the oscillator 610 moves in the positive direction of the X-axis by magnetic force produced by coil J1. Further, when current is caused to flow in coil J2, the oscillator 610 moves in the negative direction of the X-axis by magnetic force produced by coil J2. Accordingly, when current is caused to flow reciprocally, the oscillator 610 is reciprocated in the X-axis direction. Similarly, in order to produce oscillation Uy in the Y-axis direction, it is sufficient to allow current to reciprocally flow in coils J3, J4 arranged on the Y-axis. In addition, in order to produce oscillation Uz in the Z-axis direction, it is sufficient to allow current to reciprocally flow in coils J5, J6 arranged on the Z-axis.

On the other hand, by sixth coils arranged in this way, it is also possible to detect displacement of the oscillator 610 comprised of magnetic material. For example, in the case where the oscillator 610 is caused to undergo displacement in the positive direction of the X-axis, the distance between the oscillator 610 and coil J1 becomes smaller, and the distance between the oscillator 610 and coil J2 becomes greater. Generally, when a change takes place in the distance of magnetic material with respect to coil, a change takes place in inductance of that coil. Accordingly, if inductance change of coil J1 and inductance change of coil J2 are detected, it is possible to recognize displacement in the X-axis direction of the oscillator 610. Similarly, by inductance change of coil J3 and inductance change of coil J4, it is possible to recognize displacement in the Y-axis direction of the oscillator 610. In addition, by inductance change of coil J5 and inductance change of coil J6, it is possible to recognize displacement in the Z-axis direction of the oscillator 610. In view of this, if there is employed a structure such that displacement takes place in the oscillator 610 by Coriolis force, it is possible to detect Coriolis force components in respective axes directions by inductance changes of respective coils.

While coils J1 to J16 serve as both the role for oscillating the oscillator 610 and the role for detecting displacement of the oscillator 610 as stated above, coils for oscillation and coils for detection may be separately provided.

<6.2> Structure and Operation of Actual Sensor

Figure 76:
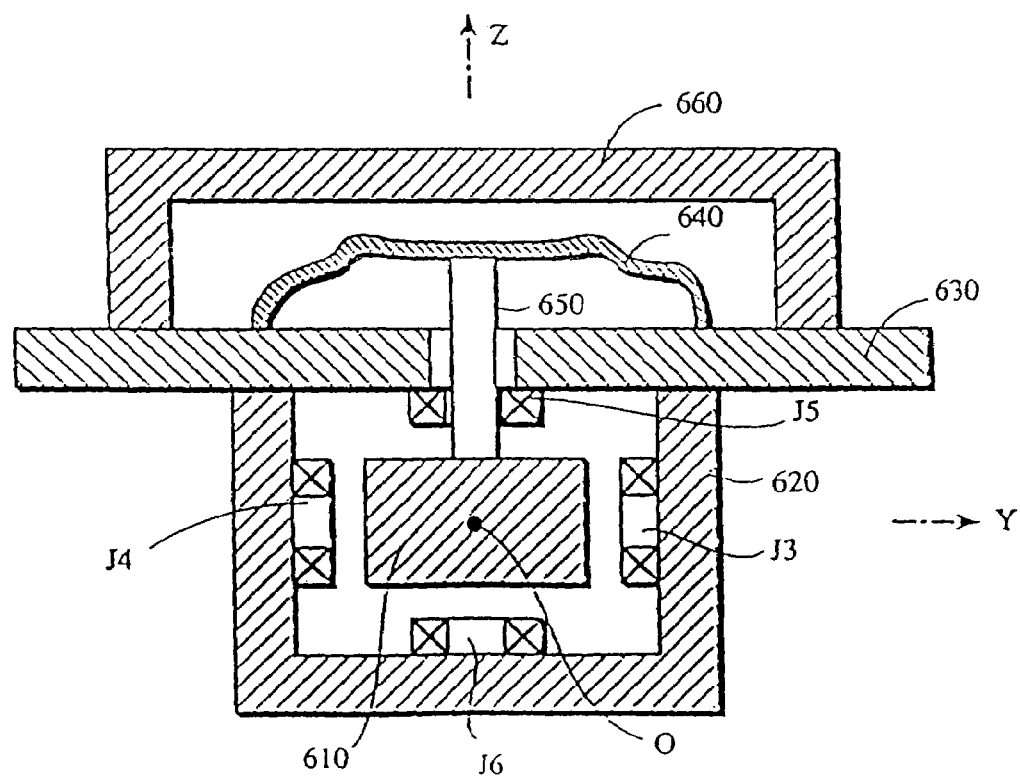
FIG. 76 is a side cross sectional view showing a more practical structure of the multi-axial angular velocity sensor according to the sixth embodiment of this invention.

FIG. 76 is a side cross sectional view showing an actual structure of a multi-axial angular velocity sensor based on the above-described principle. A columnar oscillator 610 comprised of a magnetic material such as iron, etc. is accommodated within a sensor casing 620. A partition plate 630 is connected on the upper surface of the sensor casing 620. A disk-shaped diaphragm 640 is attached on the upper surface of the partition plate 630 in such a manner that it faces downwardly. The upper end of a connecting rod 650 is fixed to the center of this diaphragm. A penetration hole is formed at the central portion of the partition plate 630. The connecting rod 650 is inserted through the penetration hole. The oscillator 610 is attached to the lower end of the connecting rod 650. The oscillator 610 is in a hanging state by the connecting rod 650 within the sensor casing 620. Further, a protective cover 660 is attached at the upper part of the partition plate 630 so as to cover the diaphragm 640.

It is now assumed that a center of gravity position of the oscillator 610 is taken as the origin, and a Y-axis is taken in a right direction, a Z-axis is taken in an upper direction and an X-axis is taken in a direction perpendicular to plane surface of paper in FIG. 76.

Inside sensor casing 620, six coils J1 to J6 are disposed as shown (although coils J1, J2 are not shown in FIG. 76, coils J1, J2 are respectively disposed on this side of the oscillator 610 and on that side thereof). This arrangement is the same as the arrangement shown in FIG. 75.

As described above, a current is caused to flow in a predetermined pair of coils, thereby making it possible to oscillate the oscillator 610 in a predetermined axial direction. Further, inductance change of a predetermined pair of coils is detected, thereby making it possible to detect Coriolis force components exerted in a predetermined axial direction. Accordingly, it is possible to detect an angular velocity about a predetermined axis on the basis of the fundamental principle shown in FIGS. 3 to 5.

§7 Detecting Operation

<7.1> Detection of Acceleration

While various embodiments which have been described are all directed to multi-axial angular sensors, these sensors really have a double function not only as a multi-axial angular sensor but also as a multi-axial acceleration sensor. This is indicated in connection with the sensor of the first embodiment. FIG. 15 is a view for explaining the operation for detecting angular velocity $\omega x$ about the X-axis. In order to detect angular velocity $\omega x$, it is sufficient to measure Coriolis force Fy exerted in the Y-axis direction in the state where the oscillator 130 is caused to undergo oscillation Uz in the Z-axis. Meanwhile, the reason why such Coriolis force Fy in the Y-axis direction is produced is that the oscillator 130 was caused to intentionally undergo oscillation in the Z-axis direction in the state where angular velocity $\omega x$ is exerted. If the oscillator 130 is not oscillated, Coriolis force Fy is not produced. However, even if the oscillator 130 is not oscillated, there are instances where force Fy to move the oscillator 130 in the Y-axis direction takes place. This is the case where an acceleration in the Y-axis direction is applied to the oscillator 130. In accordance with the fundamental rule of dynamics, when an acceleration is applied to a body having mass, a force proportional to the mass of the body is applied in the same direction as that of this acceleration. Accordingly, in the case where an acceleration in the Y-axis direction is applied to the oscillator 130, a force Fy in the Y-axis direction having a magnitude proportional to mass of the oscillator 130 is applied. Such force Fy resulting from acceleration and Coriolis force Fy are entirely the same as force. Accordingly, it is possible to detect a force resulting from acceleration by exactly the same method as the method of detecting Coriolis force.

Eventually, in the above-described sensors of the respective embodiments, a force detected in a predetermined axial direction, with an oscillator being intentionally oscillated in a predetermined axial direction, is Coriolis force. The magnitude of this Coriolis force takes a value corresponding to an angular velocity about a predetermined axis. On the contrary, a force detected in a predetermined axial direction, with an oscillator being not oscillated, is a force based on an acceleration exerted in that axial direction. The magnitude of this force takes a value corresponding to the acceleration in the axial direction. As stated above, when measurement is carried out with an oscillator being oscillated, the above-described sensors of the respective embodiments function as an angular sensor, while when measurement is carried out with an oscillator being not oscillated, they function as an acceleration sensor.

<7.2> Time-divisional Detecting Operation

Figure 77:
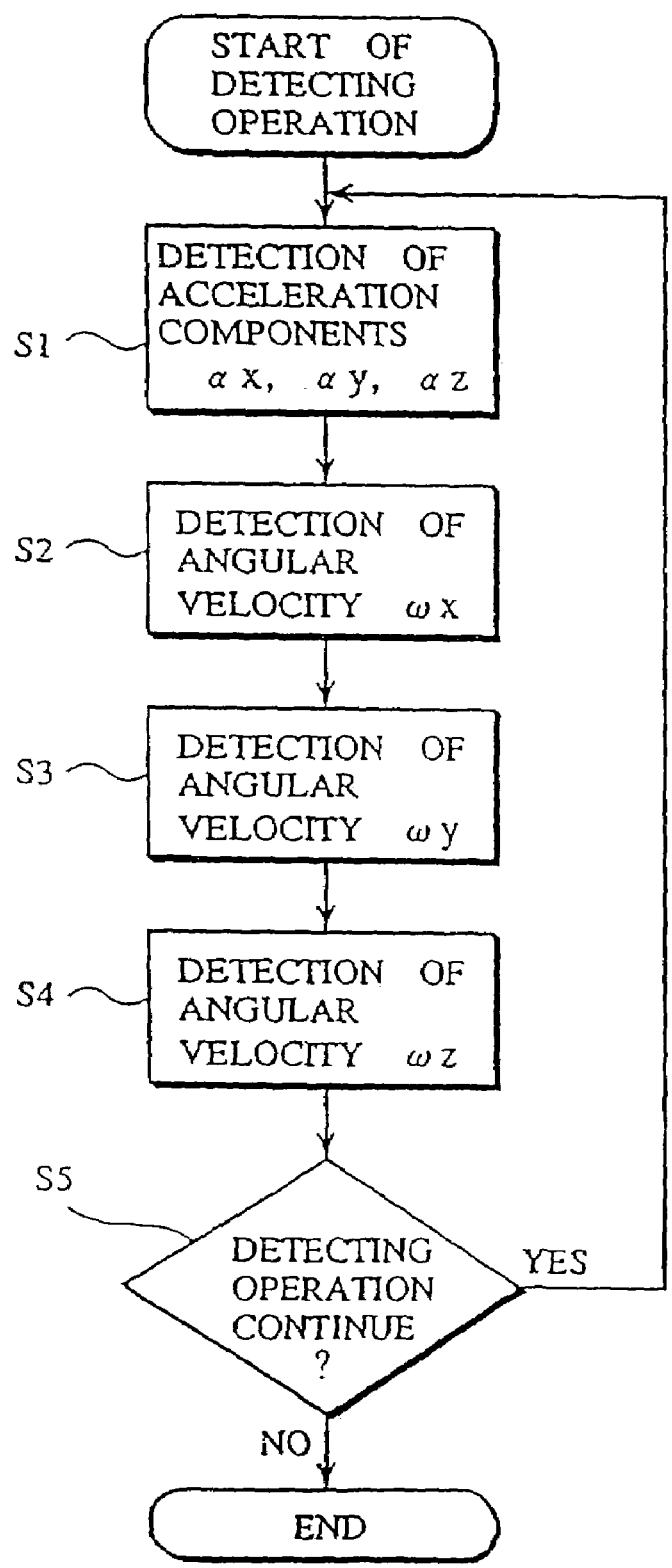
FIG. 77 is a flowchart showing a procedure of a detecting operation in the multi-axial angular velocity sensor according to this invention.

As described above, the sensors according to this invention serve as both the function as a multi-axial angular velocity sensor and the function as a multi-axial acceleration sensor. In view of this, in practice, a time-divisional detecting operation as indicated by the flowchart of FIG. 77 is carried out, thereby making it possible to carry out detection of sixth components of acceleration $\alpha x$ in the X-axis direction, acceleration $\alpha y$ in the Y-axis direction, acceleration $\alpha z$ in the Z-axis direction, angular velocity $\omega x$ about the X-axis, angular velocity $\omega y$ about the Y-axis, and angular velocity $\omega z$ about the Z-axis.

First, at step S1, detections of accelerations $\alpha x$, $\alpha y$, $\alpha z$ in respective directions are carried out at the same time. Namely, it is sufficient to carry out the detecting processing identical to the detection of Coriolis force without oscillating oscillator. A force which has been detected at this time is not Coriolis force in fact, but a force produced on the basis of acceleration. With respect to the acceleration, it is possible to detect three axial components at the same time. This because since there is no necessity of carrying out a work for allowing an oscillator to undergo oscillation, respective electrode layers are not required to perform the role as the oscillating mechanism, but performs only the role as the detecting mechanism. For example, in the case of the sensor according to the fourth embodiment shown in FIG. 42, circuits as shown in FIGS. 46 to 48 are formed for the purpose of detecting Coriolis force. In the case of carrying out detection of acceleration, there is no necessity of delivering an a.c. signal for producing oscillation. For this reason, it is unnecessary to deliver an a.c. signal to all of electrode layers E1 to E5 and F1 to F5 shown in these circuits. Accordingly, potential differences Vx, Vy, Vz detected by these circuits indicate accelerations $\alpha x$, $\alpha y$, $\alpha z$ as they are.

Subsequently, detection of angular velocity $\omega x$ is carried out at step S2, detection of angular velocity $\omega y$ is carried out at step S3, and detection of angular velocity $\omega z$ is carried out at step S4. With respect to the angular velocity, as previously described, it is unable to detect respective angular velocity components about three axes. Accordingly, detections of respective angular velocity components are carried out in succession by such a time division.

Finally, the operation returns from step S5 to step S1 for a second time. As long as the detecting operation is continuously executed, similar operation will be repeatedly executed.

<7.3> Detecting Circuit

Figure 78:
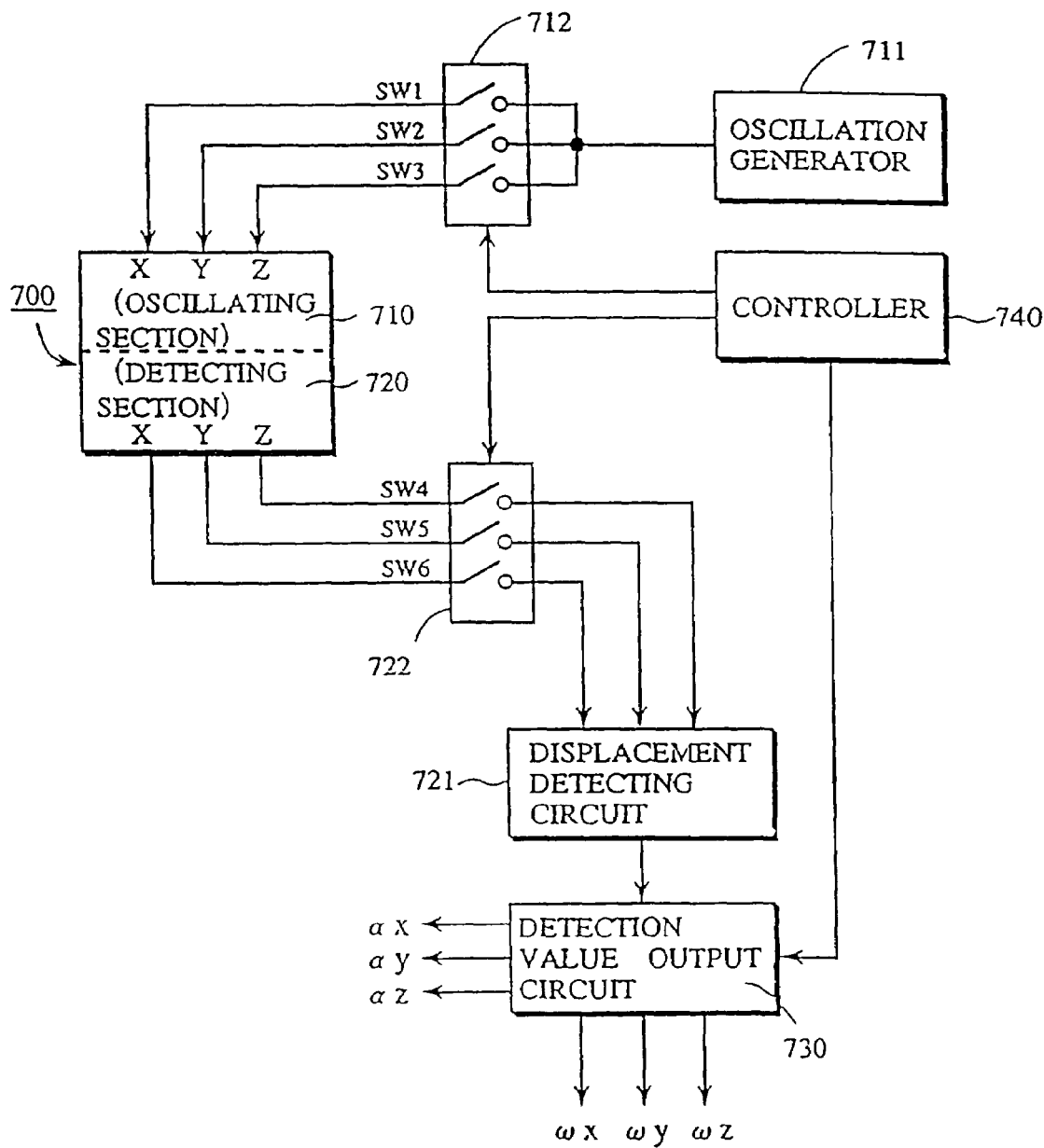
FIG. 78 is a view showing an actual example of a circuit configuration for carrying out the detecting operation in the multi-axial angular velocity sensor according to this invention.

Subsequently, the fundamental configuration of the detecting circuit for carrying out a time-divisional detecting operation as previously described is shown in FIG. 78. In this figure, block 700 corresponds to various embodiments of multi-axial angular velocity sensors which have been described above. From a viewpoint of function, this block is illustrated in a manner divided into two sections of oscillating section 710 and detecting section 720. The oscillating section 710 is a section having a function to oscillate an oscillator included therein in a predetermined axial direction. When a drive signal is delivered to respective terminals respectively designated at X, Y, Z, an oscillator is oscillated in the X-, Y- and Z-axial directions. Further, the detecting section 720 is a section having a function to output a detection signal indicating a displacement of the oscillator included. From respective terminals designated at X, Y, Z in the figure, detection signals of displacements with respect to the X-, Y- and Z-axial directions are respectively outputted. In a practical sensor, there are instances where one electrode layer serves as both the function on the oscillating section 710 side and the function on the detecting section 720 side, and it is therefore difficult to clearly classify respective sections constituting the sensor into the oscillating section 710 or the detecting section 720. However, for convenience, this sensor is assumed to be represented by a simple model such as block 700 by functionally grasping it.

An oscillation generator 711 is a circuit for generating a drive signal which is delivered to respective terminals X, Y, Z of the oscillating section 710. In a more practical sense, the oscillation generator 711 is a unit for generating, e.g., an a.c. signal. Multiplexer 712 includes switches SW1, SW2, SW3, and serves to control a drive signal produced in the oscillating generator 711 delivered to any one of terminals X, Y, Z of the oscillating section 710. On the other hand, a detection signal outputted from any one of terminals X, Y, Z of the detecting section 720 is delivered to a displacement detecting circuit 721 via a multiplexer 722. The multiplexer 722 includes switches SW4, SW5, SW6, and serves to select a detection signal delivered to the displacement detecting circuit 721. The displacement detecting circuit 721 detects an actual displacement quantity on the basis of the detection signal delivered thereto to deliver it to a detection value output circuit 730. A controller 740 controls the operations of multiplexers 712, 722, and delivers a control signal to the detection value output circuit 730.

The detecting circuit has been constructed as above. It is to be noted that FIG. 78 is not an actual circuit diagram indicating an actual current path, but is a view showing the outline of the configuration of the detecting circuit. Accordingly, a single line shown in the figure indicates a path for a bundle of control signals or detection signals, but does not indicate the current path itself. For example, although a single control signal line is only illustrated between switch SW1 and the oscillating section 710, it is necessary to deliver an a.c. signal having a predetermined phase to a plurality of electrode layers for the purpose of oscillating the oscillator in the X-axis direction in practice. Therefore, a plurality of current paths are required.

When such a detecting circuit is constructed, the detecting operation shown in the flowchart of FIG. 77 will be executed as follows. The processing for detecting accelerations αx, αy, αz is carried out. Namely, the controller 740 delivers, to multiplexers 712, 722, an indication to allow switches SW1, SW2, SW3 to be all turned OFF, and to allow switches SW4, SW5, SW6 to be all turned ON. As a result, no drive signal is delivered to the oscillating section 710, and, an intentional excitation with respect to the oscillator is not carried out. Accordingly, detection signals outputted from respective terminals X, Y, Z of the detecting section 720 at this time are not a signal indicating Coriolis force, but a signal indicating a displacement produced by a force based on action of acceleration. Since switches SW4, SW5, SW6 are all ON, three signals are all delivered to the displacement detecting circuit 721, at which displacement quantities in three axial directions of X, Y, Z are detected. The controller 740 instructs the detection value output circuit 730 to output detected three displacement quantities as values of acceleration. Thus, the displacement quantities in the three axial directions detected at the displacement detecting circuit 721 are outputted as acceleration values αx, αy, αz from the detection value output circuit 730, respectively.

Subsequently, the controller 740 carries out processing for detecting angular velocity ωx as processing at step S2. Namely, the controller 740 delivers, to multiplexers 712, 722, on the basis of the principle shown in FIG. 3, an indication
  to allow switch SW1 to be turned OFF,
  to allow switch SW2 to be turned OFF,
  to allow switch SW3 to be turned ON,
  to allow switch SW4 to be turned OFF,
  to allow switch SW5 to be turned ON, and
  to allow switch SW6 to be turned OFF.

As a result, the oscillating section 710 allows the oscillator to undergo oscillation Uz in the Z-axis direction. The detecting section 720 outputs, from terminal Y, a detection signal indicating displacement in the Y-axis direction of the oscillator by action of Coriolis force Fy produced at this time. The displacement detecting circuit 721 detects a displacement quantity in the Y-axis direction on the basis of this detection signal. The controller 740 instructs the detection value output circuit 730 to output the detected displacement quantity as a value of angular velocity ωx about the X-axis. Thus, the displacement quantity in the Y-axis direction detected at the displacement detecting circuit 721 is outputted as angular velocity ωx from the detection value output circuit 730.

Then, the controller 740 carries out processing for detecting angular velocity ωy as processing at step S3. Namely, the controller 740 delivers, to multiplexers 712, 722, on the basis of the principle shown in FIG. 4, an indication
  to allow switch SW1 to be turned ON,
  to allow switch SW2 to be turned OFF,
  to allow switch SW3 to be turned OFF,
  to allow switch SW4 to be turned OFF,
  to allow switch SW5 to be turned OFF, and
  to allow switch SW6 to be turned ON.

As a result, oscillating section 710 allows the oscillator to undergo oscillation Ux in the X-axis direction. The detecting section 720 outputs a detection signal indicating displacement in the Z-axis direction of the oscillator by action of Coriolis force Fz produced at this time from terminal Z. The displacement detecting circuit 721 detects displacement quantity in the Z-axis direction on the basis of this detection signal. The controller 740 instructs the detection value output circuit 730 to output the detected displacement quantity as a value of angular velocity ωy about the Y-axis. Thus, the displacement quantity in the Z-axis direction detected at the displacement detecting circuit 721 is outputted as angular velocity ωy from the detection value output circuit 730.

Further, the controller 740 carries out processing for detecting angular velocity ωz as processing at step S4. Namely, the controller 740 delivers, to multiplexers 712, 722, on the basis of the principle shown in FIG. 5, an indication
  to allow switch SW1 to be turned OFF,
  to allow switch SW2 to be turned ON, to allow switch SW3 to be turned OFF,
to allow switch SW4 to be turned ON,
to allow switch SW5 to be turned OFF, and
to allow switch SW6 to be turned OFF.

As a result, the oscillating section 710 allows the oscillator to undergo oscillation Uy in the Y-axis direction. The detecting section 720 outputs a detection signal indicating displacement in the X-axis direction of the oscillator by action of Coriolis force produced at this time from terminal X. The displacement detecting circuit 721 detects displacement quantity in the X-axis direction on the basis of this detection signal. The controller 740 instructs the detection value output circuit 730 to output the detected displacement quantity as a value of angular velocity about the Z-axis. Thus, the displacement quantity in the X-axis direction detected at the displacement detecting circuit 721 is outputted as angular velocity ωz from the detection value output circuit 730.

The above-mentioned processing is repeatedly executed via step S5. Accordingly, if such sensor is mounted in a moving body, it becomes possible to continuously detect acceleration components in three axial directions and angular velocity components about three axial at respective time points.

<7.4> Other Detecting Principle of Angular Velocity

The foregoing explanation relating to detection of the multi-axial angular velocity was all based on the fundamental principle shown in FIGS. 3 to 5. On the contrary, detection based on the fundamental principle shown in FIGS. 79 to 81 can be made as well. For example, in the case of detecting angular velocity ωx about the X-axis, in accordance with the fundamental principle shown in FIG. 3, a Coriolis force Fy produced in the Y-axis direction when the oscillator is caused to undergo oscillation Uz in the Z-axis direction is detected. In accordance with the fundamental principle shown in FIG. 79, it is sufficient to detect Coriolis force Fz produced in the Z-axis direction when the oscillator is caused to undergo oscillation Uy in the Y-axis direction. Similarly, in the case of detecting angular velocity ωy about the Y-axis, in accordance with the fundamental principle shown in FIG. 4, Coriolis force Fz produced in the Z-axis direction when the oscillator is caused to undergo oscillation Ux in the X-axis direction is detected. In accordance with the fundamental principle shown in FIG. 80, it is sufficient to detect Coriolis force Fx produced in the X-axis direction when the oscillator is caused to undergo oscillation Uz in the Z-axis direction. In addition, in the case of detecting angular velocity ωz about the Z-axis, in accordance with the fundamental principle shown in FIG. 5, Coriolis force Fx produced in the X-axis direction when the oscillator is caused to undergo oscillation Uy in the Y-axis direction is detected. In accordance with the fundamental principle shown in FIG. 81, it is sufficient to detect Coriolis force Fy produced in the Y-axis direction when the oscillator is caused to undergo oscillation Ux in the X-axis direction.

Figure 79:
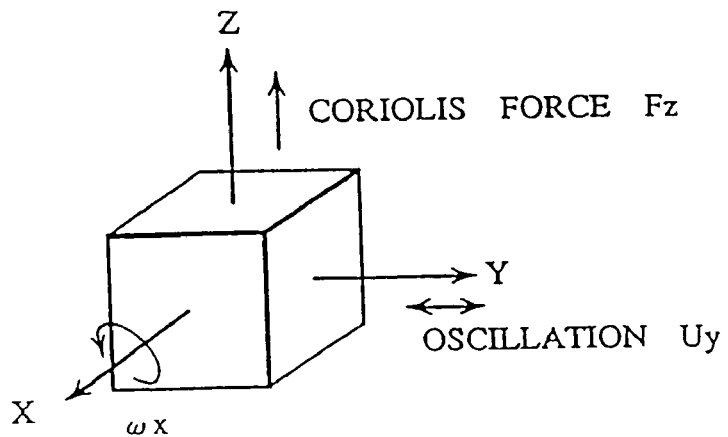
FIG. 79 is a view for explaining another fundamental principle for detecting angular velocity component ωx about the X-axis by this invention.
Figure 80:
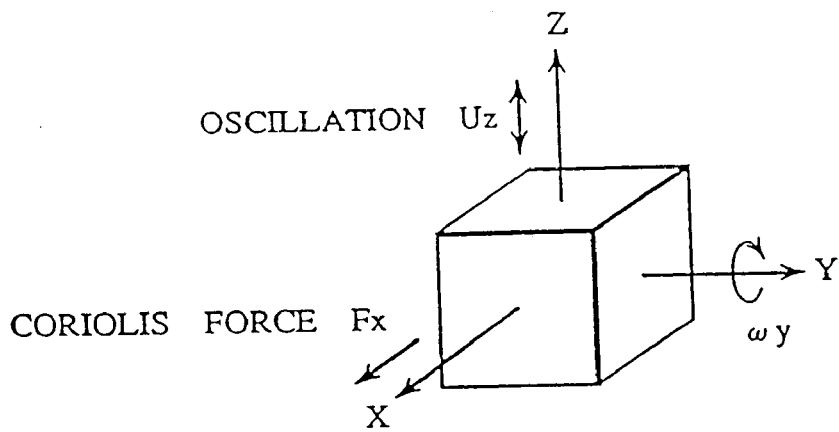
FIG. 80 is a view for explaining a further fundamental principle for detecting angular velocity component ωy about the Y-axis by this invention.
Figure 81:
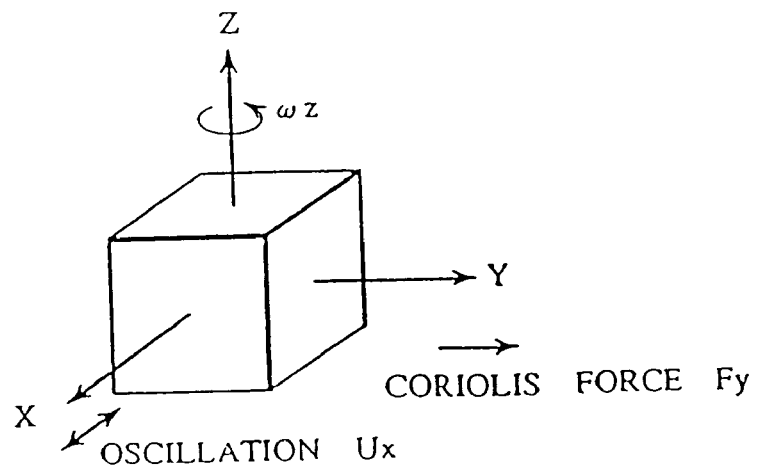
FIG. 81 is a view for explaining a still further fundamental principle for detecting angular velocity component ωz about the Z-axis by this invention.

In short, the multi-axial velocity sensor according to this invention utilizes the natural law that, with respect to an oscillator positioned at the origin of three axes perpendicular to each other, in the case where angular velocity ω is applied about the first axis, when oscillation U is given in the second axial direction, Coriolis force is applied in the third axial direction. Either selection of principles as shown in FIGS. 3 to 5 or selection of principles as shown in FIGS. 79 to 81 may be made. Accordingly, it is possible to carry out detection to which the fundamental principle shown in FIGS. 79 to 81 is applied in connection with all the embodiment which have been described above.

<7.5> Detection by Combination of the Fundamental Principles

As described above, in the angular velocity detection according to this invention, it is possible to carry out both detection based on the fundamental principle shown in FIGS. 3 to 5 and detection based on the fundamental principle shown in FIGS. 79 to 81, and it is further possible to carry out detection in which both detections are combined. For the purpose of facilitating understanding, classification of respective fundamental principles is carried out. It is seen that six kinds of detecting operations as shown in the following Table can be made.

TABLE

|  | <U> | <F> | <ω> | PRINCIPLE DIAGRAM |
|---|---|---|---|---|
| DETECTING OPERATION 1 | X | Y | Z | FIG. 81 |
| DETECTING OPERATION 2 | X | Z | Y | FIG. 4 |
| DETECTING OPERATION 3 | Y | Z | X | FIG. 79 |
| DETECTING OPERATION 4 | Y | X | Z | FIG. 5 |
| DETECTING OPERATION 5 | Z | X | Y | FIG. 80 |
| DETECTING OPERATION 6 | Z | Y | X | FIG. 3 |

In the above Table, the column of U indicates the axial direction to excite the oscillator, the column of F indicates the axial direction to detect Coriolis force exerted on the oscillator, and the column of ω indicates the axis relating to angular velocity to be detected. In the detection based on the fundamental principle shown in FIGS. 3 to 5, even three detecting operations of the above Table are carried out. In the detection based on the fundamental principle shown in FIGS. 79 to 81, odd three detecting operations are carried out. As previously described, it is possible to detect angular velocity components about three axes of XYZ by such three detecting operations.

Meanwhile, combination for detecting such angular velocity components about three axes is not limited to combination of even and odd detecting operations. For example, even if combination of the detecting operations 1 to 3 of the first half is employed, angular velocity components about three axes of X, Y, Z can be detected. Further, even if combination of the detecting operations 4 to 6 of the latter half is employed, angular velocity components about three axes of X, Y, Z can be made (see the column of ω of the above Table). In addition, when such combinations are employed, a portion of the oscillating mechanism and the detecting mechanism may be omitted. For example, in order to execute the detecting operations 1 to 3 in the above Table, it is sufficient for the excitation axis of the oscillator to employ the X-axis and the Y-axis (see the column of U). In other words, it is not necessary to oscillate the oscillator in the Z-axis. Further, it is sufficient for the axis for detecting Coriolis force to employ only the Y-axis and the Z-axis (see the column of F). In other words, it is not necessary to detect Coriolis force in the X-axis direction. Eventually, as the oscillating mechanism, it is enough to permit the oscillator to undergo oscillation in two axes directions of X-axis and the Y-axis. As the detecting mechanism, it is enough to permit detection in two axes of the Y-axis and the Z-axis. It was the premise that various embodiments which have been described above all include an oscillating mechanism for oscillating an oscillator in three axial directions of X, Y, Z and a detecting mechanism for detecting Coriolis force components in three axial directions of X, Y, Z. However, by suitably combining the fundamental principles in this way, detection of angular velocity components about three axes can be made by using an oscillating mechanism in two axes directions and a detection mechanism in two axes directions.

While the above-described embodiments were all directed to a three-dimensional angular velocity sensor for detecting angular velocity components about three axes of X, Y, Z, in the case where it is sufficient to detect only angular velocity components with respect to specific two axes of these three axes, it is possible to use a two-dimensional angular velocity sensor in which a portion of the oscillating mechanism or the detecting mechanism is further omitted. For example, let now consider only the detecting operation 1 and the detecting operation 2 in the above Table. In order to carry out these two detecting operations, it is sufficient that an oscillating mechanism in the X-axis direction and a detecting mechanisms in the Y-axis and Z-axis directions are provided. As a result, it is possible to detect angular velocity about the Z-axis and angular velocity about the Y-axis. Accordingly, a two-dimensional angular velocity sensor can be realized by the oscillating mechanism in one axial direction and the detecting mechanism with respect to two axes.

In addition, combination as described below may be employed. Let now consider only the detecting operation 2 and the detecting operation 3 in the above Table. In order to carry out these two detecting operations, it is sufficient that an oscillating mechanisms in the X-axis and Y-axis directions and a detecting mechanism with respect to the Z-axis direction are provided. As a result, angular velocity about the Y-axis and angular velocity about the X-axis can be detected. Accordingly, a two-dimensional angular velocity sensor can be realized by the oscillating mechanisms in two axes directions and the detecting mechanism with respect to one axis.

INDUSTRIAL APPLICABILITY

A multi-axial angular velocity sensor according to this invention can respectively independently detect angular velocity ωx about the X-axis, angular velocity ωy about the Y-axis, and angular velocity ωz about the Z-axis with respect to an object moving in an XYZ three-dimensional coordinate system. Accordingly, when mounted in an industrial machine, an industrial robot, an automotive vehicle, an air-plane, or a ship, etc., this multi-axial angular velocity sensor can be widely utilized as a sensor in carrying out recognition of moving state or a feedback control with respect to movement. In addition, this multi-axial angular velocity sensor can be also utilized for control to correct unintentional hand movement at the time of photographing by camera.

The invention claimed is:

1. An angular velocity sensor for detecting an angular velocity component about a Z-axis in an XYZ three-dimensional coordinate system, said sensor comprising:
    an oscillator made of a substrate with an enough thickness to obtain a mass sufficient to provide the sensor with a required sensitivity;
    a sensor casing for accommodating the oscillator therewithin;
    a flexible member for connecting the oscillator to the sensor casing so that the oscillator can be moved with respect to the sensor casing;
    a driving device for oscillating the oscillator in an X-axis direction in said coordinate system; and
    a detection device for detecting a deviation of the oscillator in a Y-axis direction in said coordinate system;
    wherein a detection value of said detection device is output as a value indicating an angular velocity component about the Z-axis.

2. The angular velocity sensor according to claim 1, wherein the driving device oscillates the oscillator using Coulomb force.

3. The angular velocity sensor according to claim 2, wherein the driving device includes a first electrode provided on the oscillator, a second electrode provided on a fixed member fixed to the sensor casing and an excitation element applying a voltage between said first electrode and said second electrode.

4. The angular velocity sensor according to claim 1, wherein the detection device detects a deviation by measuring a capacitance value.

5. The angular velocity sensor according to claim 4, wherein the detection device includes a capacitance element including a pair of electrodes, a distance between said pair of electrodes being changed based on a deviation of the oscillator caused by Coriolis force.

6. The angular velocity sensor according to claim 1, wherein the driving device oscillates the oscillator using Coulomb force and the detection device detects a deviation by measuring a capacitance value.

7. The angular velocity sensor according to claim 6,
    wherein the driving device includes a first electrode provided on the oscillator, a second electrode provided on a fixed member fixed to the sensor casing and an excitation element applying a voltage between said first electrode and said second electrode, and
    wherein the detection device includes a capacitance element including a pair of electrodes, a distance between said pair of electrodes being changed based on a deviation of the oscillator caused by Coriolis force.

* * * * *